United States Patent
Miyagishima

(10) Patent No.: US 12,055,838 B2
(45) Date of Patent: Aug. 6, 2024

(54) ELECTRONIC VIEW FINDER AND OPTICAL APPARATUS

(71) Applicant: FUJIFILM Corporation, Tokyo (JP)

(72) Inventor: Shunsuke Miyagishima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/184,322

(22) Filed: Mar. 15, 2023

(65) Prior Publication Data

US 2023/0213838 A1 Jul. 6, 2023

Related U.S. Application Data

(63) Continuation of application No. PCT/JP2021/031400, filed on Aug. 26, 2021.

(30) Foreign Application Priority Data

Sep. 30, 2020 (JP) ................. 2020-166410

(51) Int. Cl.
- *G03B 13/06* (2021.01)
- *G02B 25/00* (2006.01)
- *G02B 27/00* (2006.01)

(52) U.S. Cl.
CPC ........... *G03B 13/06* (2013.01); *G02B 25/001* (2013.01); *G02B 27/0068* (2013.01)

(58) Field of Classification Search
CPC .............. G03B 13/06; G03B 13/32–36; G02B 25/001; G02B 27/0068
See application file for complete search history.

(56) References Cited

U.S. PATENT DOCUMENTS

| | | |
|---|---|---|
| 8,531,774 B2 | 9/2013 | Kubota |
| 9,235,042 B2 | 1/2016 | Sato |
| 10,437,060 B2 | 10/2019 | Hasegawa et al. |
| 2002/0191300 A1 | 12/2002 | Neil |
| 2010/0290129 A1* | 11/2010 | Nishio ................. G02B 25/001 359/645 |
| 2012/0099206 A1 | 4/2012 | Kubota |
| 2014/0375864 A1 | 12/2014 | Miyagishima et al. |

(Continued)

FOREIGN PATENT DOCUMENTS

| | | |
|---|---|---|
| CN | 107942514 A | 4/2018 |
| JP | 2002-365562 A | 12/2002 |

(Continued)

OTHER PUBLICATIONS

International Search Report issued in PCT/JP2021/031400; mailed Nov. 16, 2021.

(Continued)

*Primary Examiner* — Minh Q Phan

(74) *Attorney, Agent, or Firm* — Studebaker & Brackett PC

(57) ABSTRACT

An electronic view finder includes a display element that displays an image, and an eyepiece lens that is disposed on an eyepoint side of the display element and that is used for observing the image. The eyepiece lens consists of a first lens, a second lens having refractive power of a different sign from the first lens, and a third lens having positive refractive power in order from a display element side. Diopter is adjustable by moving at least one lens of the eyepiece lens. A television distortion of the image displayed by the display element varies depending on the diopter.

39 Claims, 40 Drawing Sheets

(56) References Cited

U.S. PATENT DOCUMENTS

2015/0177509 A1 6/2015 Sato
2016/0246057 A1 8/2016 Hasegawa et al.

FOREIGN PATENT DOCUMENTS

| | | | |
|---|---|---|---|
| JP | 2012-042844 A | 3/2012 | |
| JP | 2012042844 A * | 3/2012 | |
| JP | 2012-093478 A | 5/2012 | |
| JP | 2015-135471 A | 7/2015 | |
| JP | 2016-038521 A | 3/2016 | |
| JP | 2016-166969 A | 9/2016 | |
| JP | 2020-052117 A | 4/2020 | |
| WO | 2013/136907 A1 | 9/2013 | |
| WO | 2015/107817 A1 | 7/2015 | |
| WO | WO-2015107817 A1 * | 7/2015 | ........... G02B 27/017 |

OTHER PUBLICATIONS

International Preliminary Report On Patentability (Chapter I) and Written Opinion of the International Searching Authority issued in PCT/JP2021/031400; issued Mar. 28, 2023.

An Office Action; "Notice of Reasons for Refusal," mailed by the Japanese Patent Office on Sep. 12, 2023, which corresponds to Japanese Patent Application No. 2022-553550 and is related to U.S. Appl. No. 18/184,322; with English language translation.

* cited by examiner

FIG. 3
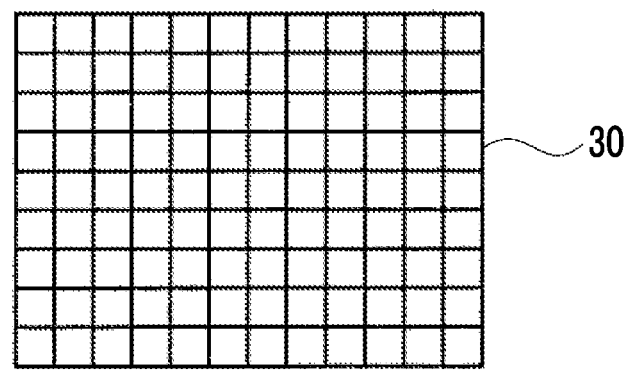
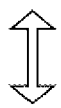
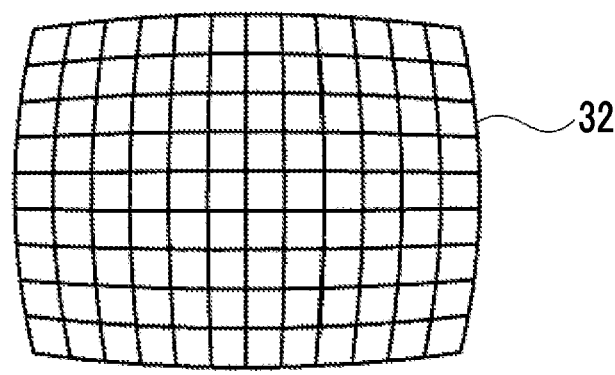
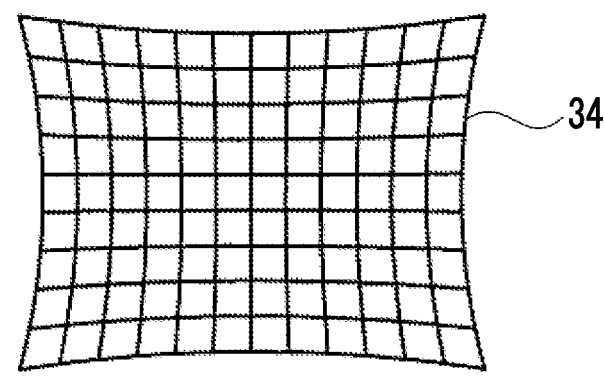

EXAMPLE 1

FIG. 8
EXAMPLE 1
−1dpt
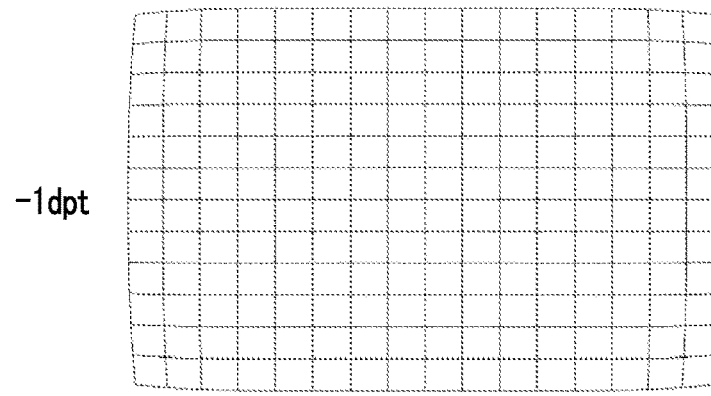
scale 1.95 [mm]
−4.1dpt
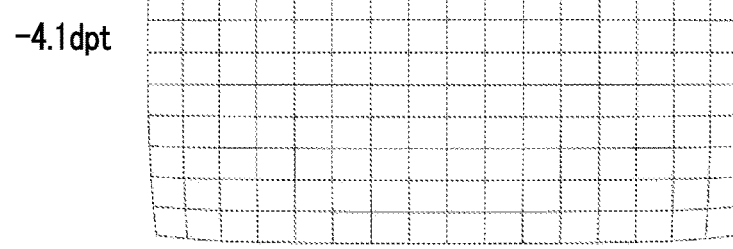
scale 1.96 [mm]
+1.9dpt
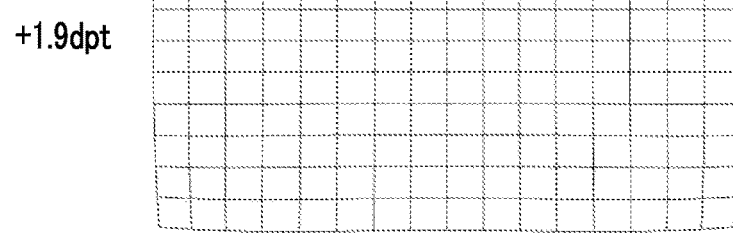
scale 1.95 [mm]

EXAMPLE 2

EXAMPLE 2

EXAMPLE 3

EXAMPLE 4

FIG. 15
EXAMPLE 4
−1dpt 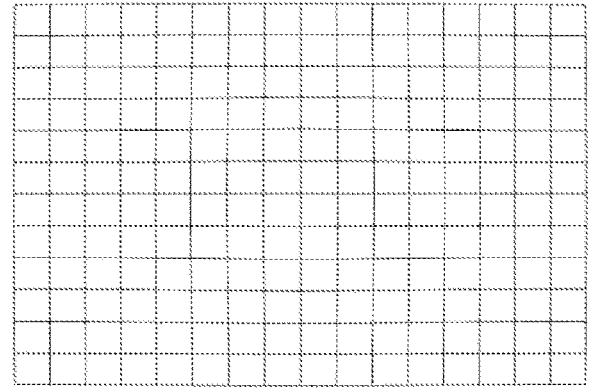
scale 1.87 [mm]
−12.75dpt 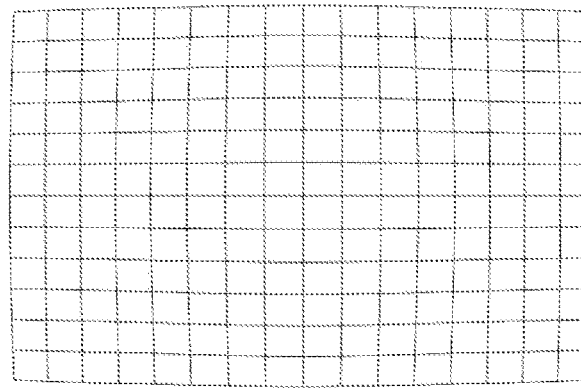
scale 2.01 [mm]
+7.7dpt 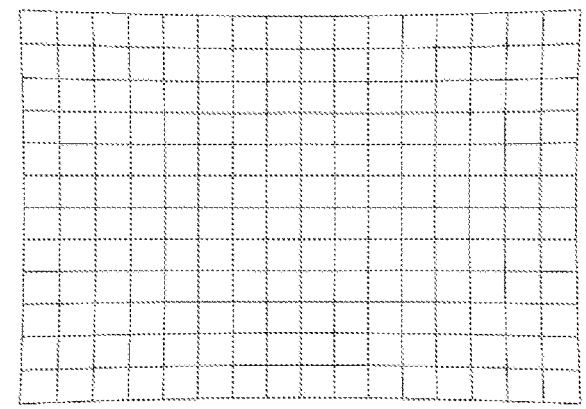
scale 1.81 [mm]

EXAMPLE 5

EXAMPLE 6

EXAMPLE 7

EXAMPLE 8

EXAMPLE 8

EXAMPLE 10

EXAMPLE 11

EXAMPLE 12

EXAMPLE 12

EXAMPLE 13

EXAMPLE 13

EXAMPLE 14

EXAMPLE 15

EXAMPLE 16

ELECTRONIC VIEW FINDER AND OPTICAL APPARATUS

CROSS-REFERENCE TO RELATED APPLICATIONS

This application is a continuation application of International Application No. PCT/JP2021/031400, filed on Aug. 26, 2021, which claims priority from Japanese Patent Application No. 2020-166410, filed on Sep. 30, 2020. The entire disclosure of each of the above applications is incorporated herein by reference.

BACKGROUND

Technical Field

The present disclosure relates to an electronic view finder and an optical apparatus.

Related Art

In the related art, the lens systems disclosed in JP2012-042844A, JP2020-052117A, and JP2002-365562A have been known as an optical system usable in a finder or in an observation apparatus. In addition, the technology in WO2013/136907A has been known as a display method of an electronic view finder.

SUMMARY

An object of the disclosed technology is to provide an electronic view finder that can achieve both of size reduction and high specifications of an optical system compared to the related art, and an optical apparatus comprising the electronic view finder.

An electronic view finder according to an aspect of the disclosed technology comprises a display element that displays an image, and an eyepiece lens that is disposed on an eyepoint side of the display element and that is used for observing the image, in which the eyepiece lens consists of a first lens, a second lens having refractive power of a different sign from refractive power of the first lens, and a third lens having positive refractive power in order from a display element side to the eyepoint side, diopter is adjustable by moving at least one lens of the eyepiece lens as a diopter adjustment lens group, and a television distortion of the image varies depending on the diopter.

In the electronic view finder of the above aspect, it is preferable that at least one of Conditional Expressions (1) to (31) below is satisfied. However, it is preferable that Conditional Expressions (5), (13), (17), and (18) are satisfied in a configuration in which the eyepiece lens consists of a positive lens, a negative lens, and a positive lens in order from the display element side to the eyepoint side.

$$1.78 < N\text{max} < 2 \tag{1}$$

$$0.2 < f1/f3 < 1.8 \tag{2}$$

$$-5 < (R2r+R2f)/(R2r-R2f) < 0.61 \tag{3}$$

$$0.4 < dL/TL < 0.95 \tag{4}$$

$$0.1 < d13/|f2| < 4 \tag{5}$$

$$-3.5 < (R1r+R1f)/(R1r-R1f) < 2 \tag{6}$$

$$-5 < (R3r+R3f)/(R3r-R3f) < 0.5 \tag{7}$$

$$-0.5 < (R3f-R2r)/(R3f+R2r) < 1.5 \tag{8}$$

$$-30 < (R2f-R1r)/(R2f+R1r) < 1.5 \tag{9}$$

$$-3 < f/R3r < -0.2 \tag{10}$$

$$0.89 < f/f1 < 3 \tag{11}$$

$$0.05 < f/f3 < 3 \tag{12}$$

$$0.1 < f/|f2| < 3.3 \tag{13}$$

$$0.01 < f/|fd| < 4 \tag{14}$$

$$0.01 < d3/|fd| < 2 \tag{15}$$

$$-6 < TL/fn < -0.5 \tag{16}$$

$$0.1 < f/f12 < 2 \tag{17}$$

$$-2.5 < f1/f2 < -0.1 \tag{18}$$

$$-3 < f2/f3 < -0.1 \tag{19}$$

$$0.33 < H/f < 0.7 \tag{20}$$

$$0.9 < dL/f < 2.4 \tag{21}$$

$$0.4 < dL12/T2 < 0.9 \tag{22}$$

$$0.15 < d12/d2 < 12 \tag{23}$$

$$0.1 < H/TL < 0.5 \tag{24}$$

$$0.1 < d01/f < 0.8 \tag{25}$$

$$0.01 < d12/TL < 2 \tag{26}$$

$$0.3 < H/f1 < 0.9 \tag{27}$$

$$-1.4 < H/f2 < -0.4 \tag{28}$$

$$0.01 < H/f3 < 1 \tag{29}$$

$$(f/R3r) \times (H/f)^2 < -0.0218 \tag{30}$$

$$200 < |fd \times Str \times R3r| \tag{31}$$

where
Nmax: maximum value of refractive indexes of materials of all lenses provided in eyepiece lens with respect to d line
f: focal length of eyepiece lens in state where diopter is −1 diopter
f1: focal length of first lens
f2: focal length of second lens
f3: focal length of third lens
f12: combined focal length of first lens and second lens in state where diopter is −1 diopter
fd: focal length of diopter adjustment lens group
fn: focal length of lens that is provided in eyepiece lens and that has negative refractive power
R1f: paraxial curvature radius of surface of first lens on display element side
R1r: paraxial curvature radius of surface of first lens on eyepoint side
R2f: paraxial curvature radius of surface of second lens on display element side
R2r: paraxial curvature radius of surface of second lens on eyepoint side
R3f: paraxial curvature radius of surface of third lens on display element side R3r: paraxial curvature radius of surface of third lens on eyepoint side d2: thickness of second lens on optical axis d01: air conversion distance on optical axis from display surface of display element to surface of first lens on display element side in state where diopter is −1 diopter d12: distance on optical axis from surface of first lens on eyepoint side to surface of second lens on display element side in state where diopter is −1 diopter d13: distance on optical axis from surface of first lens on eyepoint side to surface of third lens on display element side in state where diopter is −1 diopter dL: distance on optical axis from surface of first lens on display element side to surface of third lens on eyepoint side in state where diopter is −1 diopter dL12: distance on optical axis from surface of first lens on display element side to surface of second lens on eyepoint side in state where diopter is −1 diopter TL: sum of air conversion distance on optical axis from display surface of display element to surface of first lens on display element side in state where diopter is −1 diopter and of dL T2: sum of air conversion distance on optical axis from display surface of display element to surface of first lens on display element side and distance on optical axis from surface of first lens on display element side to surface of second lens on eyepoint side in state where diopter is −1 diopter Str: moving amount of diopter adjustment lens group in case where change is made from state where diopter is −1 diopter to state where absolute value of diopter is maximum H: half value of longest diameter of display region in display element In a case where Conditional Expressions (30) and (31) above are satisfied, it is preferable that the first lens has positive refractive power, and in a state where the diopter has a positive maximum value, the television distortion of the image has a negative value.

In a case where Conditional Expressions (20) and (30) above are satisfied, it is preferable that in a state where an absolute value of the diopter is a maximum within a negative range of the diopter, the television distortion of the image displayed on the display element has a positive value. At this point, it may be configured to further satisfy Conditional Expression (31). In addition, at this point, it may be configured that the first lens has positive refractive power, and in a state where the diopter has a positive maximum value, the television distortion of the image has a negative value.

It is preferable that the third lens is fixed during the diopter adjustment. In this case, it is preferable that the third lens is an optical element closest to the eyepoint side. In addition, it is preferable that a material of the third lens has a knoop hardness of greater than or equal to 450 N/mm².

It is preferable that the first lens is fixed during the diopter adjustment. In this case, it is preferable that the first lens is an optical element closest to the display element side.

An optical apparatus according to the present disclosure comprises the electronic view finder of the above aspect.

An optical apparatus according to another aspect of the present disclosure comprises the electronic view finder of the above aspect, an imaging element, and a control unit that controls the imaging element, in which a part of at least one of the imaging element or the control unit overlaps with the electronic view finder in a view in an optical axis direction of the electronic view finder.

In the present specification, "consist of" or "consisting of" is intended to mean that a lens that substantially does not have refractive power, optical elements such as a stop, a filter, and a cover glass other than a lens, and a lens flange, a lens barrel, and the like may be provided in addition to illustrated constituents.

In the present specification, a "lens having positive refractive power" and a "positive lens" have the same meaning. A "lens having negative refractive power" and a "negative lens" have the same meaning. A "single lens" means one non-cemented lens. A compound aspherical lens (a lens that is composed of a spherical lens integrated with a film of an aspherical shape formed on the spherical lens and that functions as one aspherical lens as a whole) is not regarded as a cemented lens and is treated as one lens. A sign of refractive power, a curvature radius, and a surface shape related to a lens having an aspherical surface are considered in a paraxial region unless otherwise specified. For a sign of the curvature radius, the sign of the curvature radius of a surface having a shape of a convex surface facing toward the display element side is positive, and the sign of the curvature radius of a surface having a shape of a convex surface facing toward the eyepoint side is negative.

The "focal length" used in the conditional expressions is a paraxial focal length. The values used in the conditional expressions are values based on a d line. In the present specification, a "d line", a "C line", and an "F line" are bright lines. A wavelength of the d line is 587.56 nanometers (nm). A wavelength of the C line is 656.27 nanometers (nm). A wavelength of the F line is 486.13 nanometers (nm).

BRIEF DESCRIPTION OF THE DRAWINGS

FIG. 3 is a schematic diagram for describing a shape of an image depending on a difference in optical distortion.

FIG. 8 is a diagram of distorted images of the electronic view finder of Example 1.

FIG. 15 is a diagram of distorted images of the electronic view finder of Example 4.

DESCRIPTION OF EMBODIMENTS

Hereinafter, an example of an embodiment of the disclosed technology will be described with reference to the drawings.

Figure 1:
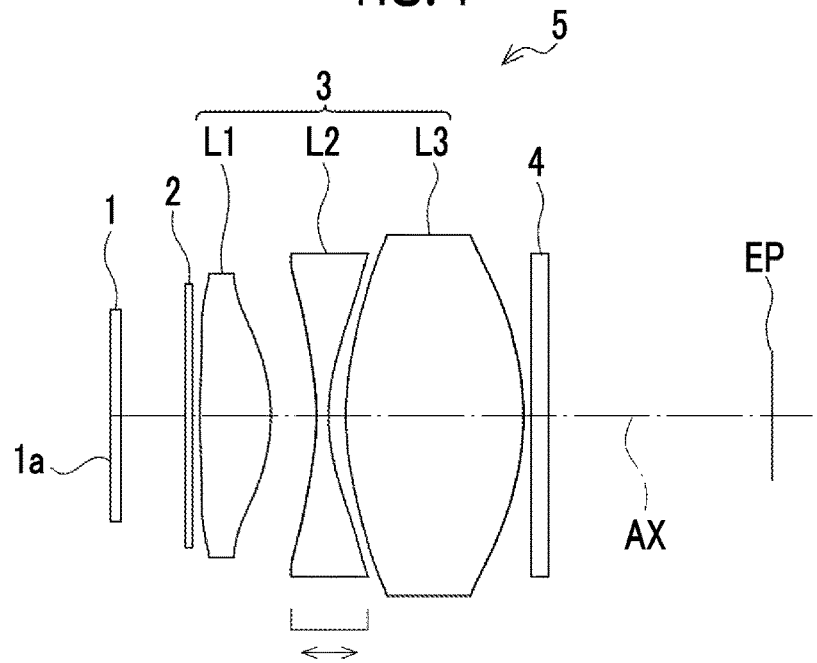
FIG. 1 is a diagram illustrating a configuration of a main part of an electronic view finder according to one embodiment.

FIG. 1 illustrates a configuration of a main part of an electronic view finder 5 according to one embodiment of the disclosed technology. The example illustrated in FIG. 1 corresponds to Example 1 described later. In FIG. 1, a left side is illustrated as a display element 1 side, and a right side is illustrated as an eyepoint EP side. EP in FIG. 1 illustrates a position in a direction of an optical axis AX rather than illustrating a shape. For example, the electronic view finder 5 can be mounted in an imaging apparatus such as a digital camera.

The electronic view finder 5 comprises a display element 1 and an eyepiece lens 3 that is disposed on the eyepoint EP side of the display element 1. The display element 1 is an element displaying an image and has a display region 1a in which the image is displayed. For example, the display element 1 can be configured as an image display panel consisting of a liquid crystal display element or an organic electroluminescence (EL) display element.

The eyepiece lens 3 is used for observing the image displayed in the display region 1a of the display element 1. That is, the electronic view finder 5 is configured to observe the image displayed on the display element 1 through the eyepiece lens 3.

In the example in FIG. 1, an optical member 2 is disposed between the display element 1 and the eyepiece lens 3, and an optical member 4 is disposed between the eyepiece lens 3 and the eyepoint EP. The optical member 2 and the optical member 4 are parallel flat plate-shaped members not having refractive power and are assumed to be cover glasses for protection, various filters, or the like. In the disclosed technology, it can also be configured to remove at least one of the optical member 2 or the optical member 4.

The eyepiece lens 3 consists of a first lens L1, a second lens L2 having refractive power of a different sign from refractive power of the first lens L1, and a third lens L3 having positive refractive power in order from the display element 1 side to the eyepoint EP side along the optical axis AX. In a case where the number of lenses constituting the eyepiece lens 3 is a small number such as three, advantage for shortening a total length of an optical system is achieved.

The first lens L1 may be a positive lens or a negative lens. Accordingly, the eyepiece lens 3 may be configured to consist of a positive lens, a negative lens, and a positive lens (hereinafter, referred to as a positive-negative-positive configuration) in order from the display element 1 side to the eyepoint EP side along the optical axis AX, or may be configured to consist of a negative lens, a positive lens, and a positive lens (hereinafter, referred to as a negative-positive-positive configuration) in order from the display element 1 side to the eyepoint EP side along the optical axis AX. The positive-negative-positive configuration has advantage of easily securing a high eyepoint, compared to the negative-positive-positive configuration. By configuring the eyepiece lens 3 to include both of a positive lens and a negative lens, a balance between aberrations is easily maintained.

As an example, the eyepiece lens 3 illustrated in FIG. 1 consists of the first lens L1 that is a positive lens, the second lens L2 that is a negative lens, and the third lens L3 that is a positive lens, in order from the display element 1 side to the eyepoint EP side. All of these three lenses are single lenses.

In the electronic view finder 5, diopter is adjustable by moving at least one lens of the eyepiece lens 3 along the optical axis AX as a diopter adjustment lens group. The diopter adjustment lens group is not limited to a configuration consisting of a plurality of lenses and can be configured to consist of only one lens. In the example in FIG. 1, the diopter adjustment lens group consists of only the second lens L2. In FIG. 1, a bracket and a bidirectional arrow are shown below the lens corresponding to the diopter adjustment lens group.

An optical distortion occurring in the eyepiece lens 3 changes in accordance with a change in diopter. Thus, in the electronic view finder 5, a television distortion of the image displayed on the display element 1 is configured to vary depending on the diopter. Briefly, the display element 1 displays an image having a television distortion that has an opposite characteristic to the optical distortion, so that the optical distortion occurring in the eyepiece lens 3 is canceled out. That is, the optical distortion occurring in the optical system is corrected by the display element 1. Even in a case where a large optical distortion occurs in the optical system, an image having a significantly small distortion can be obtained by the electronic view finder 5. Thus, since it is not necessary to significantly reduce the optical distortion in the optical system, and a load of the optical system is reduced, high specifications such as securing a wide apparent field of view and enlarging a diopter adjustment range are easily implemented.

Figure 2:
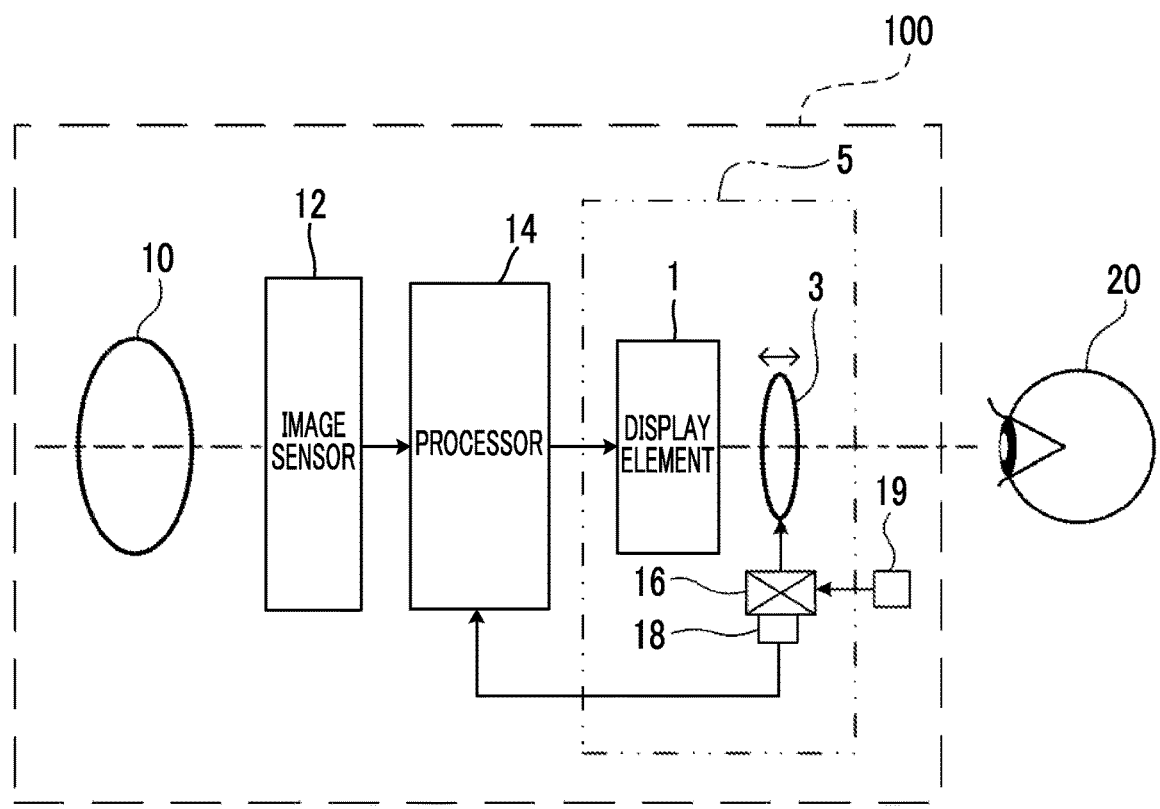
FIG. 2 is a functional configuration diagram of a main part of an imaging apparatus according to one embodiment.

FIG. 2 illustrates a functional configuration diagram of a main part of a camera 100 in which the electronic view finder 5 is mounted. The camera 100 is an example of an imaging apparatus according to the embodiment of the disclosed technology. The camera 100 comprises an imaging lens 10, an image sensor 12, a processor 14, the electronic view finder 5, and a diopter adjustment dial 19. The electronic view finder 5 comprises the display element 1, the eyepiece lens 3, a moving mechanism 16, and a sensor 18. While the imaging lens 10 and the eyepiece lens 3 consist of a plurality of lenses, the imaging lens 10 and the eyepiece lens 3 are schematically illustrated in FIG. 2. In addition, while only a part of the eyepiece lens 3 is configured to move during the diopter adjustment, the eyepiece lens 3 is schematically illustrated in FIG. 2.

The imaging lens 10 forms an image of a subject. The image sensor 12 captures the image formed by the imaging lens 10. The image sensor 12 is an example of an imaging element according to the embodiment of the disclosed technology. For example, a charge coupled device (CCD) or a complementary metal oxide semiconductor (CMOS) can be used as the image sensor 12. The image sensor 12 outputs a captured image that is an image of the captured image to the processor 14. The processor 14 performs image processing on the captured image and outputs image data on which the image processing is performed to the display element 1. The display element 1 displays an image based on the input image data.

An observer 20 observes the image displayed on the display element 1 through the eyepiece lens 3. The observer 20 performs the diopter adjustment by operating the diopter adjustment dial 19 in accordance with vision of the observer 20. In a case where the diopter adjustment dial 19 is operated, the moving mechanism 16 moves the diopter adjustment lens group of the eyepiece lens 3 along the optical axis AX. Accordingly, the diopter adjustment is performed.

In a case where the diopter adjustment is performed, the sensor 18 detects a moving amount of the diopter adjustment lens group from a reference position and outputs positional information of the diopter adjustment lens group to the processor 14. For example, a potentiometer and a linear encoder can be used as the sensor 18. In a case where an output value from the sensor 18 is an analog value, the output value is subjected to analog to digital (A/D) conversion and then, is input into the processor 14.

The processor 14 generates image data having a television distortion corresponding to the diopter from the input positional information and outputs the image data to the display element 1. For example, a look-up table in which the diopter is associated with the television distortion of the image to be displayed on the display element 1 in accordance with the diopter for each position of the diopter adjustment lens group is stored in a memory comprised in the processor 14. The processor 14 derives the television distortion corresponding to the diopter with reference to the look-up table and generates the image data having the television distortion. The display element 1 displays the image based on the input image data. The processor 14 is, for example, a central processing unit (CPU) and controls each part including the display element 1 by executing a control program in cooperation with the memory (not illustrated). The processor 14 may have a function of generating image data for correcting aberrations other than a distortion. While the processor 14 is disposed separately from the electronic view finder 5 in FIG. 2, the electronic view finder 5 may be configured to include the processor 14 having the above function.

In a case where the diopter changes, the optical distortion occurring in the eyepiece lens 3 also changes. FIG. 3 schematically illustrates a difference in shape of an image formed by optical systems having different optical distortions in a case where a lattice chart is used as an object. The lattice chart has a non-distorted shape in which squares are continuously arranged. An image 30 in FIG. 3 is an example in a case of zero optical distortion, and a shape of the image 30 is the same as a shape of the object. An image 32 is an example in a case where there is a negative optical distortion, and has a shape that looks shrunk as an image height is increased. This type of optical distortion is referred to as a barrel type. An image 34 is an example in a case where there is a positive distortion, and has a shape that looks stretched as an image height is increased. This type of optical distortion is referred to as a bobbin type.

For example, in a case where the shape of the image formed by the eyepiece lens 3 changes like the image 30, the image 32, and the image 34 in FIG. 3 in accordance with a change in diopter, the television distortion of the image displayed by the display element 1 is also changed in accordance with this change in the electronic view finder 5. By displaying the image having the television distortion that offsets the optical distortion on the display element 1, the optical distortion of the eyepiece lens 3 can be corrected.

Figure 4:
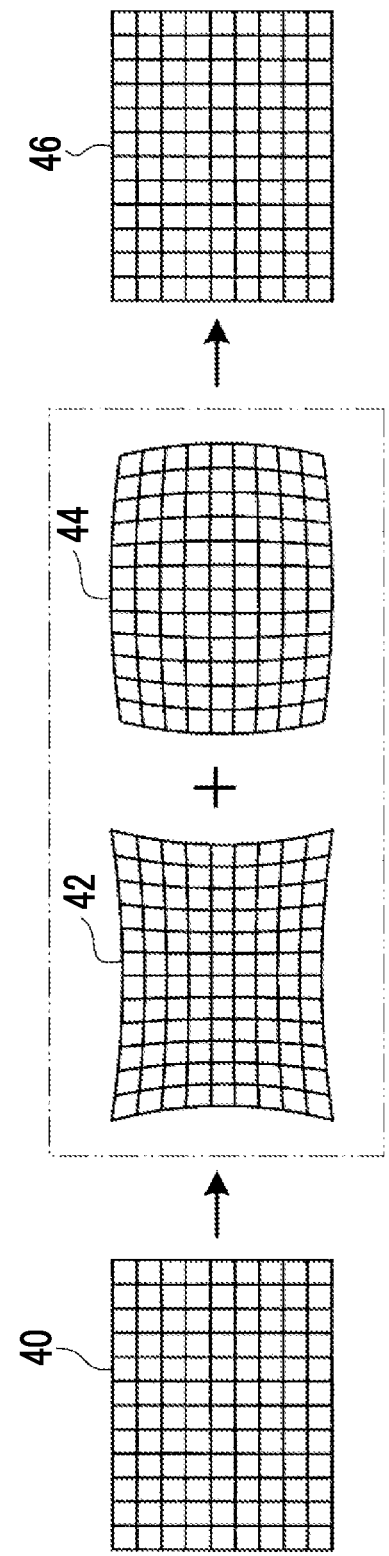
FIG. 4 is a concept diagram for describing correction of a distortion.

FIG. 4 illustrates a concept diagram for visual understanding of the above correction. In the imaging apparatus, the image sensor outputs a captured image 40 to the processor. As an example, the captured image 40 in FIG. 4 is a non-distorted lattice. An example of an event in the electronic view finder 5 is illustrated inside the frame of a double-dotted dashed line in FIG. 4. A distorted image 44 schematically shows the optical distortion of the image formed by the eyepiece lens 3 in a case where the lattice chart is used as the object. In a case where the eyepiece lens 3 causes an optical distortion of the barrel type represented by the distorted image 44 in FIG. 4, the processor performs the image processing on the captured image 40 to display a distorted image 42 having a television distortion of the bobbin type that offsets the optical distortion on the display element 1. An image 46 that is visible to the observer by looking at the electronic view finder 5 can be conceptually considered to be an addition of the distorted image 42 and the distorted image 44. The image 46 has a shape that is equivalent to the captured image 40 and that is obtained by suppressing the distortion. Contrary to the example in FIG. 4, in a case where the eyepiece lens 3 causes an optical distortion of the bobbin type, the display element 1 displays an image having a television distortion of the barrel type.

Figure 5:
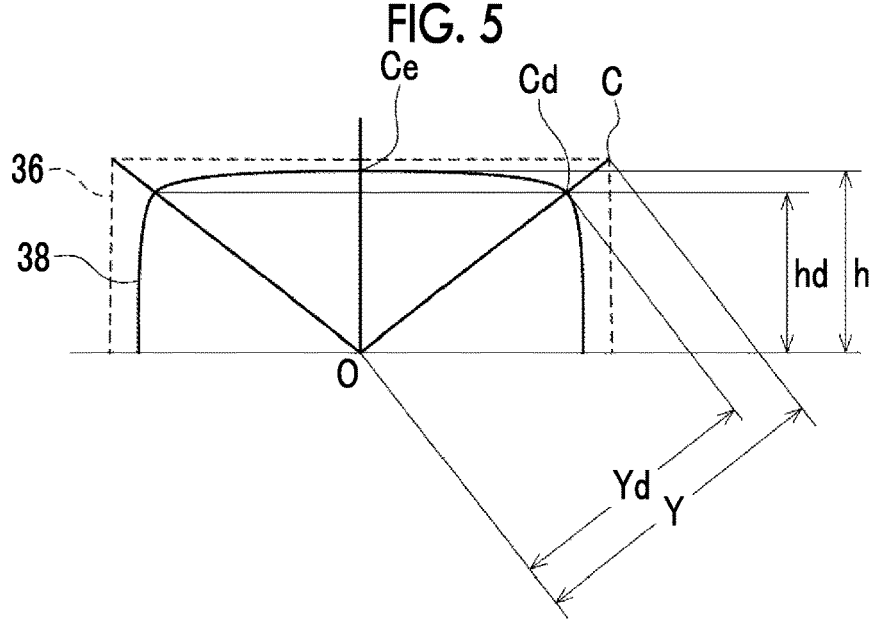
FIG. 5 is a diagram for describing the optical distortion and a television distortion.

While the optical distortion and the television distortion have different definitions, the optical distortion and the television distortion can be represented using a relational expression. The definitions of the optical distortion and the television distortion will be described with reference to FIG. 5. A point O in FIG. 5 is a point on the optical axis, and FIG. 5 is a diagram in a plane perpendicular to the optical axis. In FIG. 5, a shape of an ideal image 36 in a case where there is no distortion is illustrated by a dotted line, and a shape of an actual image 38 in a case where there is a distortion is illustrated by a solid line as an example. An apex C of the ideal image 36 corresponds to an apex Cd in the actual image 38.

As illustrated in FIG. 5, in a case where an image height of the apex C is denoted by Y, and an image height of the apex Cd is denoted by Yd, an optical distortion Dopt is represented by the following expression. A unit of Dopt is %.

$$Dopt=\{(Yd-Y)/Y\} \times 100$$

Here, Y>0 and Yd>0 are established. The actual image 38 in FIG. 5 satisfies Dopt<0 and shows a shape of the above barrel type. In a case of Dopt>0 unlike in FIG. 5, the actual image has a shape of the above bobbin type.

In addition, as illustrated in FIG. 5, in a case where a direction of a center point Ce on an upper side of the actual image 38 from the point O is a vertical direction, a height from the point O to the center point Ce in the vertical direction is denoted by h, and a height of the apex Cd in the vertical direction is denoted by hd, a television distortion Dtv is represented by the following expression. Here, the direction of the center point Ce from the point O is the vertical direction. A unit of Dtv is %.

$$Dtv=\{(hd-h)/2h\} \times 100$$

Here, h>0 and hd>0 are established. The actual image 38 illustrated in FIG. 5 satisfies Dtv<0 and has a shape (a shape of the above barrel type) that looks shrunk as the height is increased. In a case of Dopt>0 unlike in FIG. 5, the actual image has a shape (a shape of the above bobbin type) that looks stretched as the height is increased.

In a case where a ratio of a vertical screen length to a diagonal length of the display region 1a of the display element 1 is denoted by m, the television distortion and the optical distortion are approximately represented by the following relational expression.

$$Dtv=\{(1-m^2)/2\} \times Dopt$$

Next, preferable configurations of the electronic view finder 5 will be described. The preferable configurations and possible configurations described below are possible in any combination and are preferably appropriately selected to be employed in accordance with required specifications.

It is preferable that the third lens L3 is fixed during the diopter adjustment. By fixing the third lens L3 that is closest to the eyepoint EP side in the eyepiece lens 3, a dustproof property of the electronic view finder 5 is improved. In addition, while a cover glass for preventing dust from entering is generally disposed closest to the eyepoint EP side in the electronic view finder 5, the third lens L3 can be substituted for the cover glass in a configuration in which the third lens L3 is fixed. In a case of substituting, constituents of the electronic view finder 5 can be reduced. Thus, a total length can be shortened. Furthermore, by fixing the third lens L3, the diopter adjustment lens group is composed of only a part of the eyepiece lens 3, and a moving space of the diopter adjustment lens group is easily secured. Thus, a suitable diopter adjustment range is easily obtained (refer to FIG. 32 as an example).

In a case where only a part of the eyepiece lens 3 is used as the diopter adjustment lens group, a change in aberration during the diopter adjustment is increased, compared to a case where the entire eyepiece lens 3 is used as the diopter adjustment lens group. However, as in the above correction of the optical distortion by the display element 1, the change in aberration can be suppressed by displaying an image that cancels out the change in aberration occurring in the eyepiece lens on the display element 1.

In a case where the third lens L3 is fixed during the diopter adjustment, it is preferable that the third lens L3 is an optical element closest to the eyepoint EP side. As described above, in a case where the third lens L3 is used as the optical element closest to the eyepoint EP side to substitute for the cover glass for preventing dust from entering, the total length can be shortened. In the disclosed technology, an optical element provided in the electronic view finder 5 means an optical element between eyes of the observer and the display element 1 in a case where the observer performs observation. This also applies to a state where the electronic view finder 5 is mounted in the imaging apparatus.

In a case where the third lens L3 is the optical element closest to the eyepoint EP side, it is preferable that a material of the third lens L3 is a material having a knoop hardness of greater than or equal to 450 N/mm² in order to improve scratch resistance. Here, N and mm are units and are newton and millimeter, respectively. This hardness condition corresponds to a case where the material of the third lens L3 is glass. In a case where the material of the third lens L3 is resin, it is preferable that hard coating is performed on a surface of the third lens L3 on the eyepoint EP side.

For example, the knoop hardness can be measured using the method described below. An indentation is made by applying a load of 0.9807 N to a square pyramidal diamond indenter for 15 seconds on a planar polished glass surface. A square pyramidal diamond indenter that has diagonal edge angles of 172.5 degrees and 130 degrees and that has a rhombic horizontal cross section is used. A knoop hardness Hk is obtained using the following expression by measuring a length of a longer diagonal line of the generated permanent indentation.

$$Hk=1.451 \times (F/L^2)$$

Here, F denotes the load in Newton units, and L denotes the length of the longer diagonal line of the indentation in millimeter units.

In the electronic view finder 5, it is preferable that the first lens L1 is fixed during the diopter adjustment. While a cover glass is generally disposed as an optical element closest to the display element 1 side in the electronic view finder 5, the first lens can be substituted for the cover glass in a configuration in which the first lens L1 is fixed. In a case of substituting, the constituents of the electronic view finder 5 can be reduced. Thus, the total length can be shortened. Furthermore, by fixing the first lens L1, the diopter adjustment lens group is composed of only a part of the eyepiece lens 3, and the moving space of the diopter adjustment lens group is easily secured. Thus, a suitable diopter adjustment range is easily obtained (refer to FIG. 32 as an example).

In a case where the first lens L1 is fixed during the diopter adjustment, it is preferable that the first lens L1 is the optical element closest to the display element 1 side. As described above, in a case where the first lens L1 is used as the optical element closest to the display element 1 side to substitute for the cover glass, the total length can be shortened.

In a case where a maximum value of refractive indexes of materials of all lenses provided in the eyepiece lens 3 with respect to a d line is denoted by Nmax, the electronic view finder 5 preferably satisfies Conditional Expression (1) below. By causing Conditional Expression (1) not to be less than or equal to a lower limit thereof, an increase in Petzval sum can be suppressed. Thus, advantage for correcting a field curvature is achieved. By causing Conditional Expression (1) not to be greater than or equal to an upper limit thereof, limiting a material selectable as a lens material to a material having a small Abbe number can be prevented. Thus, advantage for correcting a chromatic aberration is achieved. In addition, by causing Conditional Expression (1) not to be greater than or equal to the upper limit thereof, it is possible to contribute to improvement of productivity in processing the material. In order to obtain more favorable characteristics, the electronic view finder 5 more preferably satisfies Conditional Expression (1-1) below and still more preferably satisfies Conditional Expression (1-2) below.

$$1.78 < Nmax < 2 \quad (1)$$

$$1.79 < Nmax < 1.94 \quad (1-1)$$

$$1.8 < Nmax < 1.92 \quad (1-2)$$

In a case where a focal length of the first lens L1 is denoted by f1, and a focal length of the third lens L3 is denoted by f3, the electronic view finder 5 preferably satisfies Conditional Expression (2) below. By causing Conditional Expression (2) not to be less than or equal to a lower limit thereof, a decrease in refractive power of the third lens L3 can be suppressed. Thus, advantage for suppressing an astigmatism and a spherical aberration is achieved. Since the third lens L3 is a positive lens, the first lens L1 satisfying Conditional Expression (2) is a positive lens. Accordingly, the second lens L2 is a negative lens. By causing Conditional Expression (2) not to be greater than or equal to an upper limit thereof, a decrease in positive refractive power of the first lens L1 can be suppressed. Thus, a relatively excessive influence of negative refractive power of the second lens L2 can be suppressed. Accordingly, advantage for correcting the astigmatism and the field curvature is achieved. In order to obtain more favorable characteristics, the electronic view finder 5 more preferably satisfies Conditional Expression (2-1) below and still more preferably satisfies Conditional Expression (2-2) below.

$$0.2 \leq f1/f3 < 1.8 \quad (2)$$

$$0.4 \leq f1/f3 < 1.75 \quad (2-1)$$

$$0.6 \leq f1/f3 < 1.7 \quad (2-2)$$

In a case where a paraxial curvature radius of a surface of the second lens L2 on the display element 1 side is denoted by R2f, and a paraxial curvature radius of a surface of the second lens L2 on the eyepoint EP side is denoted by R2r, the electronic view finder 5 preferably satisfies Conditional Expression (3) below. By causing Conditional Expression (3) not to be less than or equal to a lower limit thereof, an increase in refraction of a ray by the surface of the second lens L2 on the eyepoint EP side can be suppressed. Thus, advantage for suppressing a lateral chromatic aberration is achieved. By causing Conditional Expression (3) not to be greater than or equal to an upper limit thereof, an increase in refraction of a ray by the surface of the second lens L2 on the display element 1 side can be suppressed. Thus, advantage for suppressing the field curvature is achieved. In order to obtain more favorable characteristics, the electronic view finder 5 more preferably satisfies Conditional Expression (3-1) below and still more preferably satisfies Conditional Expression (3-2) below.

$$-5 < (R2r + R2f)/(R2r - R2f) < 0.61 \quad (3)$$

$$-4 < (R2r + R2f)/(R2r - R2f) < 0.6 \quad (3-1)$$

$$-3 < (R2r + R2f)/(R2r - R2f) < 0.45 \quad (3-2)$$

In a case where a distance on the optical axis AX from a surface of the first lens L1 on the display element 1 side to the surface of the third lens L3 on the eyepoint EP side in a state where the diopter is −1 diopter is denoted by dL, and a sum of an air conversion distance on the optical axis AX from a display surface of the display element 1 to the surface of the first lens L1 on the display element 1 side in a state where the diopter is −1 diopter and of dL is denoted by TL, the electronic view finder 5 preferably satisfies Conditional Expression (4) below. By causing Conditional Expression (4) not to be less than or equal to a lower limit thereof, a steep angle of the ray passing through the eyepiece lens 3 can be suppressed. Thus, advantage for aberration correction is achieved. By causing Conditional Expression (4) not to be greater than or equal to an upper limit thereof, a focal length of the eyepiece lens 3 is easily shortened. Thus, advantage for securing a wide apparent field of view is achieved. In order to obtain more favorable characteristics, the electronic view finder 5 more preferably satisfies Conditional Expression (4-1) below and still more preferably satisfies Conditional Expression (4-2) below.

$$0.4 < dL/TL < 0.95 \quad (4)$$

$$0.45 < dL/TL < 0.9 \quad (4-1)$$

$$0.7 < dL/TL < 0.85 \quad (4-2)$$

Figure 6:
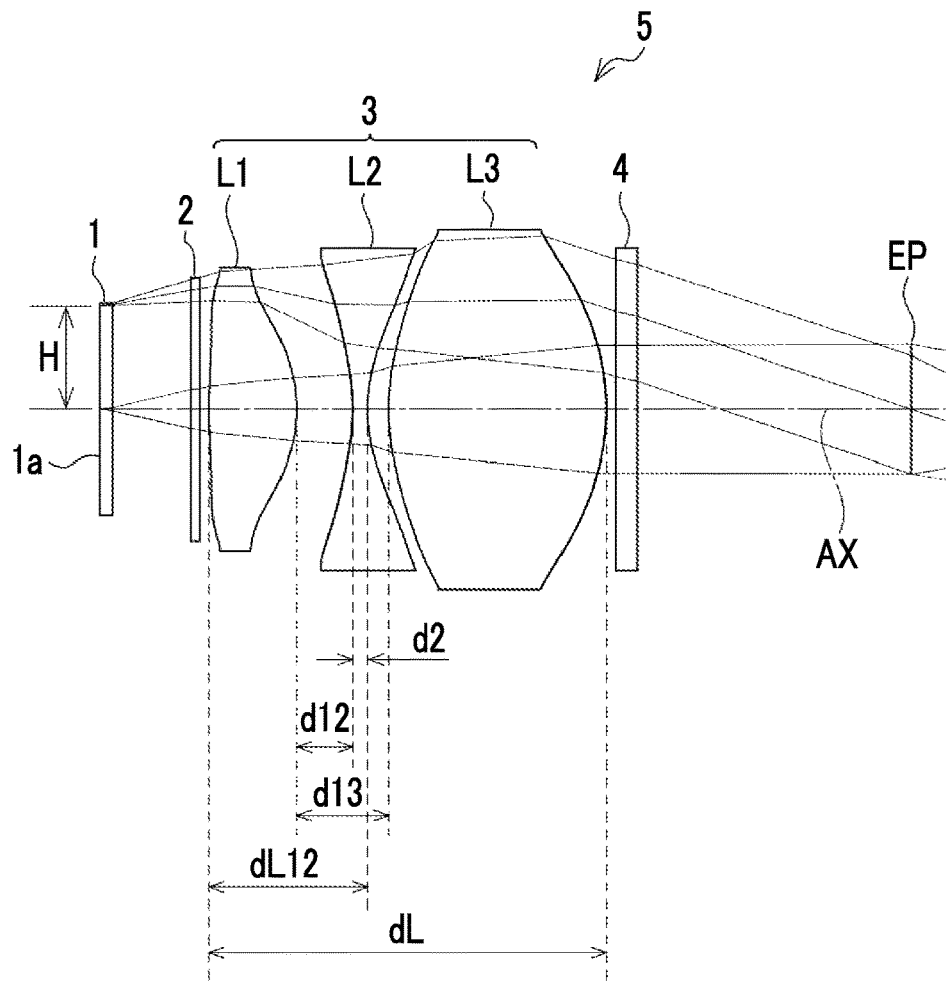
FIG. 6 is a cross section diagram illustrating a configuration and luminous flux of an electronic view finder of Example 1.

FIG. 6 illustrates dL in the electronic view finder 5 in FIG. 1 as an example. In FIG. 6, d2, d12, d13, dL12, and H related to conditional expressions described later are also illustrated, and on-axis luminous flux and off-axis luminous flux corresponding to a maximum apparent field of view are also illustrated. Other basic illustration methods of FIG. 6 are the same as those of FIG. 1. The display surface of the display element 1 is a surface on which the display region 1a is formed, and corresponds to a surface of the display element 1 on a left side in FIG. 6.

In a configuration in which the eyepiece lens 3 consists of a positive lens, a negative lens, and a positive lens in order from the display element 1 side to the eyepoint EP side, in a case where a distance on the optical axis AX from a surface of the first lens L1 on the eyepoint EP side to a surface of the third lens L3 on the display element 1 side in a state where the diopter is −1 diopter is denoted by d13, and a focal length of the second lens L2 is denoted by f2, the electronic view finder 5 preferably satisfies Conditional Expression (5) below. By causing Conditional Expression (5) not to be less than or equal to a lower limit thereof, advantage for securing a moving amount of the diopter adjustment lens group during the diopter adjustment is achieved. By causing Conditional Expression (5) not to be greater than or equal to an upper limit thereof, an increase in negative refractive power of the second lens L2 can be suppressed. Thus, advantage for correcting the astigmatism and the field curvature is achieved. In order to obtain more favorable characteristics, the electronic view finder 5 more preferably satisfies Conditional Expression (5-1) below and still more preferably satisfies Conditional Expression (5-2) below.

$$0.1 < d13/|f2| < 4 \quad (5)$$

$$0.15 < d13/|f2| < 3.5 \quad (5\text{-}1)$$

$$0.3 < d13/|f2| < 3 \quad (5\text{-}2)$$

In a case where a paraxial curvature radius of the surface of the first lens L1 on the display element 1 side is denoted by $R1f$, and a paraxial curvature radius of the surface of the first lens L1 on the eyepoint EP side is denoted by $R1r$, the electronic view finder 5 preferably satisfies Conditional Expression (6) below. By causing Conditional Expression (6) not to be less than or equal to a lower limit thereof, a decrease in negative refractive power of the surface of the first lens L1 on the eyepoint EP side can be suppressed. Thus, advantage for suppressing the field curvature is achieved. By causing Conditional Expression (6) not to be greater than or equal to an upper limit thereof, an increase in refractive power of the surface of the first lens L1 on the display element 1 side can be suppressed. Thus, advantage for suppressing a distortion is achieved. In order to obtain more favorable characteristics, the electronic view finder 5 more preferably satisfies Conditional Expression (6-1) below and still more preferably satisfies Conditional Expression (6-2) below.

$$-3.5 < (R1r+R1f)/(R1r-R1f) < 2 \quad (6)$$

$$-3 < (R1r+R1f)/(R1r-R1f) < 1.5 \quad (6\text{-}1)$$

$$-2.5 < (R1r+R1f)/(R1r-R1f) < 1 \quad (6\text{-}2)$$

In a case where a paraxial curvature radius of the surface of the third lens L3 on the display element 1 side is denoted by $R3f$, and a paraxial curvature radius of the surface of the third lens L3 on the eyepoint EP side is denoted by $R3r$, the electronic view finder 5 preferably satisfies Conditional Expression (7) below. By causing Conditional Expression (7) not to be less than or equal to a lower limit thereof, an excessive increase in refractive power of the surface of the third lens L3 on the eyepoint EP side can be suppressed. Thus, advantage for correcting the spherical aberration and for securing a high eyepoint is achieved. By causing Conditional Expression (7) not to be greater than or equal to an upper limit thereof, a decrease in refractive power of the surface of the third lens L3 on the eyepoint EP side can be suppressed. Thus, advantage for suppressing the field curvature and the astigmatism is achieved. In order to obtain more favorable characteristics, the electronic view finder 5 more preferably satisfies Conditional Expression (7-1) below and still more preferably satisfies Conditional Expression (7-2) below.

$$-5 < (R3r+R3f)/(R3r-R3f) < 0.5 \quad (7)$$

$$-4.5 < (R3r+R3f)/(R3r-R3f) < 0.3 \quad (7\text{-}1)$$

$$-0.72 < (R3r+R3f)/(R3r-R3f) < 0.15 \quad (7\text{-}2)$$

In a case where the paraxial curvature radius of the surface of the second lens L2 on the eyepoint EP side is denoted by $R2r$, and the paraxial curvature radius of the surface of the third lens L3 on the display element 1 side is denoted by $R3f$, the electronic view finder 5 preferably satisfies Conditional Expression (8) below. By causing Conditional Expression (8) not to be less than or equal to a lower limit thereof, an excessive increase in refraction of an off-axis ray by the surface of the third lens L3 on the display element 1 side with respect to refraction of the off-axis ray by the surface of the second lens L2 on the eyepoint EP side can be suppressed. Thus, advantage for correcting the spherical aberration and for securing a high eyepoint is achieved. By causing Conditional Expression (8) not to be greater than or equal to an upper limit thereof, a decrease in refraction of the off-axis ray by the surface of the third lens L3 on the display element 1 side with respect to refraction of the off-axis ray by the surface of the second lens L2 on the eyepoint EP side can be suppressed. Thus, advantage for suppressing the field curvature and the astigmatism is achieved. In order to obtain more favorable characteristics, the electronic view finder 5 more preferably satisfies Conditional Expression (8-1) below and still more preferably satisfies Conditional Expression (8-2) below.

$$-0.5 < (R3f-R2r)/(R3f+R2r) < 1.5 \quad (8)$$

$$-0.45 < (R3f-R2r)/(R3f+R2r) < 1.2 \quad (8\text{-}1)$$

$$-0.15 < (R3f-R2r)/(R3f+R2r) < 1 \quad (8\text{-}2)$$

In a case where the paraxial curvature radius of the surface of the first lens L1 on the eyepoint EP side is denoted by $R1r$, and the paraxial curvature radius of the surface of the second lens L2 on the display element 1 side is denoted by $R2f$, the electronic view finder 5 preferably satisfies Conditional Expression (9) below. By causing Conditional Expression (9) not to be less than or equal to a lower limit thereof, an excessive increase in refraction of the off-axis ray by the surface of the second lens L2 on the display element 1 side with respect to refraction of the off-axis ray by the surface of the first lens L1 on the eyepoint EP side can be suppressed. Thus, advantage for suppressing excessive correction of the lateral chromatic aberration is achieved. By causing Conditional Expression (9) not to be greater than or equal to an upper limit thereof, a decrease in refraction of the off-axis ray by the surface of the second lens L2 on the display element 1 side with respect to refraction of the off-axis ray by the surface of the first lens L1 on the eyepoint EP side can be suppressed. Thus, advantage for suppressing insufficient correction of the lateral chromatic aberration is achieved. In order to obtain more favorable characteristics, the electronic view finder 5 more preferably satisfies Conditional Expression (9-1) below and still more preferably satisfies Conditional Expression (9-2) below.

$$-30 < (R2f-R1r)/(R2f+R1r) < 1.5 \quad (9)$$

$$-29 < (R2f-R1r)/(R2f+R1r) < 1.2 \quad (9\text{-}1)$$

$$-0.25 < (R2f-R1r)/(R2f+R1r) < 0.5 \quad (9\text{-}2)$$

In a case where the focal length of the eyepiece lens 3 in a state where the diopter is −1 diopter is denoted by f, and the paraxial curvature radius of the surface of the third lens L3 on the eyepoint EP side is denoted by $R3r$, the electronic view finder 5 preferably satisfies Conditional Expression (10) below. By causing Conditional Expression (10) not to be less than or equal to a lower limit thereof, an increase in refractive power of the surface of the third lens L3 on the eyepoint EP side can be suppressed. Thus, advantage for securing a high eyepoint is achieved. By causing Conditional Expression (10) not to be greater than or equal to an upper limit thereof, a decrease in refractive power of the third lens L3 can be suppressed. Thus, advantage for suppressing the astigmatism and the spherical aberration is achieved. In order to obtain more favorable characteristics, the electronic view finder 5 more preferably satisfies Conditional Expression (10-1) below and still more preferably satisfies Conditional Expression (10-2) below.

$$-3 < f/R3r < -0.2 \tag{10}$$

$$-2.5 < f/R3r < -0.3 \tag{10-1}$$

$$-1.3 < f/R3r < -0.4 \tag{10-2}$$

In a case where the focal length of the eyepiece lens 3 in a state where the diopter is −1 diopter is denoted by f, and the focal length of the first lens L1 is denoted by f1, the electronic view finder 5 preferably satisfies Conditional Expression (11) below. Since f>0 is established, the first lens L1 satisfying Conditional Expression (11) is a positive lens. Accordingly, the second lens L2 is a negative lens. By causing Conditional Expression (11) not to be less than or equal to a lower limit thereof, a decrease in positive refractive power of the first lens L1 can be suppressed. Thus, a relatively excessive influence of negative refractive power of the second lens L2 can be suppressed. Accordingly, advantage for correcting the astigmatism and the field curvature is achieved. By causing Conditional Expression (11) not to be greater than or equal to an upper limit thereof, a decrease in refractive power of the eyepiece lens 3 can be suppressed. Thus, advantage for securing a wide apparent field of view is achieved. In order to obtain more favorable characteristics, the electronic view finder 5 more preferably satisfies Conditional Expression (11-1) below and still more preferably satisfies Conditional Expression (11-2) below.

$$0.89 < f/f1 < 3 \tag{11}$$

$$0.95 < f/f1 < 2.5 \tag{11-1}$$

$$1 < f/f1 < 2 \tag{11-2}$$

In a case where the focal length of the eyepiece lens 3 in a state where the diopter is −1 diopter is denoted by f, and the focal length of the third lens L3 is denoted by f3, the electronic view finder 5 preferably satisfies Conditional Expression (12) below. By causing Conditional Expression (12) not to be less than or equal to a lower limit thereof, a decrease in refractive power of the third lens L3 can be suppressed. Thus, advantage for suppressing the astigmatism and the spherical aberration is achieved. By causing Conditional Expression (12) not to be greater than or equal to an upper limit thereof, a decrease in refractive power of the eyepiece lens 3 can be suppressed. Thus, advantage for securing a wide apparent field of view is achieved. In order to obtain more favorable characteristics, the electronic view finder 5 more preferably satisfies Conditional Expression (12-1) below and still more preferably satisfies Conditional Expression (12-2) below.

$$0.05 < f/f3 < 3 \tag{12}$$

$$0.15 < f/f3 < 2.5 \tag{12-1}$$

$$1 < f/f3 < 2 \tag{12-2}$$

In a configuration in which the eyepiece lens 3 consists of a positive lens, a negative lens, and a positive lens in order from the display element 1 side to the eyepoint EP side, in a case where the focal length of the eyepiece lens 3 in a state where the diopter is −1 diopter is denoted by f, and the focal length of the second lens L2 is denoted by f2, the electronic view finder 5 preferably satisfies Conditional Expression (13) below. By causing Conditional Expression (13) not to be less than or equal to a lower limit thereof, a decrease in negative refractive power of the second lens L2 and a decrease in divergence of the ray heading toward the third lens L3 from the second lens L2 can be suppressed. Thus, in a case of securing a wide apparent field of view, the eyepiece lens 3 satisfying Conditional Expression (13) is advantageous for size reduction in a total length direction. By causing Conditional Expression (13) not to be greater than or equal to an upper limit thereof, a decrease in refractive power of the eyepiece lens 3 can be suppressed. Thus, advantage for securing a wide apparent field of view is achieved. In order to obtain more favorable characteristics, the electronic view finder 5 more preferably satisfies Conditional Expression (13-1) below and still more preferably satisfies Conditional Expression (13-2) below.

$$0.1 < f/|f2| < 3.3 \tag{13}$$

$$0.15 < f/|f2| < 3 \tag{13-1}$$

$$0.5 < f/|f2| < 2.7 \tag{13-2}$$

In a case where the focal length of the eyepiece lens 3 in a state where the diopter is −1 diopter is denoted by f, and a focal length of the diopter adjustment lens group is denoted by fd, the electronic view finder 5 preferably satisfies Conditional Expression (14) below. By causing Conditional Expression (14) not to be less than or equal to a lower limit thereof, a decrease in refractive power of the diopter adjustment lens group can be suppressed. Thus, advantage for suppressing the moving amount of the diopter adjustment lens group during the diopter adjustment is achieved, and it is possible to contribute to shortening of the total length. By causing Conditional Expression (14) not to be greater than or equal to an upper limit thereof, a decrease in refractive power of the eyepiece lens 3 can be suppressed. Thus, advantage for securing a wide apparent field of view is achieved. In order to obtain more favorable characteristics, the electronic view finder 5 more preferably satisfies Conditional Expression (14-1) below and still more preferably satisfies Conditional Expression (14-2) below.

$$0.01 < f/|fd| < 4 \tag{14}$$

$$0.02 < f/|fd| < 3.5 \tag{14-1}$$

$$1.1 < f/|fd| < 3 \tag{14-2}$$

In a case where the distance on the optical axis AX from the surface of the first lens L1 on the eyepoint EP side to the surface of the third lens L3 on the display element 1 side in a state where the diopter is −1 diopter is denoted by d13, and the focal length of the diopter adjustment lens group is denoted by fd, the electronic view finder 5 preferably satisfies Conditional Expression (15) below. By causing Conditional Expression (15) not to be less than or equal to a lower limit thereof, advantage for securing the moving amount of the diopter adjustment lens group during the diopter adjustment is achieved. By causing Conditional Expression (15) not to be greater than or equal to an upper limit thereof, the focal length of the eyepiece lens 3 is easily shortened. Thus, advantage for securing a wide apparent field of view is achieved, and advantage for shortening the total length is achieved. In order to obtain more favorable characteristics, the electronic view finder 5 more preferably satisfies Conditional Expression (15-1) below and still more preferably satisfies Conditional Expression (15-2) below.

$$0.01 < d13/|fd| < 2 \qquad (15)$$

$$0.015 < d13/|fd| < 1.6 \qquad (15\text{-}1)$$

$$0.4 < d13/|fd| < 1.4 \qquad (15\text{-}2)$$

In a case where the sum of the air conversion distance on the optical axis AX from the display surface of the display element 1 to the surface of the first lens L1 on the display element 1 side and of the distance on the optical axis AX from the surface of the first lens L1 on the display element 1 side to the surface of the third lens L3 on the eyepoint EP side in a state where the diopter is −1 diopter is denoted by TL, and a focal length of the negative lens provided in the eyepiece lens 3 is denoted by fn, the electronic view finder 5 preferably satisfies Conditional Expression (16) below. By causing Conditional Expression (16) not to be less than or equal to a lower limit thereof, an increase in refractive power of the negative lens can be suppressed. Thus, advantage for the aberration correction is achieved. By causing Conditional Expression (16) not to be greater than or equal to an upper limit thereof, a decrease in negative refractive power in the eyepiece lens 3 can be suppressed. Thus, advantage for size reduction in the total length direction in a case of securing a wide apparent field of view is achieved. In order to obtain more favorable characteristics, the electronic view finder 5 more preferably satisfies Conditional Expression (16-1) below and still more preferably satisfies Conditional Expression (16-2) below.

$$-6 < TL/fn < -0.5 \qquad (16)$$

$$-5 < TL/fn < -0.55 \qquad (16\text{-}1)$$

$$-4 < TL/fn < -0.6 \qquad (16\text{-}2)$$

In a configuration in which the eyepiece lens 3 consists of a positive lens, a negative lens, and a positive lens in order from the display element 1 side to the eyepoint EP side, in a case where the focal length of the eyepiece lens 3 in a state where the diopter is −1 diopter is denoted by f, and a combined focal length of the first lens L1 and the second lens L2 in a state where the diopter is −1 diopter is denoted by f12, the electronic view finder 5 preferably satisfies Conditional Expression (17) below. By causing Conditional Expression (17) not to be less than or equal to a lower limit thereof, a decrease in positive combined refractive power of the first lens L1 and the second lens L2 can be suppressed. Thus, an increase in negative refractive power of the second lens L2 can be suppressed. Accordingly, advantage for correcting various aberrations such as the astigmatism and the field curvature is achieved. By causing Conditional Expression (17) not to be greater than or equal to an upper limit thereof, an increase in positive combined refractive power of the first lens L1 and the second lens L2 can be suppressed. Thus, advantage for securing a wide apparent field of view and for securing a high eyepoint is achieved. In order to obtain more favorable characteristics, the electronic view finder 5 more preferably satisfies Conditional Expression (17-1) below and still more preferably satisfies Conditional Expression (17-2) below.

$$0.1 < f/f12 < 2 \qquad (17)$$

$$0.15 < f/f12 < 1.5 \qquad (17\text{-}1)$$

$$0.2 \le f/f12 < 1 \qquad (17\text{-}2)$$

In a configuration in which the eyepiece lens 3 consists of a positive lens, a negative lens, and a positive lens in order from the display element 1 side to the eyepoint EP side, in a case where the focal length of the first lens L1 is denoted by f1, and the focal length of the second lens L2 is denoted by f2, the electronic view finder 5 preferably satisfies Conditional Expression (18) below. By causing Conditional Expression (18) not to be less than or equal to a lower limit thereof, an increase in negative refractive power of the second lens L2 can be suppressed. Thus, advantage for suppressing the astigmatism and for correcting the field curvature is achieved. By causing Conditional Expression (18) not to be greater than or equal to an upper limit thereof, a decrease in negative refractive power of the second lens L2 and a decrease in divergence of the ray heading toward the third lens L3 from the second lens L2 can be suppressed. Thus, advantage for size reduction in the total length direction in a case of securing a wide apparent field of view is achieved. In order to obtain more favorable characteristics, the electronic view finder 5 more preferably satisfies Conditional Expression (18-1) below and still more preferably satisfies Conditional Expression (18-2) below.

$$-2.5 < f1/f2 < -0.1 \qquad (18)$$

$$-2.1 < f1/f2 < -0.5 \qquad (18\text{-}1)$$

$$-1.7 < f1/f2 < -0.9 \qquad (18\text{-}2)$$

In a case where the focal length of the second lens L2 is denoted by f2, and the focal length of the third lens L3 is denoted by f3, the electronic view finder 5 preferably satisfies Conditional Expression (19) below. By causing Conditional Expression (19) not to be less than or equal to a lower limit thereof, a decrease in negative refractive power of the second lens L2 and a decrease in divergence of the ray heading toward the third lens L3 from the second lens L2 can be suppressed. Thus, advantage for size reduction in the total length direction in a case of securing a wide apparent field of view is achieved. By causing Conditional Expression (19) not to be greater than or equal to an upper limit thereof, a decrease in refractive power of the third lens L3 can be suppressed. Thus, advantage for suppressing the astigmatism and the spherical aberration is achieved. In order to obtain more favorable characteristics, the electronic view finder 5 more preferably satisfies Conditional Expression (19-1) below and still more preferably satisfies Conditional Expression (19-2) below.

$$-3 < f2/f3 < -0.1 \qquad (19)$$

$$-2 < f2/f3 < -0.3 \qquad (19\text{-}1)$$

$$-1 < f2/f3 < -0.5 \qquad (19\text{-}2)$$

In a case where a half value of a longest diameter of the display region 1a in the display element 1 is denoted by H, and the focal length of the eyepiece lens 3 in a state where the diopter is −1 diopter is denoted by f, the electronic view finder 5 preferably satisfies Conditional Expression (20) below. By causing Conditional Expression (20) not to be less than or equal to a lower limit thereof, advantage for widening the apparent field of view is achieved. By causing Conditional Expression (20) not to be greater than or equal to an upper limit thereof, advantage for suppressing aberrations such as the field curvature is achieved. In order to obtain more favorable characteristics, the electronic view finder 5 more preferably satisfies Conditional Expression (20-1) below and still more preferably satisfies Conditional Expression (20-2) below.

$$0.33 < H/f < 0.7 \quad (20)$$

$$0.34 < H/f < 0.65 \quad (20\text{-}1)$$

$$0.345 < H/f < 0.6 \quad (20\text{-}2)$$

In the present specification, the "longest diameter of the display region 1*a* in the display element 1" related to H means a value of twice a distance between the optical axis AX and a point farthest from the optical axis AX in a diameter direction in the display region 1*a* that coincides with the optical axis AX at a centroid thereof. For example, in a case where the display region 1*a* has a rectangular shape, a length of a half of a diagonal line of the display region 1*a* can be set as H. In addition, for example, in a case where the display region 1*a* is a perfect circle, a radius of the display region 1*a* can be set as H. In a case where the display region 1*a* is an ellipse, a half of a longest diameter (major axis) among diameters of the display region 1*a* can be set as H.

In addition, the display region 1*a* means a region in which the image is actually displayed. For example, in a case where the display element 1 comprises a display unit of an aspect ratio of 4:3 in which a plurality of pixels are arranged, and an image of an aspect ratio of 3:2 is displayed in a part of the display unit, the display region 1*a* refers to a region in which the image of the aspect ratio of 3:2 is displayed. Accordingly, a diameter of the display element 1 does not necessarily coincide with the longest diameter of the display region 1*a*.

In a case where the distance on the optical axis AX from the surface of the first lens L1 on the display element 1 side to the surface of the third lens L3 on the eyepoint EP side in a state where the diopter is −1 diopter is denoted by dL, and the focal length of the eyepiece lens 3 in a state where the diopter is −1 diopter is denoted by f, the electronic view finder 5 preferably satisfies Conditional Expression (21) below. By causing Conditional Expression (21) not to be less than or equal to a lower limit thereof, a decrease in refractive power of the eyepiece lens 3 can be suppressed. Thus, advantage for securing a wide apparent field of view is achieved. By causing Conditional Expression (21) not to be greater than or equal to an upper limit thereof, advantage for shortening the total length is achieved. In order to obtain more favorable characteristics, the electronic view finder 5 more preferably satisfies Conditional Expression (21-1) below and still more preferably satisfies Conditional Expression (21-2) below.

$$0.9 < dL/f < 2.4 \quad (21)$$

$$0.95 < dL/f < 2 \quad (21\text{-}1)$$

$$0.985 < dL/f < 1.5 \quad (21\text{-}2)$$

In a case where a distance on the optical axis AX from the surface of the first lens L1 on the display element 1 side to the surface of the second lens L2 on the eyepoint EP side in a state where the diopter is −1 diopter is denoted by dL12, and a sum of the air conversion distance on the optical axis AX from the display surface of the display element 1 to the surface of the first lens L1 on the display element 1 side and of the distance on the optical axis AX from the surface of the first lens L1 on the display element 1 side to the surface of the second lens L2 on the eyepoint EP side in a state where the diopter is −1 diopter is denoted by T2, the electronic view finder 5 preferably satisfies Conditional Expression (22) below. By causing Conditional Expression (22) not to be less than or equal to a lower limit thereof, a decrease in refractive power of the eyepiece lens 3 can be suppressed. Thus, advantage for securing a wide apparent field of view is achieved. By causing Conditional Expression (22) not to be greater than or equal to an upper limit thereof, advantage for shortening the total length is achieved. In order to obtain more favorable characteristics, the electronic view finder 5 more preferably satisfies Conditional Expression (22-1) below and still more preferably satisfies Conditional Expression (22-2) below.

$$0.4 < dL12/T2 < 0.9 \quad (22)$$

$$0.45 < dL12/T2 < 0.8 \quad (22\text{-}1)$$

$$0.55 < dL12/T2 < 0.7 \quad (22\text{-}2)$$

In a case where a distance on the optical axis AX from the surface of the first lens L1 on the eyepoint EP side to the surface of the second lens L2 on the display element 1 side in a state where the diopter is −1 diopter is denoted by d12, and a thickness of the second lens L2 on the optical axis AX is denoted by d2, the electronic view finder 5 preferably satisfies Conditional Expression (23) below. By causing Conditional Expression (23) not to be less than or equal to a lower limit thereof, a distance for increasing a luminous flux diameter is easily secured. Thus, advantage for widening the apparent field of view is achieved. By causing Conditional Expression (23) not to be greater than or equal to an upper limit thereof, a sufficient thickness of the second lens L2 is easily secured. Thus, advantage for correcting the lateral chromatic aberration is achieved. In order to obtain more favorable characteristics, the electronic view finder 5 more preferably satisfies Conditional Expression (23-1) below and still more preferably satisfies Conditional Expression (23-2) below.

$$0.15 < d12/d2 < 12 \quad (23)$$

$$0.16 < d12/d2 < 11 \quad (23\text{-}1)$$

$$0.2 < d12/d2 < 10 \quad (23\text{-}2)$$

In a case where the half value of the longest diameter of the display region in the display element 1 is denoted by H, and the sum of the air conversion distance on the optical axis AX from the display surface of the display element 1 to the surface of the first lens L1 on the display element 1 side and of the distance on the optical axis AX from the surface of the first lens L1 on the display element 1 side to the surface of the third lens L3 on the eyepoint EP side in a state where the diopter is −1 diopter is denoted by TL, the electronic view finder 5 preferably satisfies Conditional Expression (24) below. By causing Conditional Expression (24) not to be less than or equal to a lower limit thereof, a decrease in refractive power of the eyepiece lens 3 can be suppressed. Thus, advantage for securing a wide apparent field of view is achieved. By causing Conditional Expression (24) not to be greater than or equal to an upper limit thereof, advantage for suppressing aberrations such as the field curvature is achieved. In order to obtain more favorable characteristics, the electronic view finder 5 more preferably satisfies Conditional Expression (24-1) below and still more preferably satisfies Conditional Expression (24-2) below.

$$0.1 < H/TL < 0.5 \quad (24)$$

$$0.15 < H/TL < 0.4 \quad (24\text{-}1)$$

$$0.23 < H/TL < 0.3 \quad (24\text{-}2)$$

In a case where the air conversion distance on the optical axis AX from the display surface of the display element 1 to the surface of the first lens L1 on the display element 1 side in a state where the diopter is −1 diopter is denoted by d01, and the focal length of the eyepiece lens 3 in a state where the diopter is −1 diopter is denoted by f, the electronic view finder 5 preferably satisfies Conditional Expression (25) below. By causing Conditional Expression (25) not to be less than or equal to a lower limit thereof, a decrease in refractive power of the eyepiece lens 3 can be suppressed. Thus, advantage for securing a wide apparent field of view is achieved. By causing Conditional Expression (25) not to be greater than or equal to an upper limit thereof, advantage for shortening the total length is achieved. In order to obtain more favorable characteristics, the electronic view finder 5 more preferably satisfies Conditional Expression (25-1) below and still more preferably satisfies Conditional Expression (25-2) below.

$$0.1 < d01/f < 0.8 \quad (25)$$

$$0.18 < d01/f < 0.6 \quad (25\text{-}1)$$

$$0.22 < d01/f < 0.45 \quad (25\text{-}2)$$

In a case where the distance on the optical axis AX from the surface of the first lens L1 on the eyepoint EP side to the surface of the second lens L2 on the display element 1 side in a state where the diopter is −1 diopter is denoted by d12, and the sum of the air conversion distance on the optical axis AX from the display surface of the display element 1 to the surface of the first lens L1 on the display element 1 side and of the distance on the optical axis AX from the surface of the first lens L1 on the display element 1 side to the surface of the third lens L3 on the eyepoint EP side in a state where the diopter is −1 diopter is denoted by TL, the electronic view finder 5 preferably satisfies Conditional Expression (26) below. By causing Conditional Expression (26) not to be less than or equal to a lower limit thereof, a decrease in refractive power of the eyepiece lens 3 can be suppressed. Thus, advantage for securing a wide apparent field of view is achieved. By causing Conditional Expression (26) not to be greater than or equal to an upper limit thereof, the total length that is an appropriate length for bending the diverging ray to converge can be secured. Thus, a steep change in angle of the ray can be prevented. Accordingly, advantage for correcting aberrations such as the chromatic aberration and the field curvature is achieved. In order to obtain more favorable characteristics, the electronic view finder 5 more preferably satisfies Conditional Expression (26-1) below and still more preferably satisfies Conditional Expression (26-2) below.

$$0.01 < d12/TL < 2 \quad (26)$$

$$0.015 < d12/TL < 1.5 \quad (26\text{-}1)$$

$$0.02 < d12/TL < 1 \quad (26\text{-}2)$$

In a case where the half value of the longest diameter of the display region in the display element 1 is denoted by H, and the focal length of the first lens L1 is denoted by f1, the electronic view finder 5 preferably satisfies Conditional Expression (27) below. Since H>0 is established, the first lens L1 satisfying Conditional Expression (27) is a positive lens. Accordingly, the second lens L2 is a negative lens. By causing Conditional Expression (27) not to be less than or equal to a lower limit thereof, a decrease in positive refractive power of the first lens L1 can be suppressed. Thus, a relatively excessive influence of negative refractive power of the second lens L2 can be suppressed. Accordingly, advantage for correcting the astigmatism and the field curvature is achieved. By causing Conditional Expression (27) not to be greater than or equal to an upper limit thereof, advantage for suppressing aberrations such as the field curvature is achieved. In order to obtain more favorable characteristics, the electronic view finder 5 more preferably satisfies Conditional Expression (27-1) below and still more preferably satisfies Conditional Expression (27-2) below.

$$0.3 < H/f1 < 0.9 \quad (27)$$

$$0.4 < H/f1 < 0.8 \quad (27\text{-}1)$$

$$0.49 < H/f1 < 0.74 \quad (27\text{-}2)$$

In a case where the half value of the longest diameter of the display region in the display element 1 is denoted by H, and the focal length of the second lens L2 is denoted by f2, the electronic view finder 5 preferably satisfies Conditional Expression (28) below. By causing Conditional Expression (28) not to be less than or equal to a lower limit thereof, an increase in negative refractive power of the second lens L2 can be suppressed. Thus, advantage for correcting the lateral chromatic aberration and the field curvature is achieved. By causing Conditional Expression (28) not to be greater than or equal to an upper limit thereof, a decrease in negative refractive power of the second lens L2 and a decrease in divergence of the ray heading toward the third lens L3 from the second lens L2 can be suppressed. Thus, advantage for size reduction in the total length direction in a case of securing a wide apparent field of view is achieved. In order to obtain more favorable characteristics, the electronic view finder 5 more preferably satisfies Conditional Expression (28-1) below and still more preferably satisfies Conditional Expression (28-2) below.

$$-1.4 < H/f2 < -0.4 \quad (28)$$

$$-1.2 < H/f2 < -0.6 \quad (28\text{-}1)$$

$$-1 < H/f2 < -0.8 \quad (28\text{-}2)$$

In a case where the half value of the longest diameter of the display region in the display element 1 is denoted by H, and the focal length of the third lens L3 is denoted by f3, the electronic view finder 5 preferably satisfies Conditional Expression (29) below. By causing Conditional Expression (29) not to be less than or equal to a lower limit thereof, a decrease in refractive power of the third lens L3 can be suppressed. Thus, advantage for suppressing the astigmatism and the spherical aberration is achieved. By causing Conditional Expression (29) not to be greater than or equal to an upper limit thereof, advantage for suppressing aberrations such as the field curvature is achieved. In order to obtain more favorable characteristics, the electronic view finder 5 more preferably satisfies Conditional Expression (29-1) below and still more preferably satisfies Conditional Expression (29-2) below.

$$0.01 < H/f3 < 1 \quad (29)$$

$$0.05 < H/f3 < 0.8 \quad (29\text{-}1)$$

$$0.1 < H/f3 < 0.62 \quad (29\text{-}2)$$

In a case where the focal length of the eyepiece lens 3 in a state where the diopter is −1 diopter is denoted by f, the paraxial curvature radius of the surface of the third lens L3 on the eyepoint EP side is denoted by R3r, and the half value of the longest diameter of the display region 1a in the display element 1 is denoted by H, the electronic view finder 5 preferably satisfies Conditional Expression (30) below. By causing Conditional Expression (30) not to be greater than or equal to an upper limit thereof, the optical distortion of the eyepiece lens 3 is easily corrected with the television distortion of the image of the display element 1. In addition, the electronic view finder 5 more preferably satisfies Conditional Expression (30-1) below. By causing Conditional Expression (30-1) not to be less than or equal to a lower limit thereof, an excessive increase in refractive power of the surface of the third lens L3 on the eyepoint EP side is prevented. Thus, advantage for correcting the optical distortion is achieved.

$$(f/R3r) \times (H/f)^2 < -0.0218 \tag{30}$$

$$-1.47 < (f/R3r) \times (H/f)^2 < -0.0218 \tag{30-1}$$

In a case where the focal length of the diopter adjustment lens group is denoted by fd, the moving amount of the diopter adjustment lens group in a case where a change is made from a state where the diopter is −1 diopter to a state where an absolute value of the diopter is the maximum is denoted by Str, and the paraxial curvature radius of the surface of the third lens L3 on the eyepoint EP side is denoted by R3r, the electronic view finder 5 preferably satisfies Conditional Expression (31) below. By causing Conditional Expression (31) not to be less than or equal to a lower limit thereof, advantage for widening a diopter adjustment range is achieved. This effect is particularly noticeable in a case where only a part of the lenses of the eyepiece lens 3 is used as the diopter adjustment lens group. In addition, the electronic view finder 5 more preferably satisfies Conditional Expression (31-1) below. By causing Conditional Expression (31-1) not to be greater than or equal to an upper limit thereof, advantage for suppressing the moving amount of the diopter adjustment lens group during the diopter adjustment is achieved, and it is possible to contribute to shortening of the total length.

$$200 < |fd \times Str \times R3r| \tag{31}$$

$$200 < |fd \times Str \times R3r| < 4500 \tag{31-1}$$

In addition, in a configuration in which the eyepiece lens 3 consists of a positive lens, a negative lens, and a positive lens in order from the display element 1 side to the eyepoint EP side, the electronic view finder 5 preferably has an aspect (hereinafter, referred to as a first aspect) in which the television distortion of the image displayed on the display element 1 has a negative value in a state where the diopter has a positive maximum value. The electronic view finder 5 preferably has the first aspect in a case where both of Conditional Expressions (30) and (31) are satisfied. In a state where both of Conditional Expressions (30) and (31) are satisfied, the eyepiece lens 3 consists of a positive lens, a negative lens, and a positive lens in order from the display element 1 side to the eyepoint EP side, and the diopter has the positive maximum value, the optical distortion of the eyepiece lens 3 has a strong tendency to have a positive value. Thus, by causing the television distortion of the image to have a negative value, the distortion can be favorably corrected in the electronic view finder 5 as a whole.

In addition, the electronic view finder 5 preferably has an aspect (hereinafter, referred to as a second aspect) in which the television distortion of the image displayed on the display element 1 has a positive value in a state where the absolute value of the diopter is the maximum within a negative range of the diopter. The electronic view finder 5 preferably has the second aspect in a case where both of Conditional Expressions (20) and (30) are satisfied. In a state where Conditional Expressions (20) and (30) are satisfied, and the absolute value of the diopter is the maximum within a range in which the diopter has a negative value, the optical distortion of the eyepiece lens 3 has a strong tendency to have a negative value. Thus, by causing the television distortion of the image to have a positive value, the distortion can be favorably corrected in the electronic view finder 5 as a whole.

In addition, the electronic view finder 5 preferably has the second aspect in a case where Conditional Expressions (20), (30), and (31) are satisfied. Furthermore, the electronic view finder 5 preferably has the first aspect and the second aspect in a case where Conditional Expressions (20), (30), and (31) are satisfied.

Next, numerical value examples of the electronic view finder 5 according to the embodiment of the present disclosure will be described. First, each data of Example 1 will be described. Symbols, meanings, and a method of description of each data of Example 2 and later are basically the same as those of Example 1 unless otherwise specified. Thus, duplicate description will be omitted.

Example 1

A configuration and luminous flux of the electronic view finder 5 of Example 1 are illustrated in FIG. 6. The electronic view finder 5 of Example 1 comprises the display element 1, the optical member 2, the eyepiece lens 3, and the optical member 4 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The diopter adjustment lens group consists of the second lens L2.

For the electronic view finder 5 of Example 1, basic lens data is shown in Table 1, specifications and variable surface spacing are shown in Table 2, and aspherical coefficients are shown in Table 3.

In Table 1, the field Sn shows a surface number of each surface in a case where the number is increased by one at a time toward the eyepoint EP side from a surface of the display element 1 on which the display region 1a is disposed as a first surface. In Table 1, the display element 1, the optical member 2, the optical member 4, and the eyepoint EP are also described, and a surface number and a word (EP) are described in the field Sn of a surface corresponding to the eyepoint EP. The field R shows a curvature radius of each surface. A sign of the curvature radius is positive for a surface shape of which a convex surface faces toward the display element 1 side, and is negative for a surface shape of which a convex surface faces toward the eyepoint EP side. A * mark is attached to a surface number of an aspherical surface, and a numerical value of a paraxial curvature radius is described in the field of the curvature radius of the aspherical surface.

In addition, in Table 1, the field D shows surface spacing on the optical axis AX between each surface and a surface adjacent to the eyepoint EP side thereof. Variable surface spacing during the diopter adjustment is described using a symbol DD[ ] by attaching a surface number on the display element 1 side of the spacing to an inside of [ ]. The field Nd shows a refractive index of each constituent with respect to the d line. The field vd shows an Abbe number of each constituent based on the d line.

Table 2 shows the focal length f of the eyepiece lens 3, the apparent field of view at a full angle of view, and a value of the variable surface spacing at each diopter. In the field of the diopter, the unit diopter is abbreviated to dpt. In the field of the apparent field of view, (°) means that a unit is degree. In addition, Table 2 shows the half value H of the longest diameter of the display region 1a in the display element 1.

In Table 3, the field Sn shows the surface number of the aspherical surface. The fields KA and Am show numerical values of the aspherical coefficients for each aspherical surface. Here, m is an integer greater than or equal to 4 and varies depending on the surface. For example, m=4, 6, 8, . . . , 20 is established for a fifth surface. In Table 3, "E±n" (n: integer) in the numerical values of the aspherical coefficients means "×10$^{±n}$". KA and Am are aspherical coefficients in an aspheric equation represented by the following equation.

$$Zd = C \times h^2 / \{1 + (1 - KA \times C^2 \times h^2)^{1/2}\} + \Sigma Am \times h^m$$

where

Zd: aspherical depth (length of perpendicular line drawn from point on aspherical surface of height h to plane perpendicular to optical axis AX through which aspherical surface apex passes)

h: height (distance from optical axis AX to lens surface)

C: reciprocal of paraxial curvature radius

KA and Am: aspherical coefficient

In the aspheric equation, Σ means a total sum related to m.

In the data of each table below, while degree is used as a unit of angle, and millimeter (mm) is used as a unit of length, the optical system can also be used by proportionally enlarging or proportionally reducing the optical system. Thus, other appropriate units can also be used. In addition, in each table shown below, numerical values rounded in a predetermined number of digits are described.

TABLE 1

Example 1

| Sn | R | D | Nd | vd |
|---|---|---|---|---|
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 0.5000 | | |
| *5 | 39.2666 | 4.7668 | 1.86833 | 41.17 |
| *6 | −10.6402 | DD[6] | | |
| *7 | −14.7961 | 0.8000 | 1.84368 | 22.82 |
| *8 | 11.0578 | DD[8] | | |
| *9 | 15.8656 | 11.8492 | 1.85085 | 42.91 |
| *10 | −16.4124 | 0.5000 | | |
| 11 | ∞ | 1.2000 | 1.49023 | 57.50 |
| 12 | ∞ | 15.0000 | | |
| 13 (EP) | ∞ | | | |

TABLE 2

Example 1

| Diopter | −1 dpt | −4.1 dpt | +1.9 dpt |
|---|---|---|---|
| f | 15.95 | 15.95 | 15.95 |
| Apparent Field of View (°) | 41.76 | 39.13 | 44.76 |
| DD[6] | 3.07 | 3.47 | 2.68 |
| DD[8] | 1.16 | 0.77 | 1.56 |
| H | 6.405 | | |

TABLE 3

Example 1

| Sn | 5 | 6 | 7 | 8 |
|---|---|---|---|---|
| KA | 1.0000000E+00 | 1.0000000E+00 | 1.0000000E+00 | 1.0000000E+00 |
| A4 | −3.0952744E−04 | 7.4534485E−05 | 3.9761283E−04 | −2.8214047E−04 |
| A6 | −1.2008044E−05 | −3.0737505E−06 | 6.5283501E−07 | −7.8180219E−07 |
| A8 | 6.8444919E−07 | 2.0699756E−07 | −6.1347167E−08 | −2.7589254E−08 |
| A10 | −9.1892720E−09 | −2.0202819E−09 | −2.0150117E−09 | 4.6000291E−10 |
| A12 | −7.1308655E−12 | −3.7552335E−12 | 4.5590415E−11 | 2.4054789E−12 |
| A14 | 9.8100569E−13 | 3.3611584E−13 | 4.9454694E−13 | −3.7720517E−14 |
| A16 | −6.2674957E−16 | −2.9633492E−15 | −2.1241443E−14 | −1.0588826E−15 |
| A18 | −1.0290251E−16 | −5.3660437E−18 | 2.1664656E−16 | 1.6636706E−17 |
| A20 | 5.5630864E−19 | 1.1515952E−19 | −7.5948575E−19 | −6.6069775E−20 |

| Sn | 9 | 10 |
|---|---|---|
| KA | 1.0000000E+00 | 1.0000000E+00 |
| A4 | −2.6178533E−04 | 2.1567055E−05 |
| A6 | 2.3343813E−06 | 3.1383325E−07 |
| A8 | −1.2261753E−08 | −8.9403565E−09 |
| A10 | 3.6026590E−11 | 1.6659374E−10 |
| A12 | −6.7366444E−13 | −1.2397305E−12 |
| A14 | 3.7551022E−15 | 2.3377907E−15 |
| A16 | 7.9809099E−17 | 1.1405376E−17 |
| A18 | −8.9843468E−19 | 3.5020792E−20 |
| A20 | 2.5360136E−21 | −3.9792948E−22 |

Figure 7:
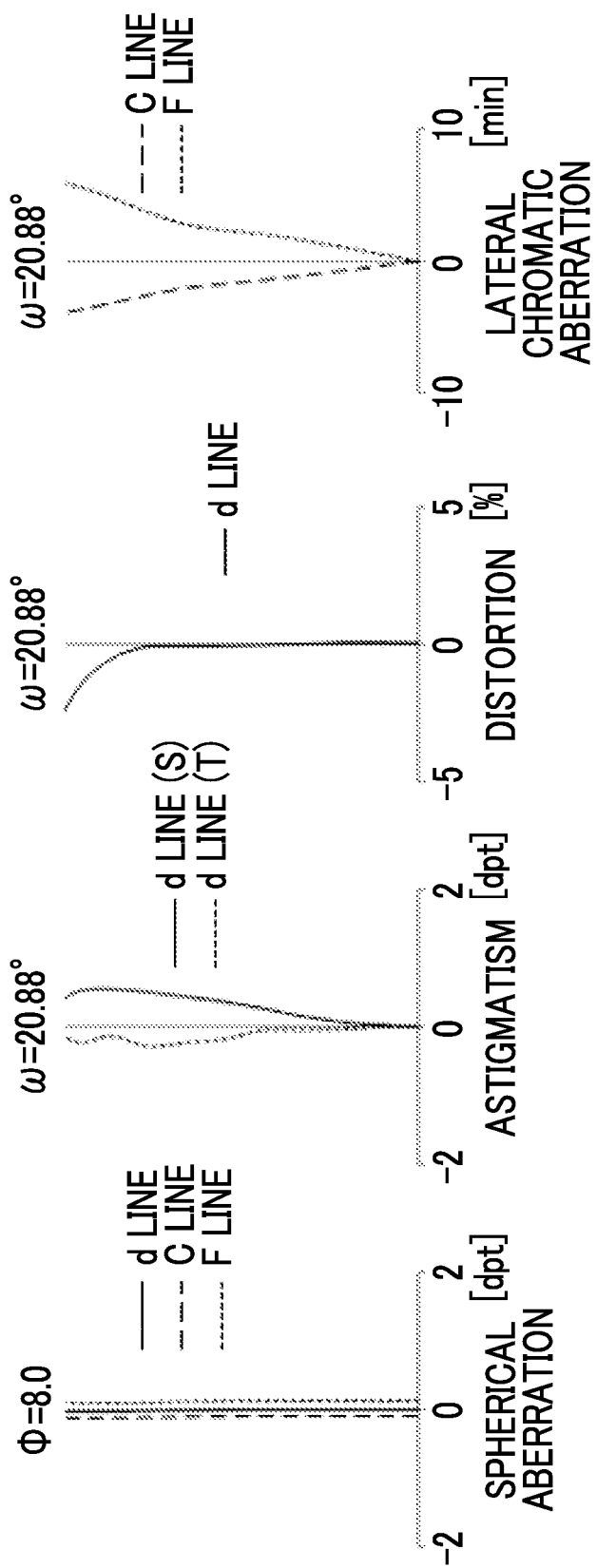
FIG. 7 is various aberration diagrams of the electronic view finder of Example 1.

FIG. 7 shows various aberration diagrams of the electronic view finder 5 of Example 1 in a state where the diopter is −0.97 diopter. In FIG. 7, the spherical aberration, the astigmatism, the distortion, and the lateral chromatic aberration are illustrated in order from the left. In the spherical aberration diagram, aberrations for the d line, a C line, and an F line are illustrated by a solid line, a long broken line, and a short broken line, respectively. In the astigmatism diagram, the aberration for the d line in a sagittal direction is illustrated by a solid line, and the aberration for the d line in a tangential direction is illustrated by a short broken line. In the distortion diagram, the aberration for the d line is illustrated by a solid line. In the lateral chromatic aberration diagram, the aberrations for the C line and the F line are illustrated by a long broken line and a short broken line, respectively. The unit dpt on the horizontal axes of the spherical aberration diagram and the astigmatism diagram means diopter. The unit min on the horizontal axis of the lateral chromatic aberration diagram means a minute of angle. In the spherical aberration diagram, Φ means a diameter of the eyepoint EP in a case where millimeter (mm) is used as a unit. In the other aberration diagrams, ω means the apparent field of view at a half angle of view.

FIG. 8 illustrates distorted images of the eyepiece lens 3 of Example 1 in a state where the diopter is −1 diopter, −4.1 diopter, and +1.9 diopter. The distorted images show the optical distortion of the image formed by the eyepiece lens 3 in a case where the lattice chart is used as the object. As illustrated in FIG. 8, the optical distortion of the eyepiece lens 3 of Example 1 is of the barrel type within a range of −1 to +1.9 diopter, and a tendency to the barrel type is weakened as the diopter is increased.

Example 2

Figure 9:
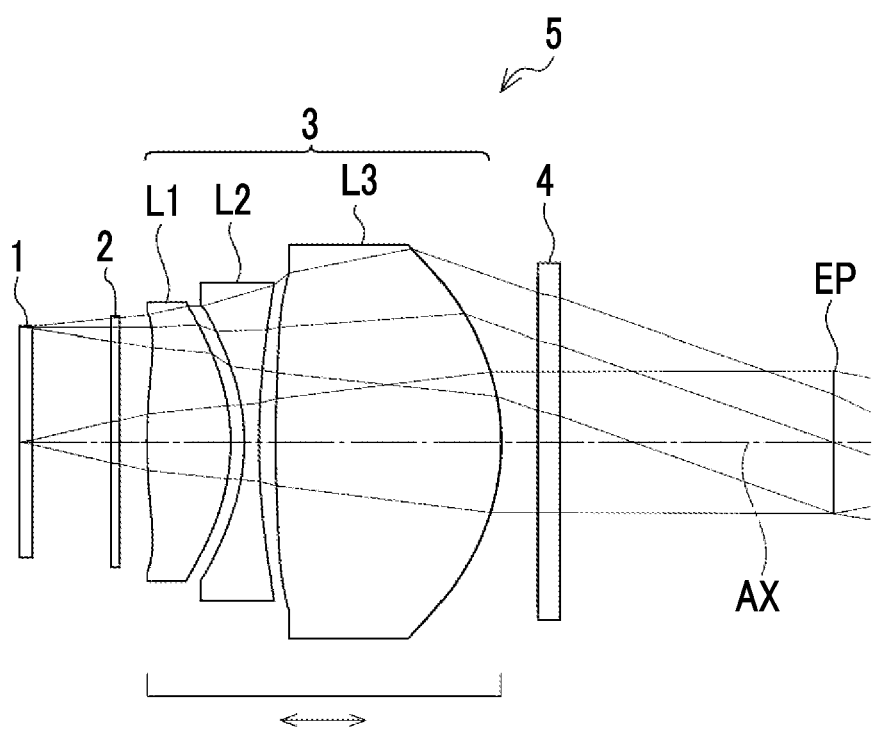
FIG. 9 is a cross section diagram illustrating a configuration and luminous flux of an electronic view finder of Example 2.

A configuration and luminous flux of the electronic view finder 5 of Example 2 are illustrated in FIG. 9. The electronic view finder 5 of Example 2 comprises the display element 1, the optical member 2, the eyepiece lens 3, and the optical member 4 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The diopter adjustment lens group consists of the first lens L1, the second lens L2, and the third lens L3.

Figure 10:
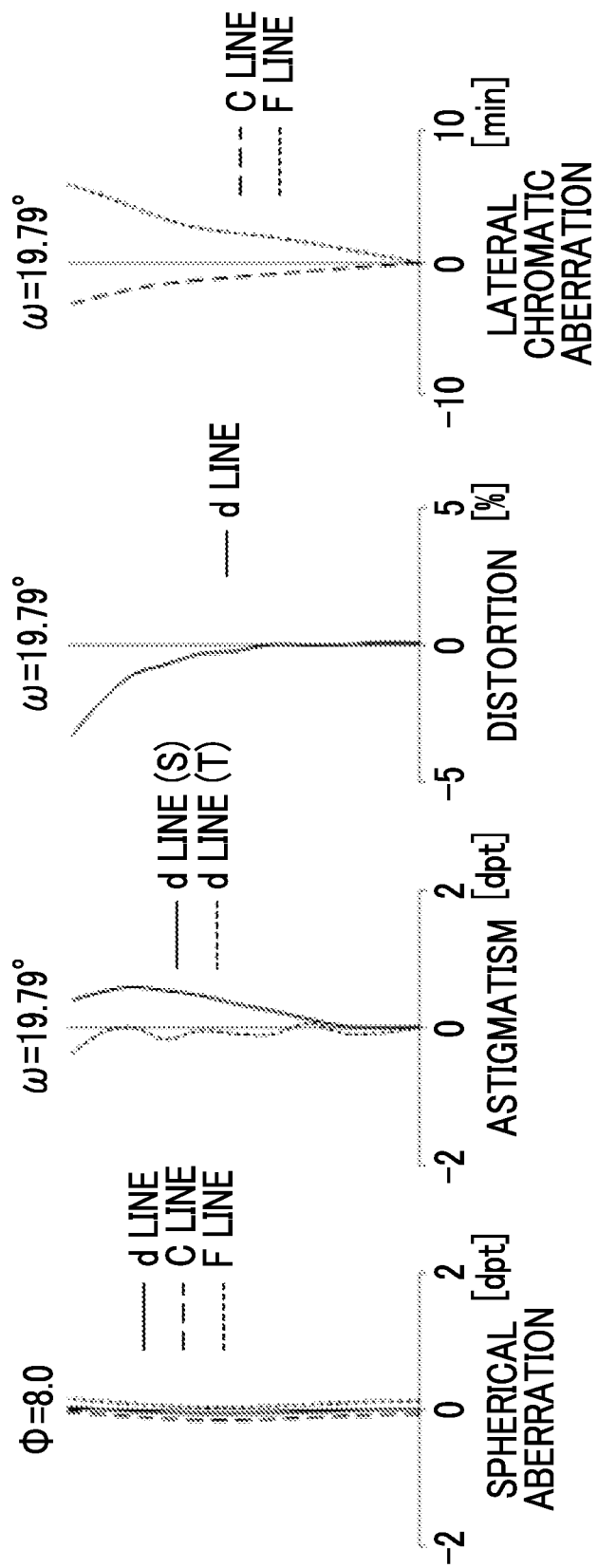
FIG. 10 is various aberration diagrams of the electronic view finder of Example 2.

For the electronic view finder 5 of Example 2, basic lens data is shown in Table 4, specifications and variable surface spacing are shown in Table 5, aspherical coefficients are shown in Table 6, and various aberration diagrams in a state where the diopter is −0.88 diopter are illustrated in FIG. 10.

TABLE 4

| Example 2 | | | | |
|---|---|---|---|---|
| Sn | R | D | Nd | νd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | DD[4] | | |
| *5 | 29.9250 | 4.5786 | 1.80552 | 46.51 |
| *6 | −11.8637 | 0.7550 | | |
| *7 | −11.7233 | 0.8000 | 1.83687 | 23.16 |
| *8 | 43.8550 | 0.9092 | | |
| *9 | 79.5741 | 12.2829 | 1.73807 | 54.19 |
| *10 | −13.3544 | DD[10] | | |
| 11 | ∞ | 1.2000 | 1.49023 | 57.50 |
| 12 | ∞ | 15.0000 | | |
| 13 (EP) | ∞ | | | |

TABLE 5

| Example 2 | | | |
|---|---|---|---|
| Diopter | −1 dpt | −4.55 dpt | +2.425 dpt |
| f | 17.05 | 17.05 | 17.05 |
| Apparent Field of View (°) | 39.57 | 39.05 | 39.90 |
| DD[4] | 1.49 | 0.50 | 2.48 |
| DD[10] | 2.00 | 2.99 | 1.01 |
| H | 6.405 | | |

TABLE 6

| Example 2 | | |
|---|---|---|
| Sn | 5 | 6 |
| KA | 1.0000000E+00 | 1.0000000E+00 |
| A4 | 3.5629786E−04 | 5.0075779E−04 |
| A6 | −1.4690087E−04 | −9.3796873E−05 |
| A8 | 2.0905981E−05 | 1.1812744E−05 |
| A10 | −1.7449417E−06 | −8.9983920E−07 |
| A12 | 8.7192779E−08 | 4.1782777E−08 |
| A14 | −2.6626222E−09 | −1.1366910E−09 |
| A16 | 5.6269116E−11 | 1.4713763E−11 |
| A18 | −1.4111408E−12 | 3.0435848E−14 |
| A20 | 4.6709867E−14 | −2.4499616E−15 |
| A22 | −9.8936655E−16 | −2.4660138E−17 |
| A24 | 6.0688816E−18 | 1.2349441E−18 |
| A26 | 1.2131177E−19 | −7.8579850E−21 |
| A28 | −1.3267154E−21 | −6.9090897E−23 |
| A30 | −9.7636496E−24 | −8.9640947E−25 |
| A32 | −3.2312586E−25 | 5.1432912E−26 |
| A34 | 1.4951446E−26 | −5.9692192E−28 |
| A36 | −1.7032524E−28 | 2.7733257E−30 |
| A38 | 6.4980859E−31 | −4.1208233E−33 |

TABLE 6-continued

| | Example 2 | | | |
|---|---|---|---|---|
| Sn | 7 | 8 | 9 | 10 |
| KA | 1.0000000E+00 | 1.0000000E+00 | 1.0000000E+00 | 1.0000000E+00 |
| A4 | 1.3899615E−04 | −2.7023970E−05 | −4.9310076E−05 | 2.1362106E−05 |
| A6 | −1.8644415E−06 | 1.1995181E−06 | 1.7542443E−07 | 2.2724185E−09 |
| A8 | 4.9573857E−08 | −2.3734790E−08 | 8.6803823E−09 | 2.4857547E−09 |
| A10 | 1.3976821E−09 | −3.0549515E−11 | 5.7656500E−11 | −1.6958512E−11 |
| A12 | −2.0973660E−11 | 3.5870389E−12 | −6.5413266E−13 | −1.8228669E−13 |
| A14 | −5.6454084E−13 | 4.3983495E−14 | −7.1906207E−15 | 4.2807141E−15 |
| A16 | −3.4110745E−15 | −1.1538080E−15 | 5.9862936E−17 | −6.2535493E−18 |
| A18 | 4.2433336E−16 | 2.1087573E−18 | −1.6643714E−19 | −2.4082303E−19 |
| A20 | −4.0821887E−18 | 2.9593585E−20 | 1.0560399E−21 | 1.3492906E−21 |

Example 3

Figure 11:
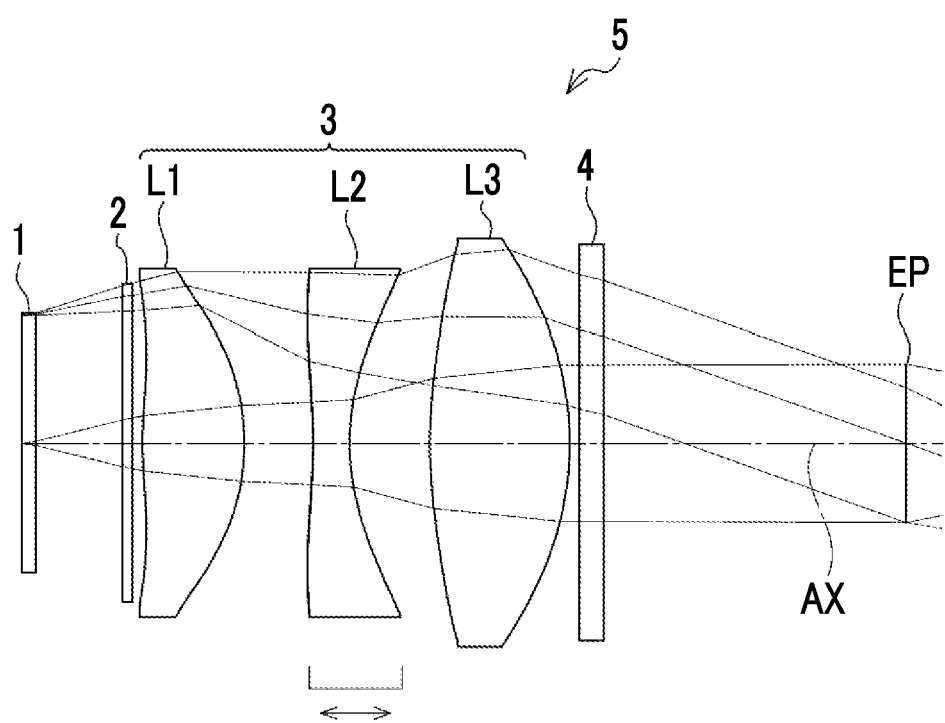
FIG. 11 is a cross section diagram illustrating a configuration and luminous flux of an electronic view finder of Example 3.

A configuration and luminous flux of the electronic view finder 5 of Example 3 are illustrated in FIG. 11. The electronic view finder 5 of Example 3 comprises the display element 1, the optical member 2, the eyepiece lens 3, and the optical member 4 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The diopter adjustment lens group consists of only the second lens L2.

Figure 12:
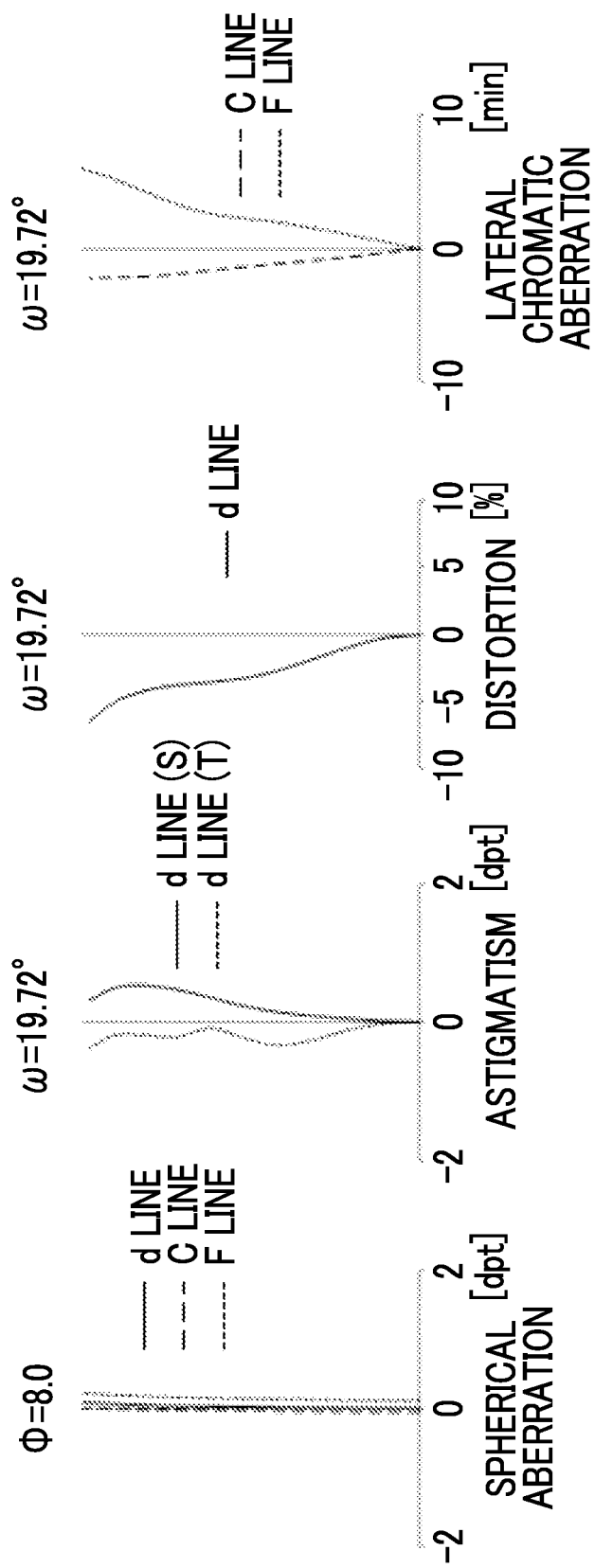
FIG. 12 is various aberration diagrams of the electronic view finder of Example 3.

For the electronic view finder 5 of Example 3, basic lens data is shown in Table 7, specifications and variable surface spacing are shown in Table 8, aspherical coefficients are shown in Table 9, and various aberration diagrams in a state where the diopter is −0.96 diopter are illustrated in FIG. 12.

TABLE 7

| | Example 3 | | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |

TABLE 7-continued

| | Example 3 | | | |
|---|---|---|---|---|
| Sn | R | D | Nd | vd |
| 4 | ∞ | 0.5000 | | |
| *5 | 21.7750 | 5.0474 | 1.83864 | 44.14 |
| *6 | −11.8824 | DD[6] | | |
| *7 | −31.4350 | 1.8140 | 1.84159 | 22.92 |
| *8 | 11.8890 | DD[8] | | |
| *9 | 26.3920 | 6.8743 | 1.73251 | 54.75 |
| *10 | −16.7190 | 0.5000 | | |
| 11 | ∞ | 1.2000 | 1.49023 | 57.50 |
| 12 | ∞ | 15.0000 | | |
| 13 (EP) | ∞ | | | |

TABLE 8

| | Example 3 | | |
|---|---|---|---|
| Diopter | −1 dpt | −4.15 dpt | +1.875 dpt |
| f | 16.34 | 16.34 | 16.34 |
| Apparent Field of View (°) | 39.45 | 36.98 | 42.34 |
| DD[6] | 3.40 | 4.08 | 2.72 |
| DD[8] | 4.00 | 3.32 | 4.68 |
| H | 6.405 | | |

TABLE 9

| | Example 3 | |
|---|---|---|
| Sn | 5 | 6 |
| KA | 1.0000000E+00 | 1.0000000E+00 |
| A4 | −8.1218695E−04 | −1.2639694E−04 |
| A6 | 8.5386156E−06 | 3.7148505E−06 |
| A8 | −2.9507996E−08 | −3.6641368E−08 |
| A10 | −5.2109098E−11 | 3.0287932E−10 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | 2.4335775E−04 | −2.6336902E−04 | −1.5296840E−04 | −5.2752615E−06 |
| A6 | 1.4688026E−06 | 2.4079574E−06 | 1.3517718E−06 | 2.1795556E−07 |
| A8 | −1.8853145E−08 | −3.2570205E−08 | −3.6933280E−09 | −6.0445695E−09 |
| A10 | −2.0002022E−09 | 3.3035158E−11 | 5.7931020E−11 | 1.4483211E−10 |
| A12 | 3.7610989E−11 | 2.5404063E−12 | −1.4368655E−12 | −1.0558171E−12 |

TABLE 9-continued

| | | Example 3 | | |
|---|---|---|---|---|
| A14 | 4.5206036E−13 | −2.7808762E−14 | 9.9366064E−16 | −1.8149099E−15 |
| A16 | −2.0695998E−14 | −6.3824420E−16 | 1.3271369E−16 | 1.2730303E−17 |
| A18 | 2.3132991E−16 | 1.8817021E−17 | −5.7331977E−19 | 4.9813502E−19 |
| A20 | −8.8641987E−19 | −1.2015005E−19 | −5.8536832E−22 | −2.6685280E−21 |

Example 4

Figure 13:
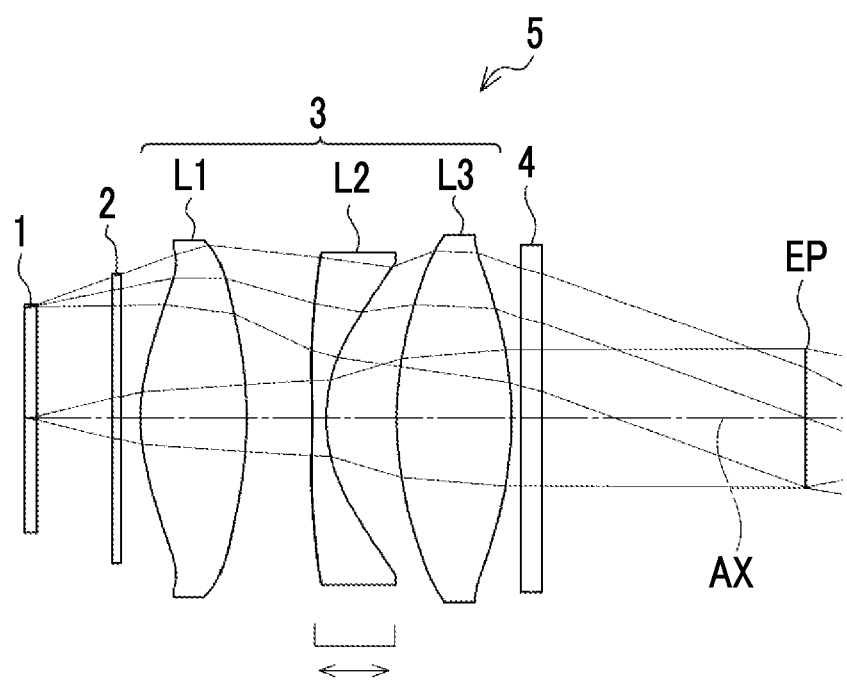
FIG. 13 is a cross section diagram illustrating a configuration and luminous flux of an electronic view finder of Example 4.

A configuration and luminous flux of the electronic view finder 5 of Example 4 are illustrated in FIG. 13. The electronic view finder 5 of Example 4 comprises the display element 1, the optical member 2, the eyepiece lens 3, and the optical member 4 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The diopter adjustment lens group consists of only the second lens L2.

Figure 14:
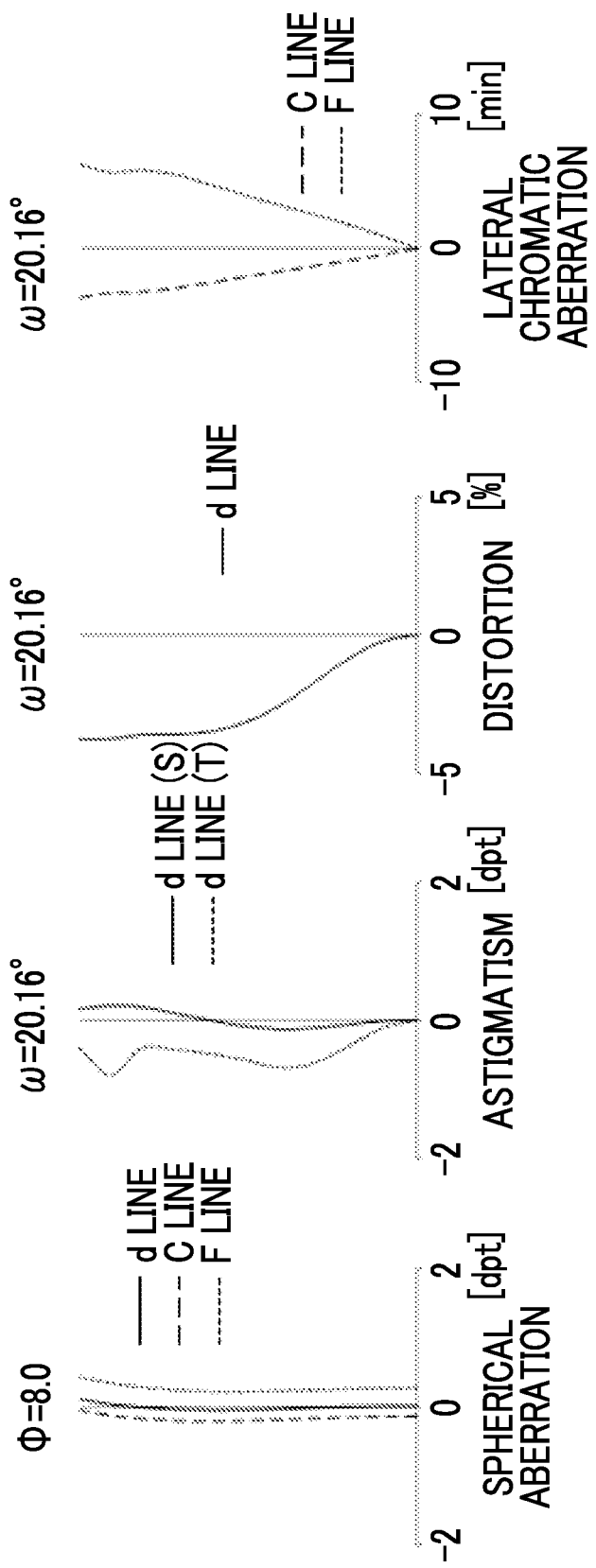
FIG. 14 is various aberration diagrams of the electronic view finder of Example 4.

For the electronic view finder 5 of Example 4, basic lens data is shown in Table 10, specifications and variable surface spacing are shown in Table 11, aspherical coefficients are shown in Table 12, and various aberration diagrams in a state where the diopter is −0.99 diopter are illustrated in FIG. 14. In addition, FIG. 15 illustrates distorted images of the eyepiece lens 3 of Example 4 in a state where the diopter is −1 diopter, −12.75 diopter, and +7.7 diopter. As illustrated in FIG. 15, the optical distortion of the eyepiece lens 3 of Example 4 is of a very weak barrel type having a distortion close to zero in a state where the diopter is −1 diopter, is of the barrel type in a state where the diopter is −12.75 diopter, and is of the bobbin type in a state where the diopter is +7.7 diopter.

TABLE 10

| | | Example 4 | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 1.1054 | | |
| *5 | 11.6332 | 6.0000 | 1.83683 | 44.32 |
| *6 | −23.6776 | DD[6] | | |
| *7 | −35.6860 | 0.8000 | 1.83788 | 23.11 |
| *8 | 9.9986 | DD[8] | | |
| *9 | 18.5156 | 6.5568 | 1.82927 | 45.07 |
| *10 | −22.7260 | 0.5172 | | |
| 11 | ∞ | 1.2000 | 1.49023 | 57.50 |
| 12 | ∞ | 15.0000 | | |
| 13 (EP) | ∞ | | | |

TABLE 11

| | Example 4 | | |
|---|---|---|---|
| Diopter | −1 dpt | −12.75 dpt | +7.7 dpt |
| f | 16.44 | 16.44 | 16.44 |
| Apparent Field of View (°) | 40.31 | 34.63 | 47.67 |
| DD[6] | 3.73 | 5.52 | 1.94 |
| DD[8] | 4.00 | 2.21 | 5.79 |
| H | 6.405 | | |

TABLE 12

| | Example 4 | |
|---|---|---|
| Sn | 5 | 6 |
| KA | 1.0000000E+00 | 1.0000000E+00 |
| A4 | −4.9071566E−04 | −2.3987710E−05 |
| A6 | 4.3068354E−06 | 3.1977269E−06 |
| A8 | −1.8788658E−08 | −3.4545734E−08 |
| A10 | −1.4101434E−10 | 6.1233219E−11 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | 1.0103413E−03 | 4.2459725E−04 | −2.1879756E−04 | −1.7320949E−05 |
| A6 | −2.3420972E−05 | −1.3501594E−05 | 5.0834585E−06 | 3.2526905E−07 |
| A8 | 3.1338366E−07 | −8.5030684E−08 | −8.3214731E−08 | 1.2665265E−08 |
| A10 | −3.7322104E−09 | 3.3673946E−09 | 6.7714782E−10 | −4.8888950E−10 |
| A12 | 3.0399182E−11 | 2.2307134E−11 | 4.8871450E−13 | 8.5648775E−12 |
| A14 | 6.0237552E−13 | −7.0013685E−13 | −5.3305972E−14 | −6.5711065E−14 |
| A16 | −1.8859737E−14 | −6.0495581E−15 | 3.0554019E−16 | −3.4859178E−17 |
| A18 | 1.7489669E−16 | 1.7068985E−16 | 3.2294252E−19 | 3.4511284E−18 |
| A20 | −5.5619420E−19 | −8.2871789E−19 | −4.7568548E−21 | −1.3459929E−20 |

Example 5

Figure 16:
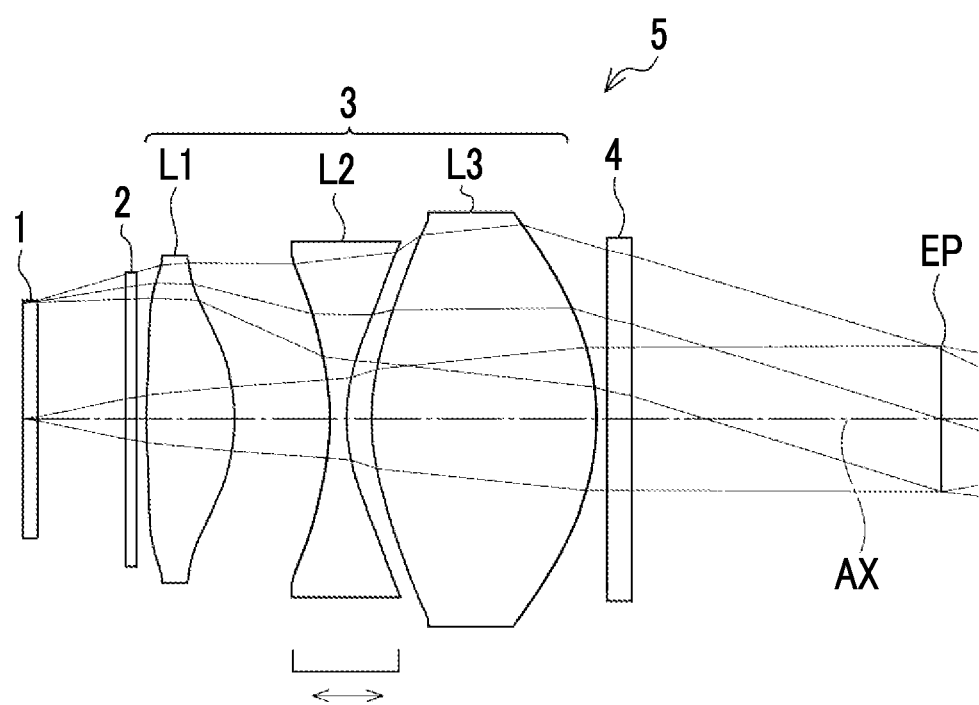
FIG. 16 is a cross section diagram illustrating a configuration and luminous flux of an electronic view finder of Example 5.

A configuration and luminous flux of the electronic view finder 5 of Example 5 are illustrated in FIG. 16. The electronic view finder 5 of Example 5 comprises the display element 1, the optical member 2, the eyepiece lens 3, and the optical member 4 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The diopter adjustment lens group consists of only the second lens L2.

Figure 17:
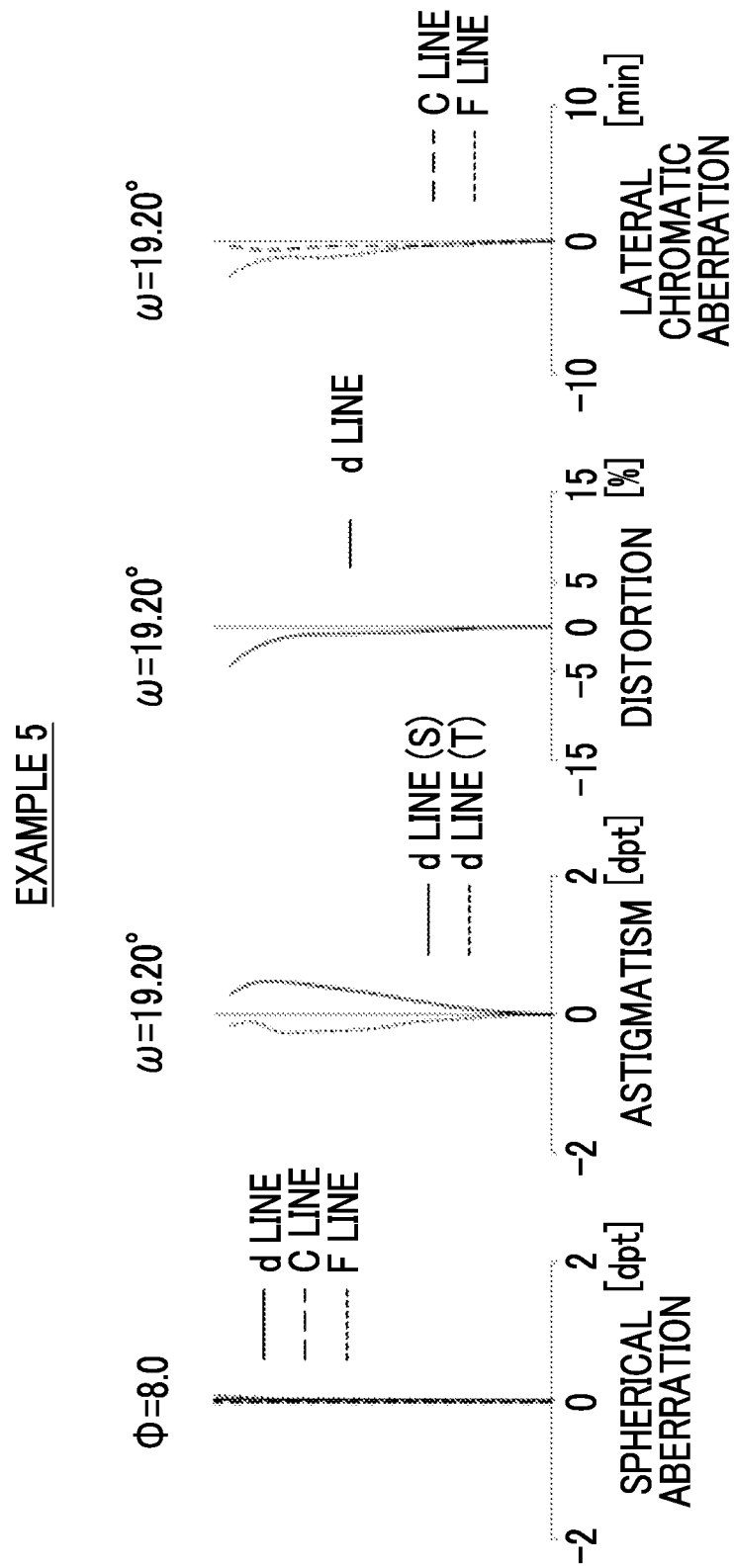
FIG. 17 is various aberration diagrams of the electronic view finder of Example 5.

For the electronic view finder 5 of Example 5, basic lens data is shown in Table 13, specifications and variable surface spacing are shown in Table 14, aspherical coefficients are shown in Table 15, and various aberration diagrams in a state where the diopter is −0.99 diopter are illustrated in FIG. 17.

TABLE 13

| | Example 5 | | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 0.5000 | | |
| *5 | 39.5600 | 4.2643 | 1.83846 | 44.15 |
| *6 | −12.4204 | DD[6] | | |
| *7 | −15.5611 | 0.8000 | 1.85789 | 22.11 |
| *8 | 11.2809 | DD[8] | | |
| *9 | 14.0740 | 10.9363 | 1.83173 | 44.83 |
| *10 | −15.7068 | 0.5000 | | |
| 11 | ∞ | 1.2000 | 1.49023 | 57.50 |
| 12 | ∞ | 15.0000 | | |
| 13 (EP) | ∞ | | | |

TABLE 14

| | Example 5 | | |
|---|---|---|---|
| Diopter | −1 dpt | −6.3 dpt | +3.725 dpt |
| f | 17.28 | 17.28 | 17.28 |
| Apparent Field of View (°) | 38.40 | 34.79 | 42.77 |
| DD[6] | 4.61 | 5.20 | 4.02 |
| DD[8] | 1.21 | 0.62 | 1.80 |
| H | 6.405 | | |

TABLE 15

| | Example 5 | | | |
|---|---|---|---|---|
| Sn | 5 | 6 | 7 | 8 |
| KA | 1.0000000E+00 | 1.0000000E+00 | 1.0000000E+00 | 1.0000000E+00 |
| A4 | −2.9937884E−04 | −3.8955680E−05 | 3.1321726E−04 | −2.2535327E−04 |
| A6 | −1.0674902E−05 | −3.5311981E−06 | 6.1002799E−07 | −2.0401912E−06 |
| A8 | 6.3748816E−07 | 2.3580831E−07 | −6.6528762E−08 | −2.2502364E−08 |
| A10 | −8.1981818E−09 | −2.4534311E−09 | −2.0093587E−09 | 6.0364303E−10 |
| A12 | −1.4050768E−11 | −1.8873891E−12 | 4.7807871E−11 | 2.1079187E−12 |
| A14 | 8.7411578E−13 | 4.1552106E−13 | 4.8038380E−13 | −5.2073846E−14 |
| A16 | 2.7011009E−15 | −3.7972990E−15 | −2.0475846E−14 | −1.0816138E−15 |
| A18 | −1.4528062E−16 | −2.5381909E−17 | 2.0206330E−16 | 1.8576679E−17 |
| A20 | 7.6351151E−19 | 3.2747678E−19 | −6.8952755E−19 | −7.5247289E−20 |

| Sn | 9 | 10 |
|---|---|---|
| KA | 1.0000000E+00 | 1.0000000E+00 |
| A4 | −2.9235027E−04 | 2.6212180E−05 |
| A6 | 1.9507659E−06 | 2.3303910E−07 |
| A8 | −1.0674928E−08 | −8.3793651E−09 |
| A10 | 6.6294564E−11 | 1.7005083E−10 |
| A12 | −8.5504668E−13 | −1.2103230E−12 |
| A14 | 1.0293952E−15 | 1.3095938E−15 |
| A16 | 8.4107200E−17 | 8.4116692E−18 |
| A18 | −6.4987865E−19 | 1.3579316E−19 |
| A20 | 1.3400961E−21 | −8.1418614E−22 |

Example 6

Figure 18:
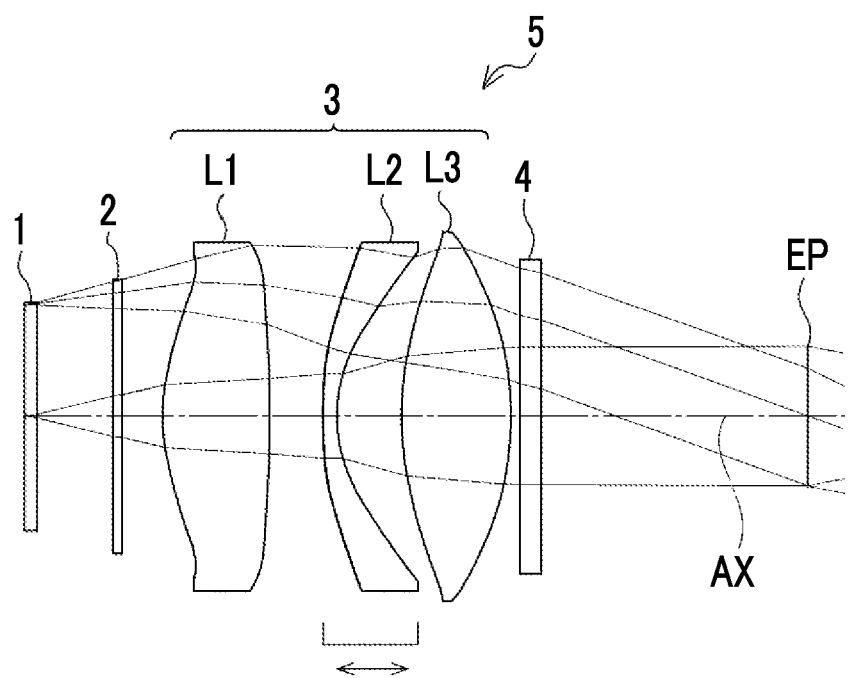
FIG. 18 is a cross section diagram illustrating a configuration and luminous flux of an electronic view finder of Example 6.

A configuration and luminous flux of the electronic view finder 5 of Example 6 are illustrated in FIG. 18. The electronic view finder 5 of Example 6 comprises the display element 1, the optical member 2, the eyepiece lens 3, and the optical member 4 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The diopter adjustment lens group consists of only the second lens L2.

Figure 19:
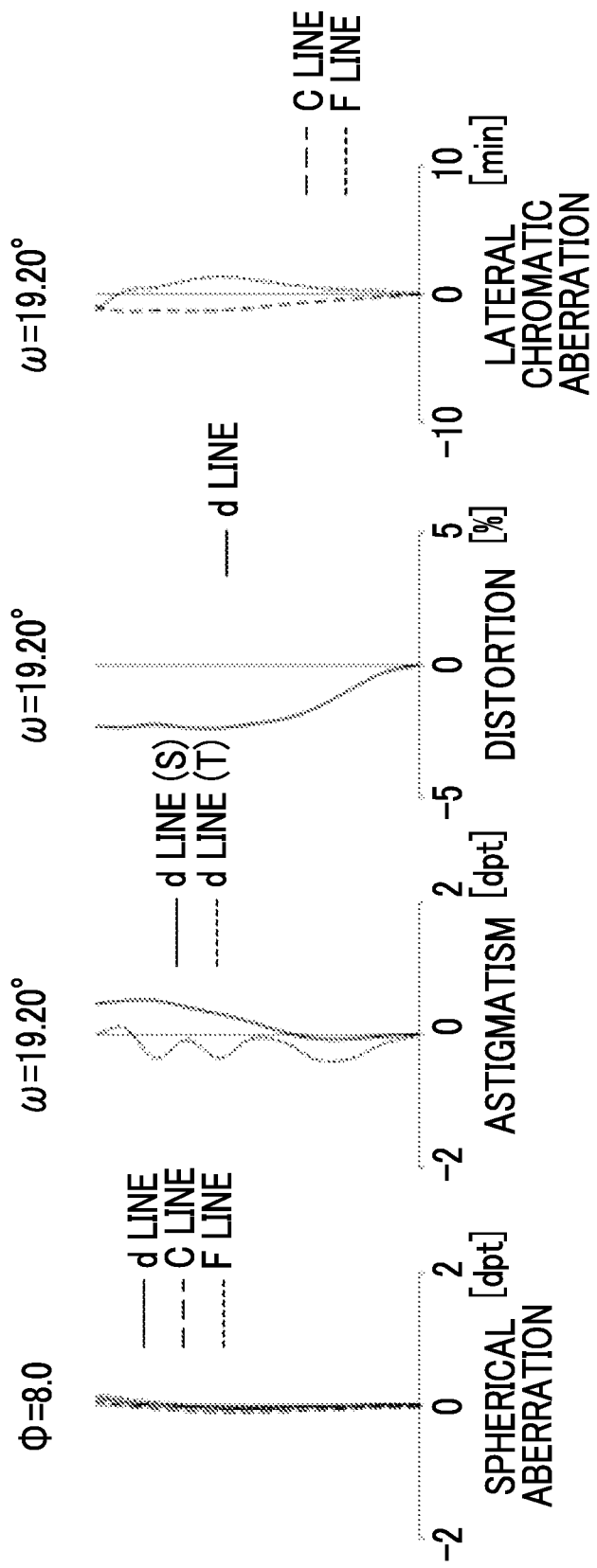
FIG. 19 is various aberration diagrams of the electronic view finder of Example 6.

For the electronic view finder 5 of Example 6, basic lens data is shown in Table 16, specifications and variable surface spacing are shown in Table 17, aspherical coefficients are shown in Table 18, and various aberration diagrams in a state where the diopter is −0.97 diopter are illustrated in FIG. 19.

TABLE 16

| | Example 6 | | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 2.2856 | | |
| *5 | 11.6027 | 6.0000 | 1.82278 | 45.72 |

TABLE 16-continued

Example 6

| Sn | R | D | Nd | vd |
|---|---|---|---|---|
| *6 | −83.5178 | DD[6] | | |
| *7 | 77.6913 | 0.8000 | 1.87712 | 21.14 |
| *8 | 10.1851 | DD[8] | | |
| *9 | 17.0315 | 6.1987 | 1.65607 | 58.70 |
| *10 | −18.7300 | 0.5000 | | |
| 11 | ∞ | 1.2000 | 1.49023 | 57.50 |
| 12 | ∞ | 15.0000 | | |
| 13 (EP) | ∞ | | | |

TABLE 17

Example 6

| Diopter | −1 dpt | −6.45 dpt | +3.625 dpt |
|---|---|---|---|
| f | 16.70 | 16.70 | 16.70 |
| Apparent Field of View (°) | 40.35 | 37.18 | 44.07 |
| DD[6] | 3.01 | 4.17 | 1.85 |
| DD[8] | 3.62 | 2.45 | 4.78 |
| H | 6.405 | | |

TABLE 18

Example 6

| Sn | 5 | 6 |
|---|---|---|
| KA | 1.0000000E+00 | 1.0000000E+00 |
| A4 | −4.8775469E−04 | −1.6484801E−04 |
| A6 | 4.1498252E−06 | 7.0169329E−06 |
| A8 | −1.1557622E−08 | −8.9450538E−08 |
| A10 | −2.6552960E−10 | 3.0487509E−10 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | 1.0779948E−03 | 7.7819124E−04 | −2.4689853E−04 | −2.8736374E−05 |
| A6 | −2.4785546E−05 | −2.0822311E−05 | 5.1317587E−06 | −3.5474990E−07 |
| A8 | 2.8932933E−07 | −6.4951413E−08 | −8.8325330E−08 | 3.3394120E−08 |
| A10 | −3.4948104E−09 | 3.9097139E−09 | 8.9484071E−10 | −5.9187509E−10 |
| A12 | 3.4275772E−11 | 2.4904105E−11 | −2.0639139E−12 | 6.2532779E−12 |
| A14 | 5.7321303E−13 | −7.4155567E−13 | −6.2782624E−14 | −5.2908977E−14 |
| A16 | −1.8823592E−14 | −6.6278632E−15 | 4.4928152E−16 | 1.0456732E−16 |
| A18 | 1.6992287E−16 | 1.6968281E−16 | 2.0974075E−18 | 3.1423004E−18 |
| A20 | −5.1726966E−19 | −7.7009143E−19 | −2.0412509E−20 | −1.9257935E−20 |

Example 7

Figure 20:
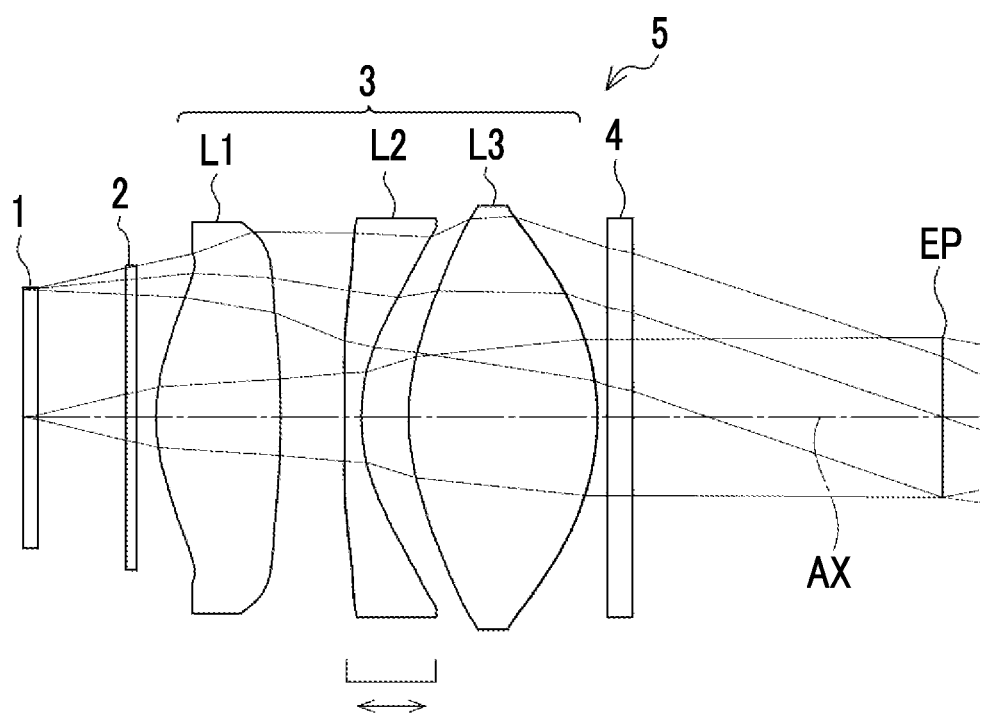
FIG. 20 is a cross section diagram illustrating a configuration and luminous flux of an electronic view finder of Example 7.

A configuration and luminous flux of the electronic view finder 5 of Example 7 are illustrated in FIG. 20. The electronic view finder 5 of Example 7 comprises the display element 1, the optical member 2, the eyepiece lens 3, and the optical member 4 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The diopter adjustment lens group consists of only the second lens L2.

Figure 21:
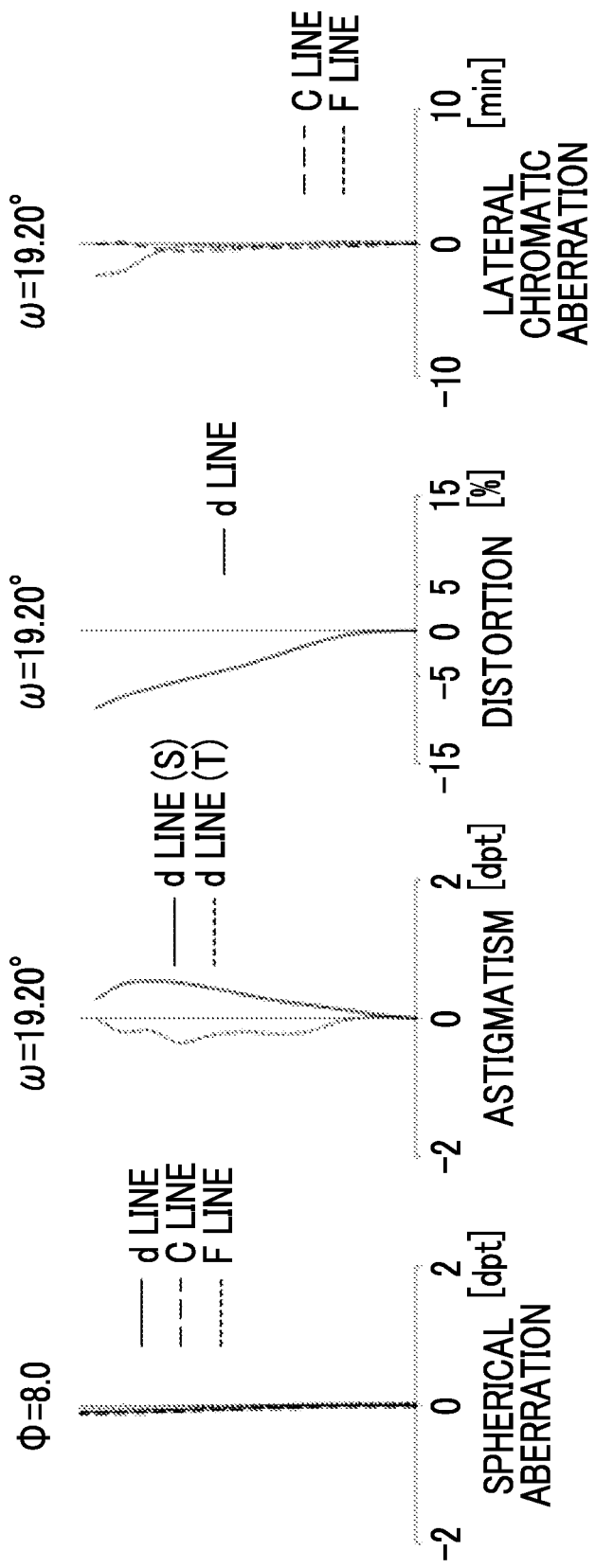
FIG. 21 is various aberration diagrams of the electronic view finder of Example 7.

For the electronic view finder 5 of Example 7, basic lens data is shown in Table 19, specifications and variable surface spacing are shown in Table 20, aspherical coefficients are shown in Table 21, and various aberration diagrams in a state where the diopter is −0.97 diopter are illustrated in FIG. 21.

TABLE 19

Example 7

| Sn | R | D | Nd | vd |
|---|---|---|---|---|
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 0.9489 | | |
| *5 | 9.7557 | 6.0000 | 1.76500 | 51.50 |
| *6 | −53.8066 | DD[6] | | |
| *7 | −75.2232 | 0.8000 | 1.85001 | 22.50 |
| *8 | 10.7055 | DD[8] | | |
| *9 | 11.6943 | 9.1596 | 1.53389 | 55.98 |
| *10 | −12.7980 | 0.5000 | | |
| 11 | ∞ | 1.2000 | 1.49023 | 57.50 |
| 12 | ∞ | 15.0000 | | |
| 13 (EP) | ∞ | | | |

TABLE 20

Example 7

| Diopter | −1 dpt | −8.125 dpt | +2.35 dpt |
|---|---|---|---|
| f | 16.40 | 16.40 | 16.40 |
| Apparent Field of View (°) | 38.40 | 33.89 | 41.32 |
| DD[6] | 3.11 | 4.34 | 2.45 |
| DD[8] | 2.29 | 1.06 | 2.95 |
| H | 6.405 | | |

TABLE 21

Example 7

| Sn | 5 | 6 | 7 | 8 |
|---|---|---|---|---|
| KA  | 1.0000000E+00  | 1.0000000E+00  | 1.0000000E+00  | 1.0000000E+00 |
| A4  | −5.0674438E−04 | −1.1005834E−04 | 5.1598084E−04  | 2.2072721E−04 |
| A6  | −9.2033141E−06 | −1.0302740E−06 | −4.7767929E−06 | −6.3326508E−06 |
| A8  | 5.2076144E−07  | 2.2616747E−07  | 4.3933440E−08  | −1.2975746E−07 |
| A10 | −1.1036573E−08 | −2.6347360E−09 | −3.4233939E−09 | 2.4528180E−09 |
| A12 | 8.0707532E−11  | −3.1312404E−11 | 4.7951471E−11  | 9.5830403E−12 |
| A14 | 1.8885661E−12  | 3.9844100E−13  | 6.1578545E−13  | −2.6191147E−13 |
| A16 | −7.0190844E−14 | 4.3691946E−15  | −2.0216769E−14 | −2.6685257E−15 |
| A18 | 9.0901288E−16  | −7.4819156E−17 | 1.7590279E−16  | 5.5861034E−17 |
| A20 | −4.4734763E−18 | 2.7197635E−19  | −5.2542640E−19 | −2.2896177E−19 |

| Sn | 9 | 10 |
|---|---|---|
| KA  | 1.0000000E+00  | 1.0000000E+00 |
| A4  | −3.9588176E−04 | 3.5384924E−05 |
| A6  | 3.7179980E−06  | 6.8283930E−08 |
| A8  | −4.5494356E−08 | −1.23128S6E−10 |
| A10 | 4.3247535E−10  | 1.2557857E−10 |
| A12 | −2.3898807E−12 | −1.3579290E−12 |
| A14 | −1.7086086E−14 | 4.4480557E−15 |
| A16 | 3.6432370E−16  | −1.3133765E−18 |
| A18 | −2.0355523E−18 | 1.7143531E−19 |
| A20 | 3.4245423E−21  | −7.4549901E−22 |

Example 8

Figure 22:
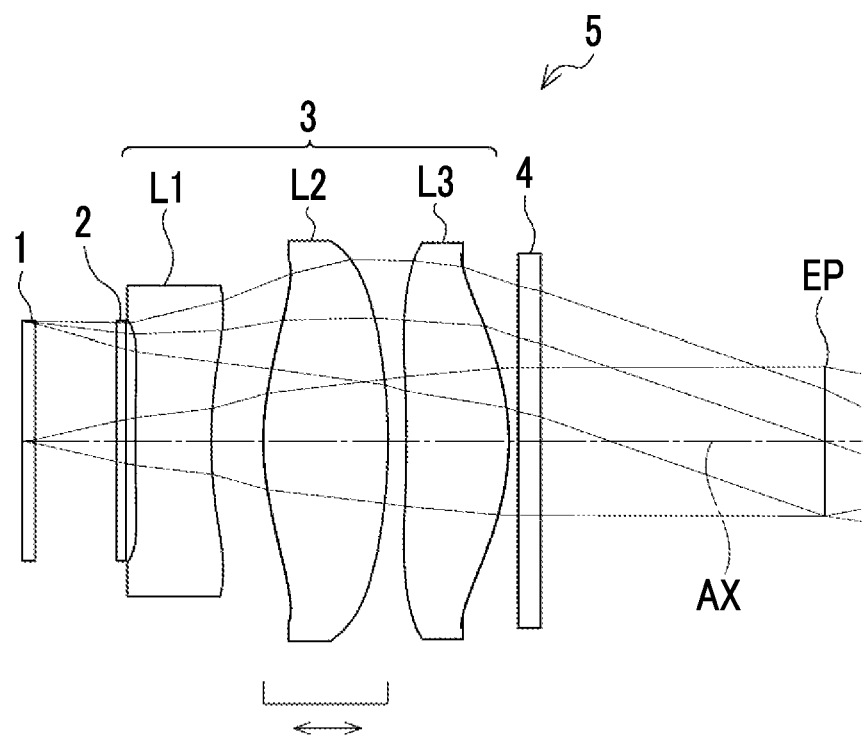
FIG. 22 is a cross section diagram illustrating a configuration and luminous flux of an electronic view finder of Example 8.

A configuration and luminous flux of the electronic view finder 5 of Example 8 are illustrated in FIG. 22. The electronic view finder 5 of Example 8 comprises the display element 1, the optical member 2, the eyepiece lens 3, and the optical member 4 in order from the display element 1 side to the eyepoint EP side. The eyepiece lens 3 consists of the first lens L1 that is a negative lens, the second lens L2 that is a positive lens, and the third lens L3 that is a positive lens, in order from the display element 1 side to the eyepoint EP side. The diopter adjustment lens group consists of only the second lens L2.

Figure 23:
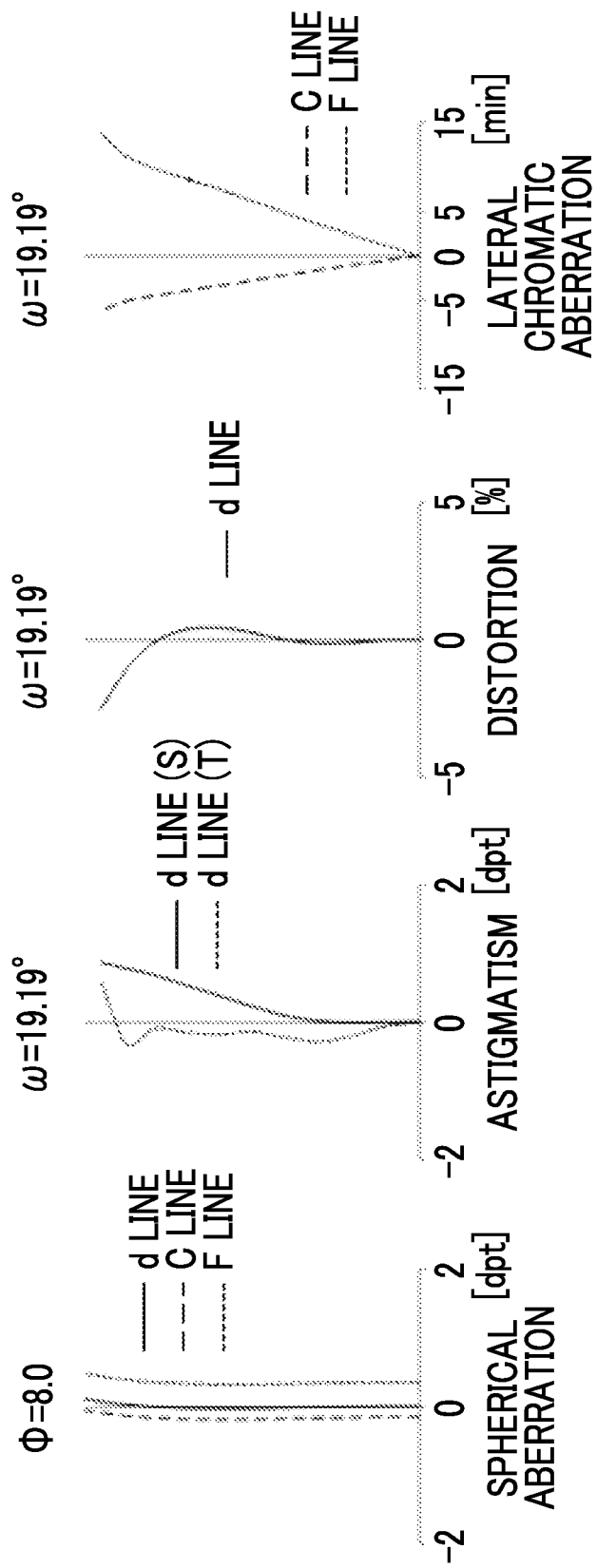
FIG. 23 is various aberration diagrams of the electronic view finder of Example 8.

For the electronic view finder 5 of Example 8, basic lens data is shown in Table 22, specifications and variable surface spacing are shown in Table 23, aspherical coefficients are shown in Table 24, and various aberration diagrams in a state where the diopter is −0.97 diopter are illustrated in FIG. 23.

TABLE 22

Example 8

| Sn | R | D | Nd | νd |
|---|---|---|---|---|
| 1  | ∞       | 0.7000  | 1.51680 | 64.20 |
| 2  | ∞       | 4.3000  |         |       |
| 3  | ∞       | 0.5000  | 1.49023 | 57.49 |
| 4  | ∞       | 0.5000  |         |       |
| *5 | 96.7751 | 4.0335  | 1.85001 | 22.50 |
| *6 | 24.7366 | DD[6]   |         |       |
| *7 | 15.3326 | 6.5863  | 1.54263 | 63.36 |
| *8 | −28.8807 | DD[8]  |         |       |
| *9 | −50.3771 | 5.3578 | 1.53389 | 55.98 |
| *10 | −13.5065 | 0.5000 |        |       |
| 11 | ∞       | 1.2000  | 1.49023 | 57.50 |
| 12 | ∞       | 15.0000 |         |       |
| 13 (EP) | ∞   | DD[13]  |         |       |

TABLE 23

Example 8

| Diopter | −1 dpt | −7.375 dpt | +2.5 dpt |
|---|---|---|---|
| f                       | 17.83 | 17.83 | 17.83 |
| Apparent Field of View (°) | 38.38 | 34.15 | 41.07 |
| DD[6]                   | 2.75  | 1.05  | 3.67  |
| DD[8]                   | 0.97  | 2.67  | 0.06  |
| H                       | 6.405 |       |       |

TABLE 24

Example 8

| Sn | 5 | 6 | 7 | 8 |
|---|---|---|---|---|
| KA  | 1.0000000E+00  | 1.0000000E+00  | 1.0000000E+00  | 1.0000000E+00 |
| A4  | −9.1591252E−05 | −1.3695323E−04 | −2.9123986E−04 | 1.0237104E−04 |
| A6  | 8.8464316E−07  | 7.7490390E−06  | 3.9734330E−06  | −2.6276750E−06 |
| A8  | 3.1487141E−07  | −3.2093611E−07 | −1.2658471E−07 | 2.6410714E−08 |
| A10 | −4.3122167E−08 | 3.1959454E−09  | 1.3114000E−09  | 7.1900360E−11 |
| A12 | 1.6791393E−09  | −3.0966505E−12 | 6.1431873E−11  | −5.9275905E−12 |
| A14 | −2.8284606E−11 | 6.9312255E−13  | −2.4239761E−12 | 8.6252213E−15 |
| A16 | −6.1137240E−14 | −2.3716285E−14 | 3.6297008E−14  | 1.1182429E−15 |

TABLE 24-continued

| | Example 8 | | | |
|---|---|---|---|---|
| A18 | 8.4084505E−15 | 2.5836253E−16 | −2.5733768E−16 | −1.2223153E−17 |
| A20 | −8.2143509E−17 | −9.6919301E−19 | 7.1388655E−19 | 3.9067210E−20 |

| Sn | 9 | 10 |
|---|---|---|
| KA | 1.0000000E+00 | 1.0000000E+00 |
| A4 | 1.9813082E−04 | 1.0402258E−04 |
| A6 | −7.7182297E−07 | 7.2382417E−07 |
| A8 | 1.7079509E−08 | 3.9245458E−10 |
| A10 | −4.6585012E−10 | −6.7015269E−11 |
| A12 | 3.8648761E−12 | 6.6163574E−13 |
| A14 | 1.7878163E−14 | 8.3512872E−15 |
| A16 | −3.0877257E−16 | −5.5608466E−17 |
| A18 | 7.5742686E−20 | −7.2432508E−19 |
| A20 | 6.1915704E−21 | 5.3614536E−21 |

Example 9

Figure 24:
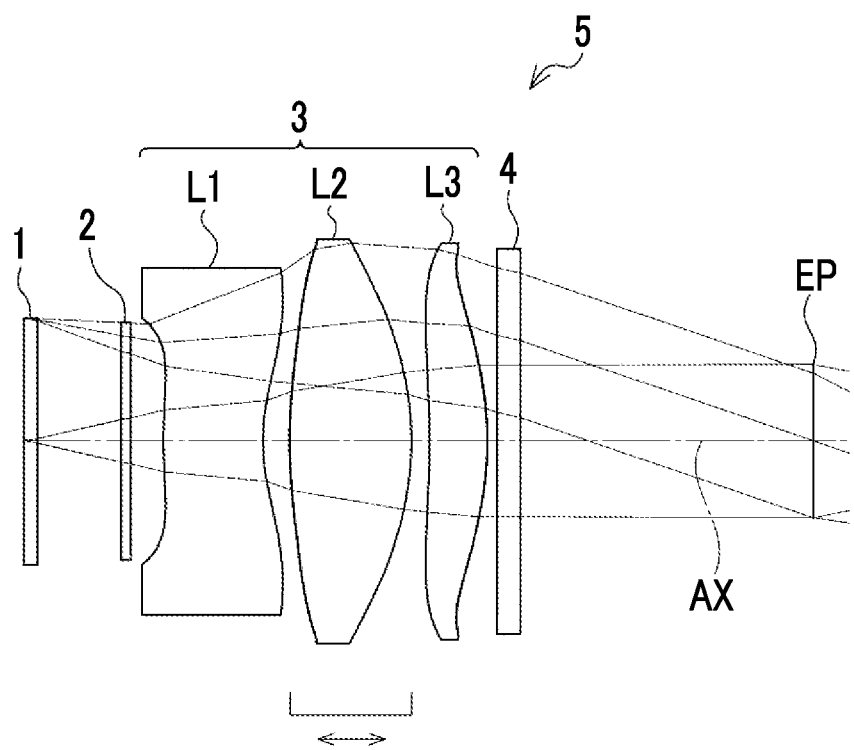
FIG. 24 is a cross section diagram illustrating a configuration and luminous flux of an electronic view finder of Example 9.

A configuration and luminous flux of the electronic view finder 5 of Example 9 are illustrated in FIG. 24. The electronic view finder 5 of Example 9 comprises the display element 1, the optical member 2, the eyepiece lens 3, and the optical member 4 in order from the display element 1 side to the eyepoint EP side. The eyepiece lens 3 consists of the first lens L1 that is a negative lens, the second lens L2 that is a positive lens, and the third lens L3 that is a positive lens, in order from the display element 1 side to the eyepoint EP side. The diopter adjustment lens group consists of only the second lens L2.

Figure 25:
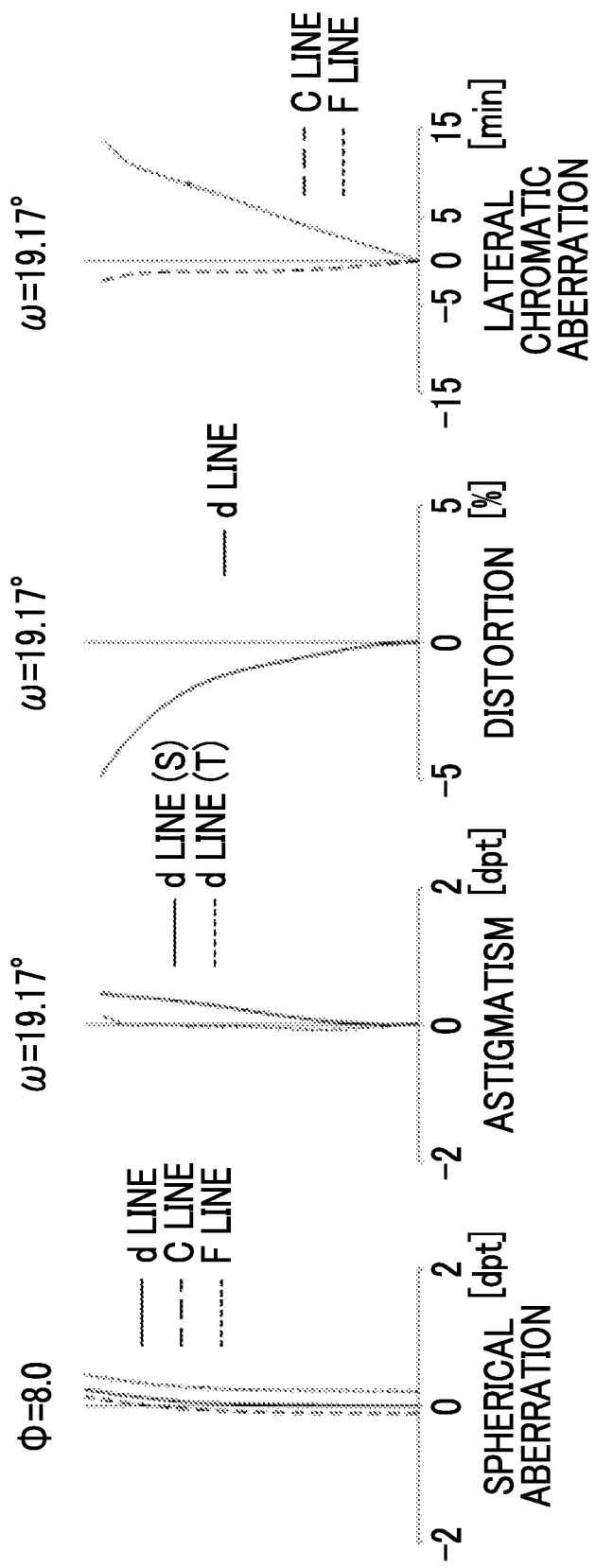
FIG. 25 is various aberration diagrams of the electronic view finder of Example 9.

For the electronic view finder 5 of Example 9, basic lens data is shown in Table 25, specifications and variable surface spacing are shown in Table 26, aspherical coefficients are shown in Table 27, and various aberration diagrams in a state where the diopter is −0.94 diopter are illustrated in FIG. 25.

TABLE 25

| | Example 9 | | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |

TABLE 25-continued

| | Example 9 | | | |
|---|---|---|---|---|
| Sn | R | D | Nd | vd |
| 4 | ∞ | 1.6700 | | |
| *5 | 26.3212 | 5.0829 | 1.90001 | 20.00 |
| *6 | 10.4600 | DD[6] | | |
| *7 | 28.6108 | 6.2701 | 1.74576 | 53.42 |
| *8 | −15.2363 | DD[8] | | |
| *9 | −40.9365 | 2.9911 | 1.79260 | 48.74 |
| *10 | −17.4157 | 0.5000 | | |
| 11 | ∞ | 1.2000 | 1.49023 | 57.50 |
| 12 | ∞ | 15.0000 | | |
| 13 (EP) | ∞ | | | |

TABLE 26

| | Example 9 | | |
|---|---|---|---|
| Diopter | −1 dpt | −4 dpt | +2 dpt |
| f | 17.44 | 17.44 | 17.44 |
| Apparent Field of View (°) | 38.35 | 36.24 | 40.74 |
| DD[6] | 1.37 | 0.95 | 1.78 |
| DD[8] | 0.92 | 1.34 | 0.50 |
| H | 6.405 | | |

TABLE 27

| | Example 9 | | | |
|---|---|---|---|---|
| Sn | 5 | 6 | 7 | 8 |
| KA | 2.0998770E−01 | 8.5577522E−01 | 1.8745001E+00 | −3.9834286E+00 |
| A4 | −7.4476936E−04 | −9.2481706E−04 | −1.3896263E−04 | 1.1640797E−04 |
| A6 | −1.4937007E−05 | 1.3676247E−05 | 9.0714260E−08 | −1.1660208E−05 |
| A8 | 2.1632824E−06 | −7.1893465E−07 | 2.0922703E−08 | 4.6701616E−07 |
| A10 | −2.4971276E−07 | 3.4843837E−08 | −6.9835714E−10 | −1.3328025E−08 |
| A12 | 1.9392483E−08 | −1.0977857E−09 | 3.5278480E−11 | 2.3625620E−10 |
| A14 | −1.0620403E−09 | 2.0545163E−11 | −1.0352883E−12 | −1.4993465E−12 |
| A16 | 3.9225067E−11 | −1.5427915E−13 | 1.4497780E−14 | −3.3165457E−14 |
| A18 | −9.0058613E−13 | −2.3254646E−15 | −1.6863164E−17 | 9.6613768E−16 |
| A20 | 9.3809392E−15 | 7.8628198E−17 | −2.7224939E−18 | −1.1543069E−17 |
| A22 | 9.1697868E−17 | −9.9198534E−19 | 4.5783652E−20 | 7.4938550E−20 |
| A24 | −4.3254930E−18 | 6.7138108E−21 | −3.6294782E−22 | −2.4803129E−22 |
| A26 | 5.4442582E−20 | −2.3575441E−23 | 1.4820731E−24 | 2.4866178E−25 |
| A28 | −2.5227250E−22 | 3.2533096E−26 | −2.5095260E−27 | 3.9048586E−28 |

| Sn | 9 | 10 |
|---|---|---|
| KA | 2.9384939E+00 | 6.7553118E−01 |
| A4 | 3.0780419E−04 | 9.4082825E−06 |

TABLE 27-continued

| | Example 9 | |
|---|---|---|
| A6 | −2.8887955E−06 | 1.9154574E−05 |
| A8 | −4.8725016E−08 | −2.0833031E−06 |
| A10 | −1.0247807E−09 | 1.3561890E−07 |
| A12 | 2.0913084E−10 | −5.6449881E−09 |
| A14 | −7.2107629E−12 | 1.5396467E−10 |
| A16 | 1.0606073E−13 | −2.7380228E−12 |
| A18 | −1.7095968E−16 | 3.0196434E−14 |
| A20 | −1.9090533E−17 | −1.6827509E−16 |
| A22 | 3.2652446E−19 | −1.6689619E−19 |
| A24 | −2.6009189E−21 | 9.0236678E−21 |
| A26 | 1.0639285E−23 | −5.3640546E−23 |
| A28 | −1.8025343E−26 | 1.1035877E−25 |

Example 10

Figure 26:
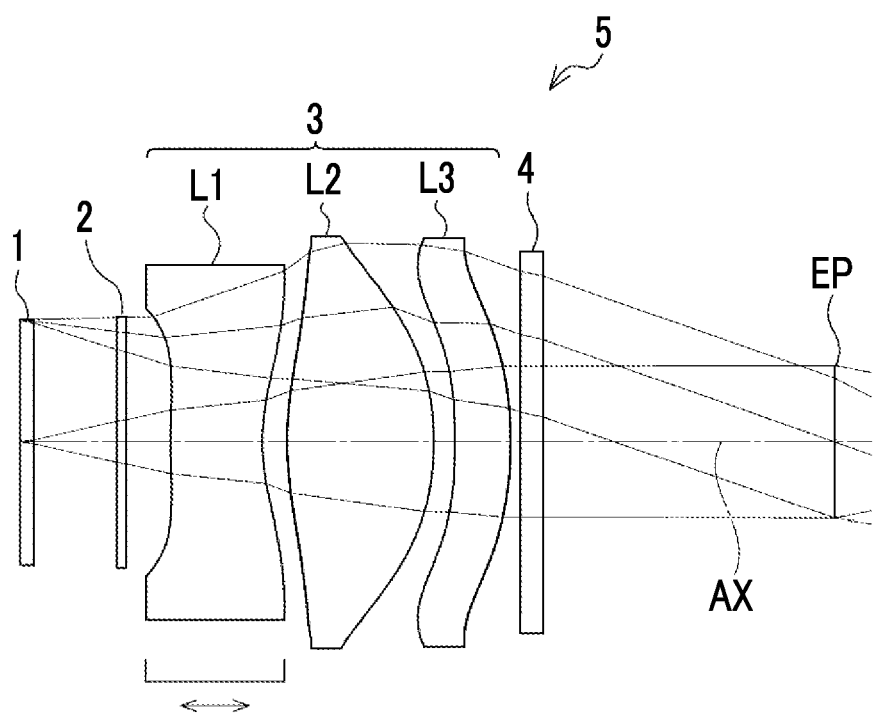
FIG. 26 is a cross section diagram illustrating a configuration and luminous flux of an electronic view finder of Example 10.

A configuration and luminous flux of the electronic view finder 5 of Example 10 are illustrated in FIG. 26. The electronic view finder 5 of Example 10 comprises the display element 1, the optical member 2, the eyepiece lens 3, and the optical member 4 in order from the display element 1 side to the eyepoint EP side. The eyepiece lens 3 consists of the first lens L1 that is a negative lens, the second lens L2 that is a positive lens, and the third lens L3 that is a positive lens, in order from the display element 1 side to the eyepoint EP side. The diopter adjustment lens group consists of only the first lens L1.

Figure 27:
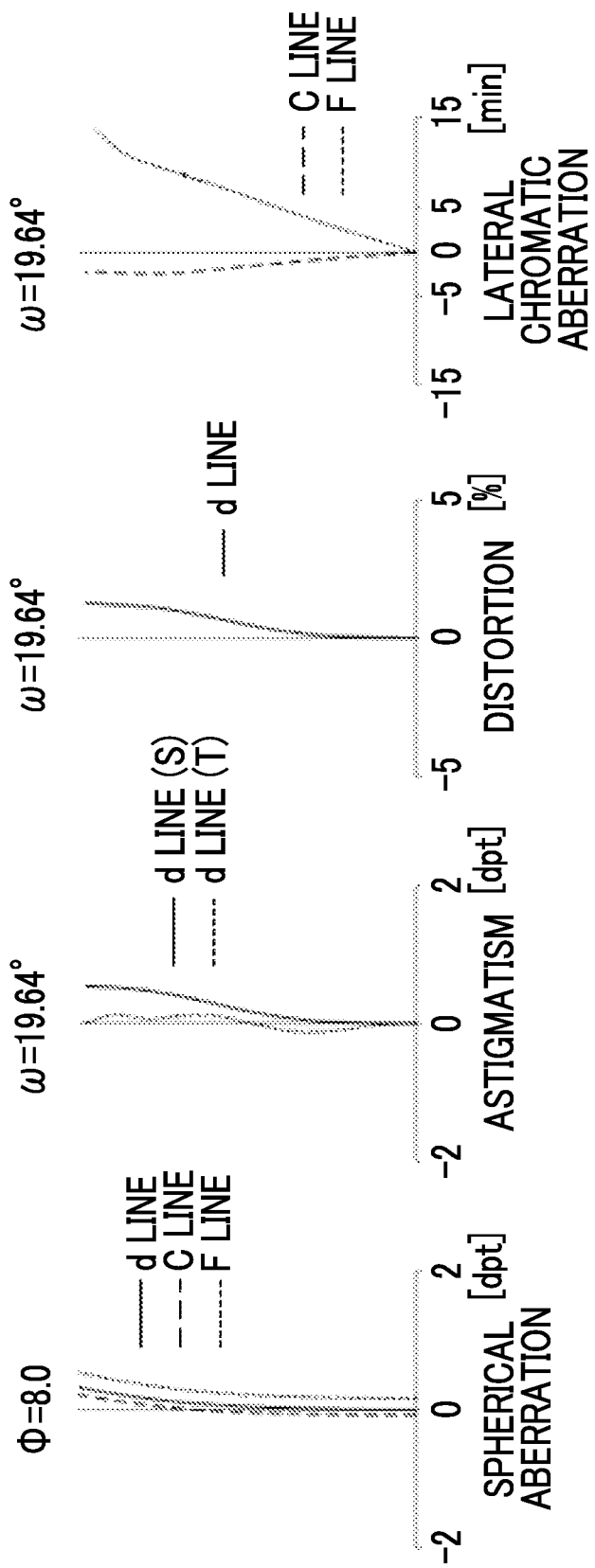
FIG. 27 is various aberration diagrams of the electronic view finder of Example 10.

For the electronic view finder 5 of Example 10, basic lens data is shown in Table 28, specifications and variable surface spacing are shown in Table 29, aspherical coefficients are shown in Table 30, and various aberration diagrams in a state where the diopter is −0.98 diopter are illustrated in FIG. 27.

TABLE 28

| | Example 10 | | | |
|---|---|---|---|---|
| Sn | R | D | Nd | νd |
| 1 | ∞ | 0.7000 | 1.51680 | 64.20 |
| 2 | ∞ | 4.3000 | | |
| 3 | ∞ | 0.5000 | 1.49023 | 57.49 |

TABLE 28-continued

| | Example 10 | | | |
|---|---|---|---|---|
| Sn | R | D | Nd | νd |
| 4 | ∞ | DD[4] | | |
| *5 | 50.0559 | 4.6892 | 1.90000 | 20.00 |
| *6 | 10.7436 | DD[6] | | |
| *7 | 18.0467 | 7.5828 | 1.80836 | 47.16 |
| *8 | −15.4710 | 1.0826 | | |
| *9 | −37.0686 | 2.8715 | 1.73010 | 54.99 |
| *10 | −21.8040 | 0.5000 | | |
| 11 | ∞ | 1.2000 | 1.49023 | 57.50 |
| 12 | ∞ | 15.0000 | | |
| 13 (EP) | ∞ | | | |

TABLE 29

| | Example 10 | | |
|---|---|---|---|
| Diopter | −1 dpt | −4.125 dpt | +1.875 dpt |
| f | 18.11 | 18.11 | 18.11 |
| Apparent Field of View (°) | 39.28 | 36.36 | 42.58 |
| DD[4] | 2.29 | 2.83 | 1.76 |
| DD[6] | 1.28 | 0.75 | 1.81 |
| H | 6.405 | | |

TABLE 30

| | Example 10 | | | |
|---|---|---|---|---|
| Sn | 5 | 6 | 7 | 8 |
| KA | −5.0000000E+00 | 6.9274594E−01 | 6.8990681E−01 | −4.3445726E+00 |
| A4 | −6.8298678E−04 | −9.4229187E−04 | −2.5159142E−04 | −4.7606705E−04 |
| A6 | 1.1284772E−05 | 1.9840654E−05 | −1.7694190E−06 | −5.8729955E−07 |
| A8 | −7.1862762E−07 | −6.8345400E−07 | 1.0461267E−07 | 3.9171242E−07 |
| A10 | −1.7049655E−08 | 9.3503703E−09 | −5.7026268E−10 | −1.7386379E−08 |
| A12 | 5.5351503E−09 | 5.5002334E−10 | −9.0830125E−11 | 4.7246946E−10 |
| A14 | −4.2447302E−10 | −3.2038636E−11 | 3.4395521E−12 | −8.5298093E−12 |
| A16 | 1.7405141E−11 | 6.7497809E−13 | −5.1617986E−14 | 9.9001831E−14 |
| A18 | −3.8597669E−13 | −3.2973630E−15 | 8.8145287E−17 | −6.2551966E−16 |
| A20 | 2.7198385E−15 | −1.3996223E−16 | 9.2452534E−18 | 7.3449915E−20 |
| A22 | 8.0052834E−17 | 3.3708032E−18 | −1.5874480E−19 | 3.4176746E−20 |
| A24 | −2.3408329E−18 | −3.4707784E−20 | 1.2657659E−21 | −2.8455228E−22 |
| A26 | 2.4872064E−20 | 1.7981174E−22 | −5.1790952E−24 | 1.0514630E−24 |
| A28 | −1.0028790E−22 | −3.8244355E−25 | 8.7742665E−27 | −1.5523845E−27 |

| Sn | 9 | 10 |
|---|---|---|
| KA | −4.9999962E+00 | 6.4562116E−01 |
| A4 | −5.9530622E−04 | −1.9119487E−04 |
| A6 | 4.1285890E−06 | 2.3819836E−06 |
| A8 | 1.1302645E−07 | −4.5670727E−08 |
| A10 | −3.1728430E−09 | −4.0188213E−10 |

TABLE 30-continued

| | Example 10 | |
|---|---|---|
| A12 | 6.6647858E−11 | 1.0729007E−10 |
| A14 | −1.1938660E−12 | −3.7227195E−12 |
| A16 | 1.5825972E−14 | 5.4680906E−14 |
| A18 | −1.4260148E−16 | −8.2491308E−17 |
| A20 | 7.8907228E−19 | −9.9894538E−18 |
| A22 | −1.8728292E−21 | 1.7020446E−19 |
| A24 | −5.0208327E−24 | −1.3542018E−21 |
| A26 | 4.4197158E−26 | 5.5364731E−24 |
| A28 | −8.4801746E−29 | −9.3770798E−27 |

Example 11

Figure 28:
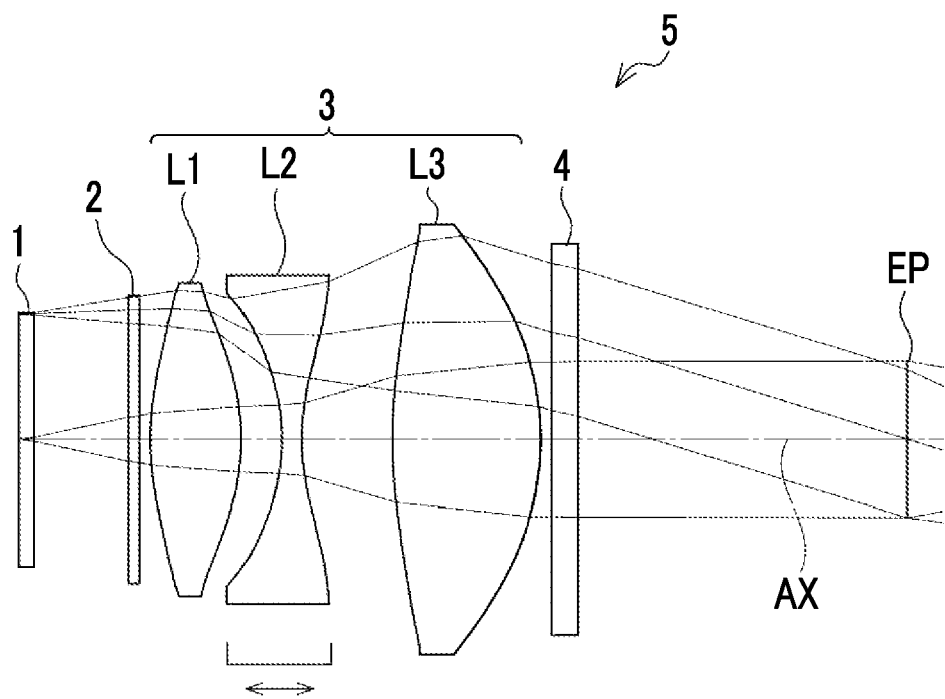
FIG. 28 is a cross section diagram illustrating a configuration and luminous flux of an electronic view finder of Example 11.

A configuration and luminous flux of the electronic view finder 5 of Example 11 are illustrated in FIG. 28. The electronic view finder 5 of Example 11 comprises the display element 1, the optical member 2, the eyepiece lens 3, and the optical member 4 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The diopter adjustment lens group consists of only the second lens L2.

Figure 29:
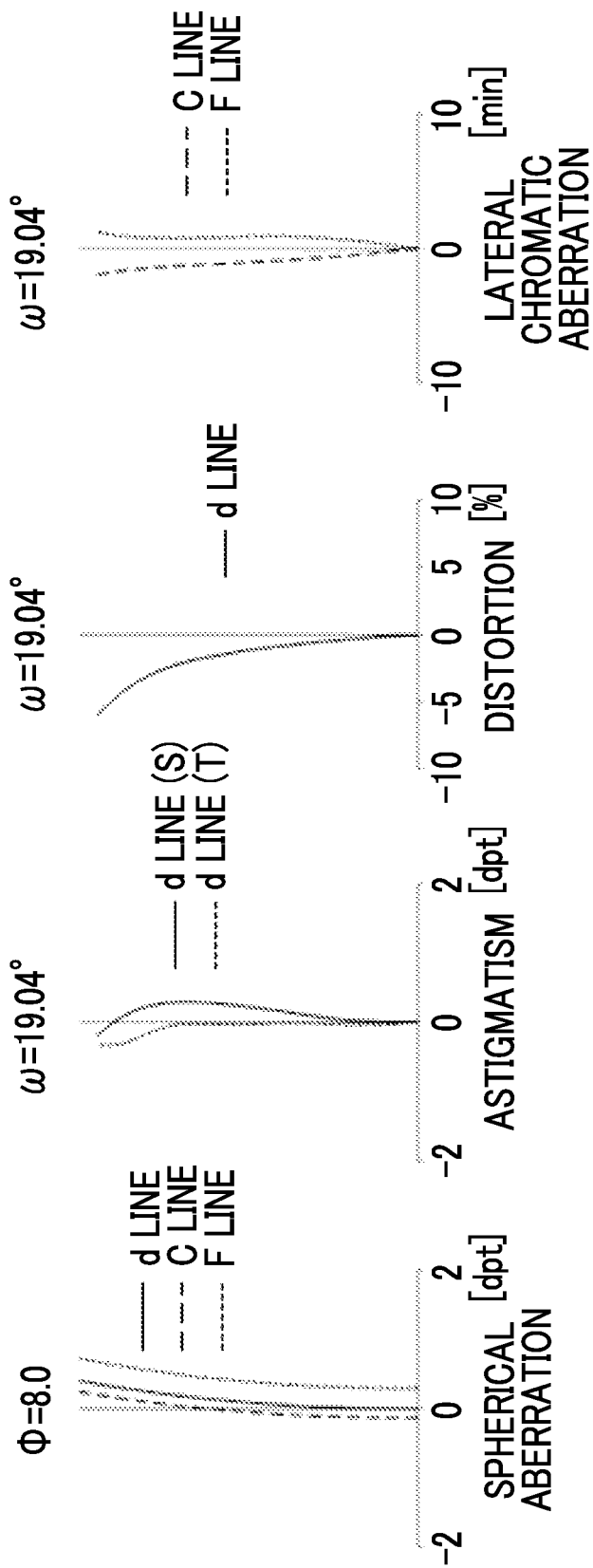
FIG. 29 is various aberration diagrams of the electronic view finder of Example 11.

For the electronic view finder 5 of Example 11, basic lens data is shown in Table 31, specifications and variable surface spacing are shown in Table 32, aspherical coefficients are shown in Table 33, and various aberration diagrams in a state where the diopter is −1.10 diopter are illustrated in FIG. 29.

TABLE 31

| | Example 11 | | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |

TABLE 31-continued

| | Example 11 | | | |
|---|---|---|---|---|
| Sn | R | D | Nd | vd |
| 4 | ∞ | 0.5000 | | |
| *5 | 15.3760 | 4.1583 | 1.87245 | 40.75 |
| *6 | −13.0490 | DD[6] | | |
| *7 | −10.9979 | 0.8976 | 1.90000 | 20.00 |
| *8 | 12.9424 | DD[8] | | |
| *9 | 28.2216 | 6.7765 | 1.85960 | 42.04 |
| *10 | −15.6410 | 0.5000 | | |
| 11 | ∞ | 1.2000 | 1.49023 | 57.50 |
| 12 | ∞ | 15.0000 | | |
| 13 (EP) | ∞ | | | |

TABLE 32

| | Example 11 | | |
|---|---|---|---|
| Diopter | −1 dpt | −4.275 dpt | +1.75 dpt |
| f | 17.17 | 17.17 | 17.17 |
| Apparent Field of View (°) | 38.08 | 35.33 | 41.37 |
| DD[6] | 1.83 | 2.30 | 1.36 |
| DD[8] | 4.15 | 3.67 | 4.62 |
| H | 6.405 | | |

TABLE 33

| | Example 11 | | | |
|---|---|---|---|---|
| Sn | 5 | 6 | 7 | 8 |
| KA | −4.9439692E+00 | 8.5823980E−01 | 5.2121587E−01 | −8.3367955E−01 |
| A4 | −273609046E−04 | 1.1193054E−04 | 4.2403712E−04 | −1.4545180E−03 |
| A6 | 8.35866188E−06 | 3.9163262E−06 | −1.9053142E−05 | 5.7619718E−04 |
| A8 | −5.7815244E−07 | −2.2926730E−07 | 1.6200553E−06 | −1.1017854E−04 |
| A10 | 2.5799214E−08 | 8.5482616E−09 | −1.4739360E−07 | 1.1027014E−05 |
| A12 | −3.6943749E−10 | −1.1621174E−10 | 9.3482751E−09 | −6.4477071E−07 |
| A14 | −2.1839912E−11 | −5.7350231E−12 | −3.9641356E−10 | 2.2532037E−08 |
| A16 | 1.4349450E−12 | 3.8705734E−13 | 1.0855830E−11 | −4.2845460E−10 |
| A18 | −3.9563858E−14 | −1.0713908E−14 | −1.7096982E−13 | 1.6875620E−12 |
| A20 | 5.9331182E−16 | 1.6077316E−16 | 7.1545064E−16 | 1.2064773E−13 |
| A22 | −4.3248015E−18 | −1.1696943E−18 | 2.7431284E−17 | −3.1460192E−15 |
| A24 | 8.2341790E−22 | 1.6750699E−22 | −5.8846485E−19 | 3.7131507E−17 |
| A26 | 1.9742655E−22 | 5.4010652E−23 | 4.9872049E−21 | −2.2492596E−19 |
| A28 | −9.1945693E−25 | −2.5088543E−25 | −1.6410526E−23 | 5.6565395E−22 |

| Sn | 9 | 10 |
|---|---|---|
| KA | −1.6421382E−01 | 9.1527553E−01 |
| A4 | −1.3704310E−04 | 7.8941332E−06 |
| A6 | 3.4051784E−06 | 8.4784425E−07 |
| A8 | −1.4509957E−07 | −4.7186270E−08 |
| A10 | 4.2093994E−09 | 1.8395790E−09 |
| A12 | −7.7730807E−11 | −5.0984964E−11 |
| A14 | 1.0652185E−12 | 9.9350803E−13 |
| A16 | −1.7518281E−14 | −1.3047645E−14 |

TABLE 33-continued

| | Example 11 | |
|---|---|---|
| A18 | 3.7880223E−16 | 1.0781811E−16 |
| A20 | −6.4633765E−18 | −4.4308444E−19 |
| A22 | 7.0536972E−20 | −6.0742027E−22 |
| A24 | −4.6507646E−22 | 1.6739303E−23 |
| A26 | 1.6985069E−24 | −7.6452474E−26 |
| A28 | −2.6469090E−27 | 1.2369999E−28 |

Example 12

Figure 30:
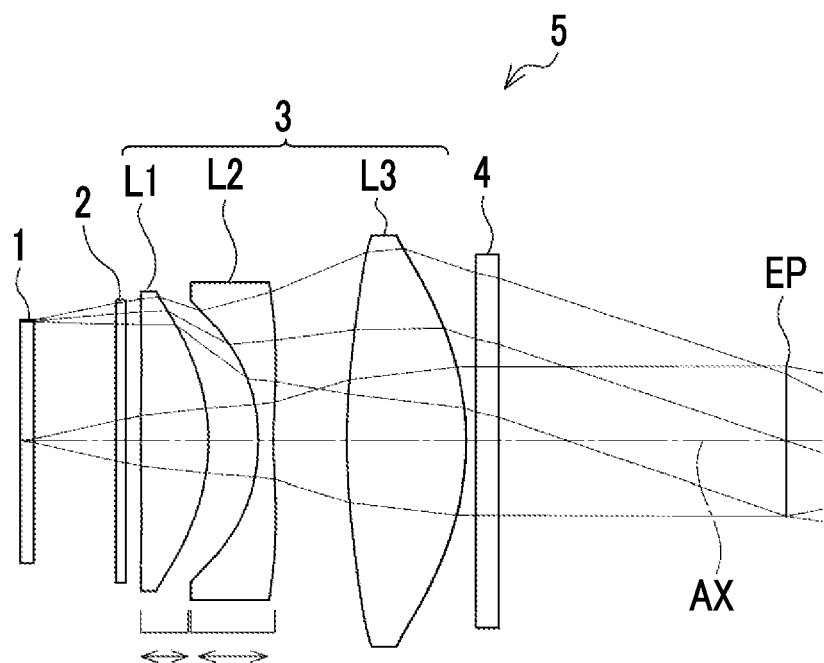
FIG. 30 is a cross section diagram illustrating a configuration and luminous flux of an electronic view finder of Example 12.

A configuration and luminous flux of the electronic view finder 5 of Example 12 are illustrated in FIG. 30. The electronic view finder 5 of Example 12 comprises the display element 1, the optical member 2, the eyepiece lens 3, and the optical member 4 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The electronic view finder 5 of Example 12 includes two diopter adjustment lens groups that are moved along the optical axis AX by changing an interval between each other during the diopter adjustment. A first diopter adjustment lens group consists of only the first lens L1, and the second diopter adjustment lens group consists of only the second lens L2.

Figure 31:
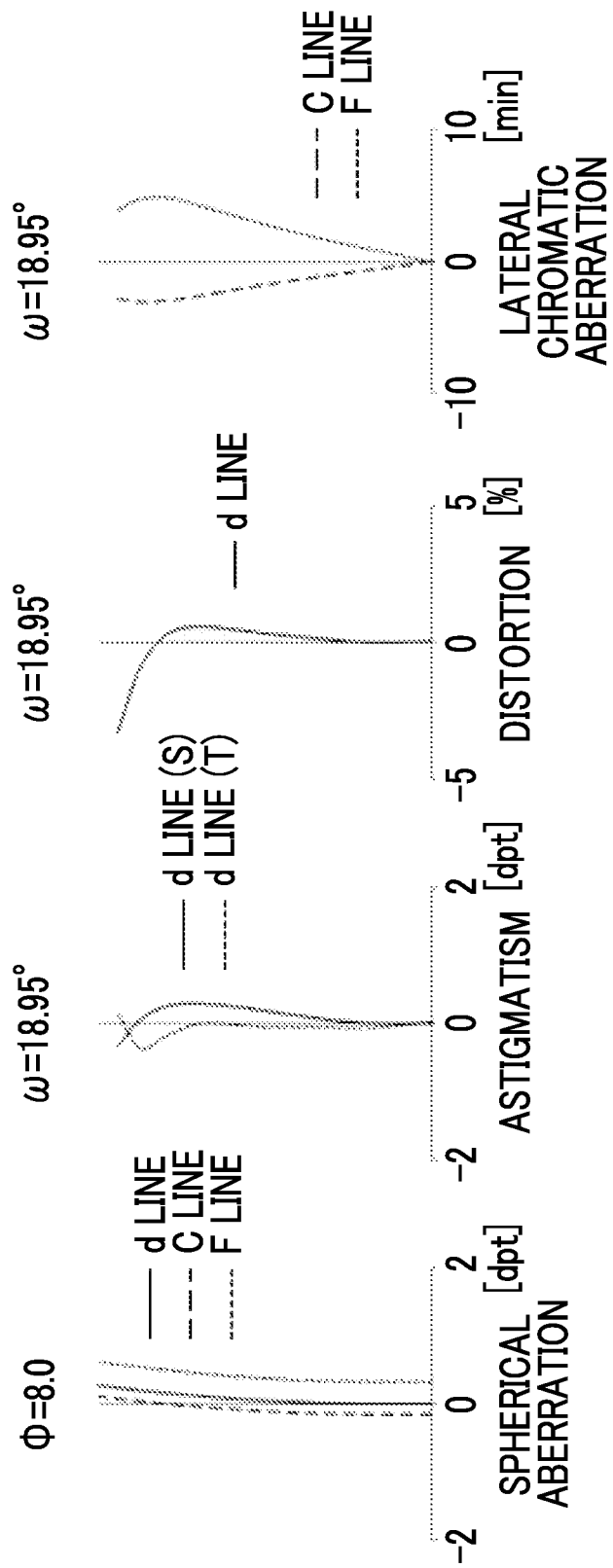
FIG. 31 is various aberration diagrams of the electronic view finder of Example 12.

For the electronic view finder 5 of Example 12, basic lens data is shown in Table 34, specifications and variable surface spacing are shown in Table 35, aspherical coefficients are shown in Table 36, and various aberration diagrams in a state where the diopter is −0.98 diopter are illustrated in FIG. 31.

TABLE 34

| | Example 12 | | | |
|---|---|---|---|---|
| Sn | R | D | Nd | vd |
| 1 | ∞ | 0.7000 | 1.51680 | 64.20 |
| 2 | ∞ | 4.3000 | | |

TABLE 34-continued

| | Example 12 | | | |
|---|---|---|---|---|
| Sn | R | D | Nd | vd |
| 3 | ∞ | 0.5000 | 1.49023 | 57.49 |
| 4 | ∞ | DD[4] | | |
| *5 | 112.1859 | 3.5617 | 1.87369 | 40.63 |
| *6 | −11.3611 | DD[6] | | |
| *7 | −10.9269 | 0.8000 | 1.90000 | 20.00 |
| *8 | 29.4726 | DD[8] | | |
| *9 | 36.3021 | 6.2491 | 1.86903 | 41.10 |
| *10 | −15.4867 | 0.5000 | | |
| 11 | ∞ | 1.2000 | 1.49023 | 57.50 |
| 12 | ∞ | 15.0000 | | |
| 13 (EP) | ∞ | | | |

TABLE 35

| | Example 12 | | |
|---|---|---|---|
| Diopter | −1 dpt | −4.075 dpt | +1.95 dpt |
| f | 17.87 | 17.87 | 17.87 |
| Apparent Field of View (°) | 37.90 | 35.24 | 41.60 |
| DD[4] | 0.80 | 0.50 | 1.55 |
| DD[6] | 2.55 | 3.24 | 1.64 |
| DD[8] | 3.85 | 3.46 | 4.01 |
| H | 6.405 | | |

TABLE 36

| | Example 12 | | | |
|---|---|---|---|---|
| Sn | 5 | 6 | 7 | 8 |
| KA | 5.0000000E+00 | 8.2993782E−01 | 5.3702173E−01 | −4.4908187E+00 |
| A4 | −2.1279753E−04 | 2.1814131E−05 | −6.1526398E−04 | −8.1616100E−04 |
| A6 | 5.3791453E−06 | −5.3189513E−07 | 1.7178355E−05 | 2.2988465E−05 |
| A8 | −2.1343661E−07 | 2.2277164E−07 | −9.6712407E−07 | −8.1711469E−07 |
| A10 | 8.6352891E−09 | −1.1990505E−08 | 7.9578157E−08 | 2.8171838E−08 |
| A12 | −1.2774561E−10 | 1.7595303E−10 | −4.9817805E−09 | −6.0890379E−10 |
| A14 | −6.7643179E−12 | 1.1890947E−11 | 2.1082406E−10 | 7.8332623E−12 |
| A16 | 4.5366532E−13 | −7.6749240E−13 | −5.7698768E−12 | −2.8732864E−13 |
| A18 | −1.2532266E−14 | 2.1122287E−14 | 9.0845461E−14 | 1.7457625E−14 |
| A20 | 1.8759007E−16 | −3.1705356E−16 | −3.8011227E−16 | −5.6936892E−16 |
| A22 | −1.3570967E−18 | 2.3216432E−18 | −1.4572446E−17 | 1.0421399E−17 |
| A24 | 7.1406926E−23 | −6.3855985E−22 | 3.1260450E−19 | −1.1058005E−19 |
| A26 | 6.3888046E−23 | −1.0393217E−22 | −2.6492816E−21 | 6.4001413E−22 |
| A28 | −2.9512401E−25 | 4.8655022E−25 | 8.7175609E−24 | −1.5701039E−24 |

| Sn | 9 | 10 |
|---|---|---|
| KA | 2.9642932E+00 | 9.0541006E−01 |
| A4 | −9.2212358E−05 | 2.7835546E−05 |
| A6 | 2.8891639E−06 | 2.3893916E−07 |
| A8 | −1.8605950E−07 | 1.0877323E−08 |
| A10 | 7.9619561E−09 | −8.1941718E−10 |
| A12 | −2.2861243E−10 | 2.6198370E−11 |
| A14 | 4.4855037E−12 | −5.1618631E−13 |

TABLE 36-continued

| | Example 12 | |
|---|---|---|
| A16 | −5.8966923E−14 | 6.7324569E−15 |
| A18 | 4.8769766E−16 | −5.5495004E−17 |
| A20 | −2.0154933E−18 | 2.3283827E−19 |
| A22 | −2.5605377E−21 | 2.1775934E−22 |
| A24 | 7.4268326E−23 | −7.8335074E−24 |
| A26 | −3.4015205E−25 | 3.6220451E−26 |
| A28 | 5.5049624E−28 | −5.8642772E−29 |

Example 13

Figure 32:
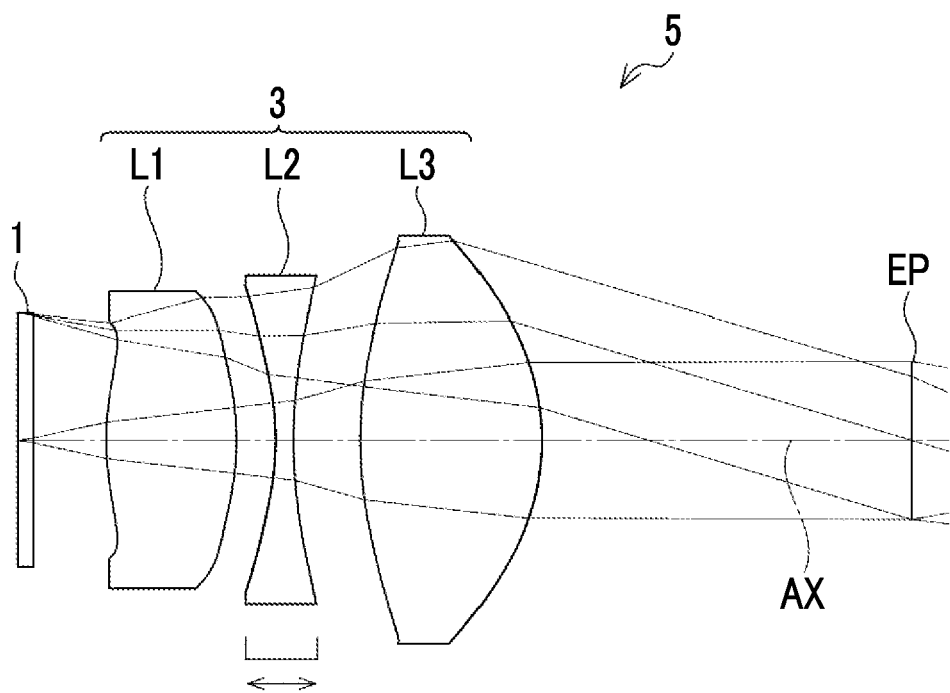
FIG. 32 is a cross section diagram illustrating a configuration and luminous flux of an electronic view finder of Example 13.

A configuration and luminous flux of the electronic view finder 5 of Example 13 are illustrated in FIG. 32. The electronic view finder 5 of Example 13 consists of the display element 1 and the eyepiece lens 3 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The diopter adjustment lens group consists of only the second lens L2.

Figure 33:
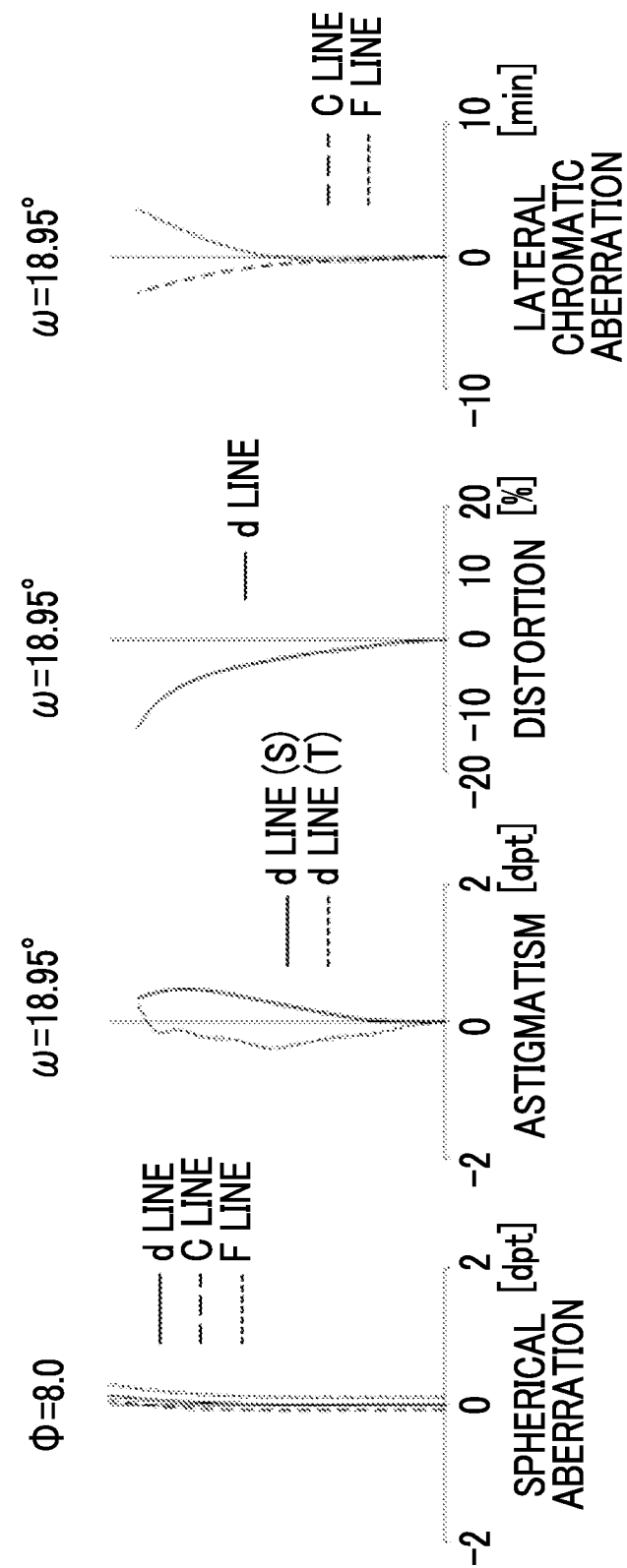
FIG. 33 is various aberration diagrams of the electronic view finder of Example 13.

For the electronic view finder 5 of Example 13, basic lens data is shown in Table 37, specifications and variable surface spacing are shown in Table 38, aspherical coefficients are shown in Table 39, and various aberration diagrams in a state where the diopter is −1.00 diopter are illustrated in FIG. 33.

TABLE 37

| | Example 13 | | | |
|---|---|---|---|---|
| Sn | R | D | Nd | vd |
| 1 | ∞ | 0.7000 | 1.51680 | 64.20 |
| 2 | ∞ | 3.2772 | | |

TABLE 37-continued

| | Example 13 | | | |
|---|---|---|---|---|
| Sn | R | D | Nd | vd |
| *3 | 13.7377 | 5.8792 | 1.60662 | 60.90 |
| *4 | −15.0259 | DD[4] | | |
| *5 | −14.7956 | 0.8000 | 1.87754 | 21.12 |
| *6 | 29.4658 | DD[6] | | |
| *7 | 22.1835 | 8.1427 | 1.69204 | 56.90 |
| *8 | −12.8979 | 16.6294 | | |
| 9 (EP) | ∞ | | | |

TABLE 38

| | Example 13 | | |
|---|---|---|---|
| Diopter | −1 dpt | −4.725 dpt | +2.275 dpt |
| f | 16.44 | 16.44 | 16.44 |
| Apparent Field of View (°) | 36.78 | 33.87 | 40.19 |
| DD[4] | 1.76 | 2.48 | 1.05 |
| DD[6] | 3.00 | 2.29 | 3.72 |
| H | 6.405 | | |

TABLE 39

| | Example 13 | | | |
|---|---|---|---|---|
| Sn | 3 | 4 | 5 | 6 |
| KA | 1.0000000E+00 | 1.0000000E+00 | 1.0000000E+00 | 1.0000000E+00 |
| A4 | −9.1088510E−04 | 3.1009743E−04 | 3.1606986E−04 | −2.9811664E−00 |
| A6 | 4.6259902E−05 | 2.1372847E−07 | 7.7965144E−07 | −3.4240118E−07 |
| A8 | −2.7929065E−06 | 8.2374027E−08 | −4.4008987E−08 | −8.2790569E−09 |
| A10 | 4.2037860E−08 | −2.7700614E−09 | 7.4321713E−10 | 1.7539026E−10 |
| A12 | 3.1314614E−09 | −4.4283376E−11 | −3.9407185E−11 | −3.4439285E−12 |
| A14 | −1.2654104E−10 | −8.5112781E−13 | 4.0996367E−13 | 2.1962772E−15 |
| A16 | −1.5558939E−12 | 5.3689293E−14 | 1.7064214E−15 | 8.6817562E−16 |
| A18 | 1.3989251E−13 | −4.5414719E−16 | 5.5987709E−17 | −2.0005503E−18 |
| A20 | −1.8554883E−15 | −5.8559190E−20 | −1.0844238E−18 | −6.0599795E−20 |

| Sn | 7 | 8 |
|---|---|---|
| KA | 1.0000000E+00 | 1.0000000E+00 |
| A4 | −1.1206870E−04 | 5.5724518E−05 |
| A6 | 4.8486076E−07 | −4.1168047E−08 |
| A8 | 2.9980798E−09 | 2.3070275E−09 |
| A10 | −2.6002948E−11 | 1.4563536E−11 |
| A12 | −2.0716592E−13 | 3.3318528E−14 |
| A14 | 1.6162358E−16 | −5.7283145E−16 |
| A16 | 1.0864656E−17 | −7.8443025E−18 |
| A18 | 6.1393618E−20 | −1.5804341E−20 |
| A20 | −4.4150710E−22 | 6.2929721E−22 |

Example 14

Figure 34:
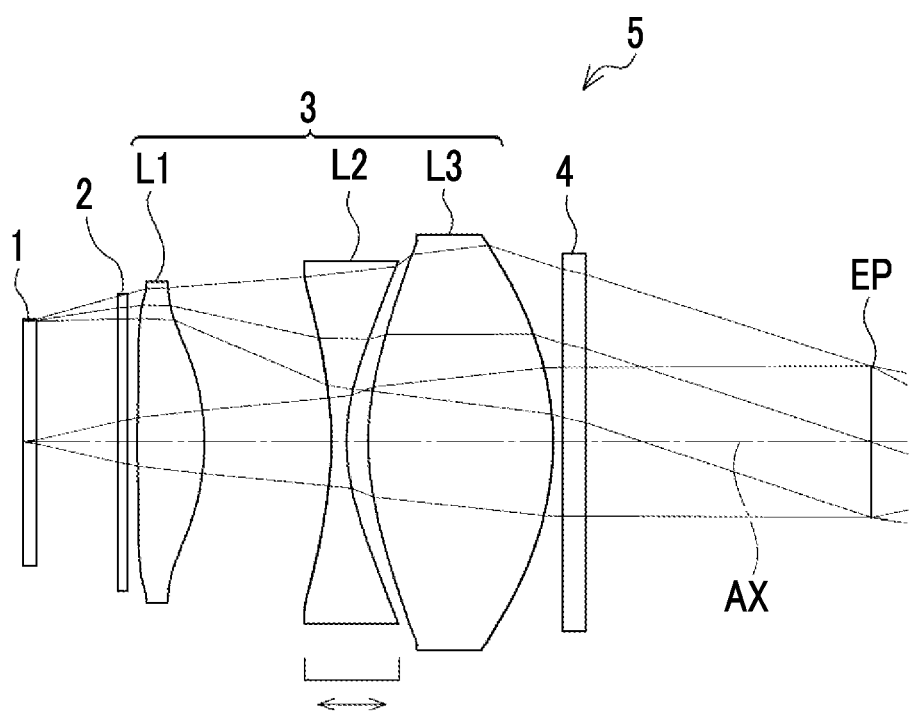
FIG. 34 is a cross section diagram illustrating a configuration and luminous flux of an electronic view finder of Example 14.

A configuration and luminous flux of the electronic view finder 5 of Example 14 are illustrated in FIG. 34. The electronic view finder 5 of Example 14 comprises the display element 1, the optical member 2, the eyepiece lens 3, and the optical member 4 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The diopter adjustment lens group consists of only the second lens L2.

Figure 35:
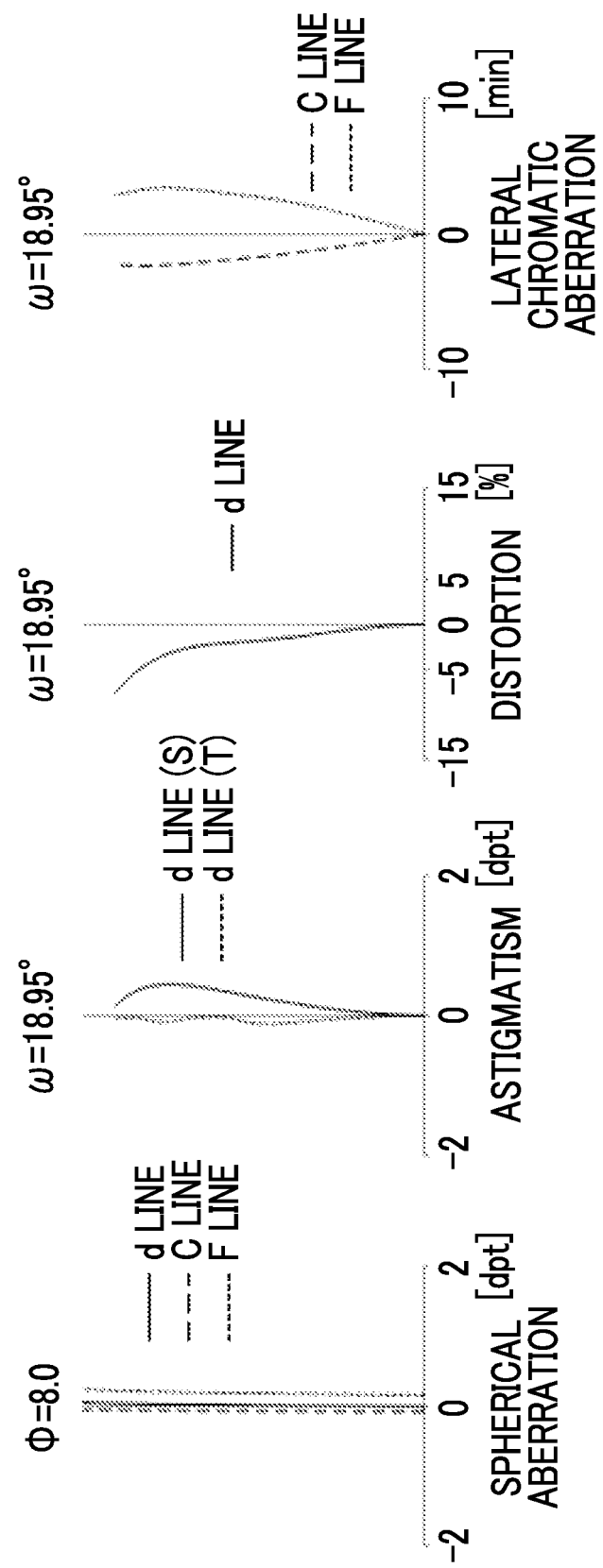
FIG. 35 is various aberration diagrams of the electronic view finder of Example 14.

For the electronic view finder 5 of Example 14, basic lens data is shown in Table 40, specifications and variable surface spacing are shown in Table 41, aspherical coefficients are shown in Table 42, and various aberration diagrams in a state where the diopter is −0.99 diopter are illustrated in FIG. 35.

TABLE 40

| | | Example 14 | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 0.5000 | | |
| *5 | 45.6523 | 3.5179 | 1.83929 | 44.07 |
| *6 | −13.8497 | DD[6] | | |
| *7 | −18.7062 | 0.8000 | 1.79631 | 25.18 |
| *8 | 11.1755 | DD[8] | | |
| *9 | 14.6364 | 9.7218 | 1.83961 | 44.04 |
| *10 | −16.0672 | 0.5000 | | |
| 11 | ∞ | 1.2000 | 1.49023 | 57.50 |
| 12 | ∞ | 15.0000 | | |
| 13 (EP) | ∞ | | | |

TABLE 41

| | Example 14 | | |
|---|---|---|---|
| Diopter | −1 dpt | −4.125 dpt | +1.875 dpt |
| f | 17.59 | 17.59 | 17.59 |
| Apparent Field of View (°) | 36.47 | 34.48 | 38.69 |
| DD[6] | 6.64 | 7.00 | 6.28 |
| DD[8] | 1.13 | 0.77 | 1.50 |
| H | 6.405 | | |

TABLE 42

| | Example 14 | | | |
|---|---|---|---|---|
| Sn | 5 | 6 | 7 | 8 |
| KA | 1.0000000E+00 | 1.0000000E+00 | 1.0000000E+00 | 1.0000000E+00 |
| A4 | −5.3748072E−04 | −1.8876951E−04 | 2.5684205E−04 | −2.4547886E−04 |
| A6 | 2.0783167E−06 | 7.3429695E−07 | −5.3233151E−07 | −1.4041698E−06 |
| A8 | 3.6795299E−07 | 1.7430815E−07 | −3.9002453E−08 | −2.2258711E−08 |
| A10 | −5.9056475E−09 | −2.1509680E−09 | −1.8159155E−09 | 5.4677332E−10 |
| A12 | −1.5636188E−11 | 2.7161352E−12 | 4.6966569E−11 | 2.0694066E−12 |
| A14 | 8.9896556E−13 | 3.9481853E−13 | 4.6904154E−13 | −4.1300596E−14 |
| A16 | 1.8961757E−15 | −4.1769810E−15 | −2.1777616E−14 | −1.1140638E−15 |
| A18 | −1.6850340E−16 | −3.8286782E−17 | 2.1736775E−16 | 1.6840382E−17 |
| A20 | 1.0134156E−18 | 4.9355732E−19 | −7.2232364E−19 | −6.3231851E−20 |

| Sn | 9 | 10 |
|---|---|---|
| KA | 1.0000000E+00 | 1.0000000E+00 |
| A4 | −2.6512323E−04 | 1.9359461E−05 |
| A6 | 1.8878682E−06 | 2.1802275E−07 |
| A8 | −1.1507730E−08 | −7.3773529E−09 |
| A10 | 5.4704432E−11 | 1.7185976E−10 |
| A12 | −6.0557080E−13 | −1.3127140E−12 |
| A14 | −5.3736881E−16 | −4.0213815E−16 |
| A16 | 9.0850111E−17 | 2.6002764E−17 |
| A18 | −6.4068721E−19 | 1.6174461E−19 |
| A20 | 1.2108632E−21 | −1.1361664E−21 |

Example 15

Figure 36:
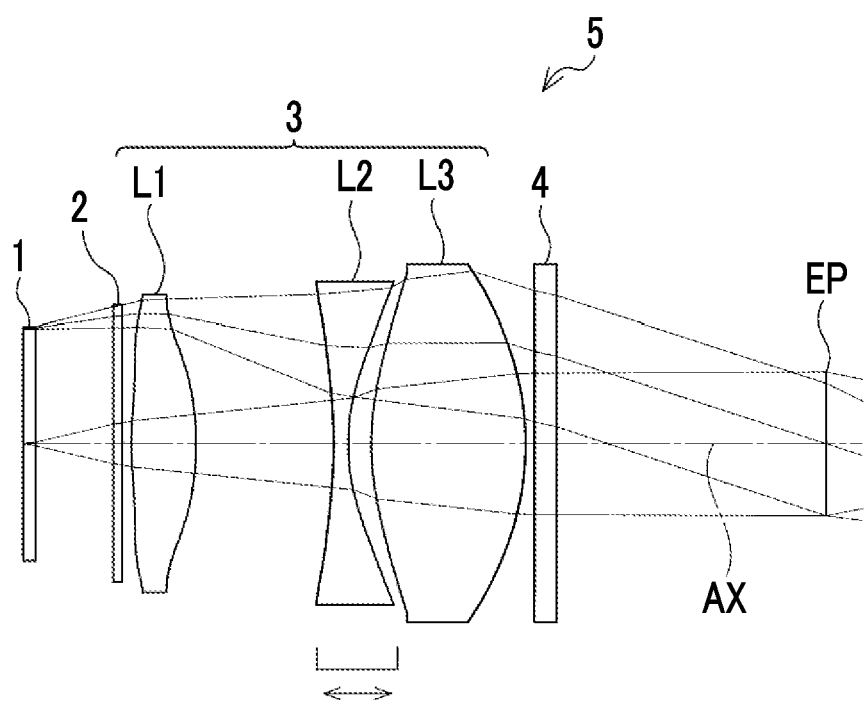
FIG. 36 is a cross section diagram illustrating a configuration and luminous flux of an electronic view finder of Example 15.

A configuration and luminous flux of the electronic view finder 5 of Example 15 are illustrated in FIG. 36. The electronic view finder 5 of Example 15 comprises the display element 1, the optical member 2, the eyepiece lens 3, and the optical member 4 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The diopter adjustment lens group consists of only the second lens L2.

Figure 37:
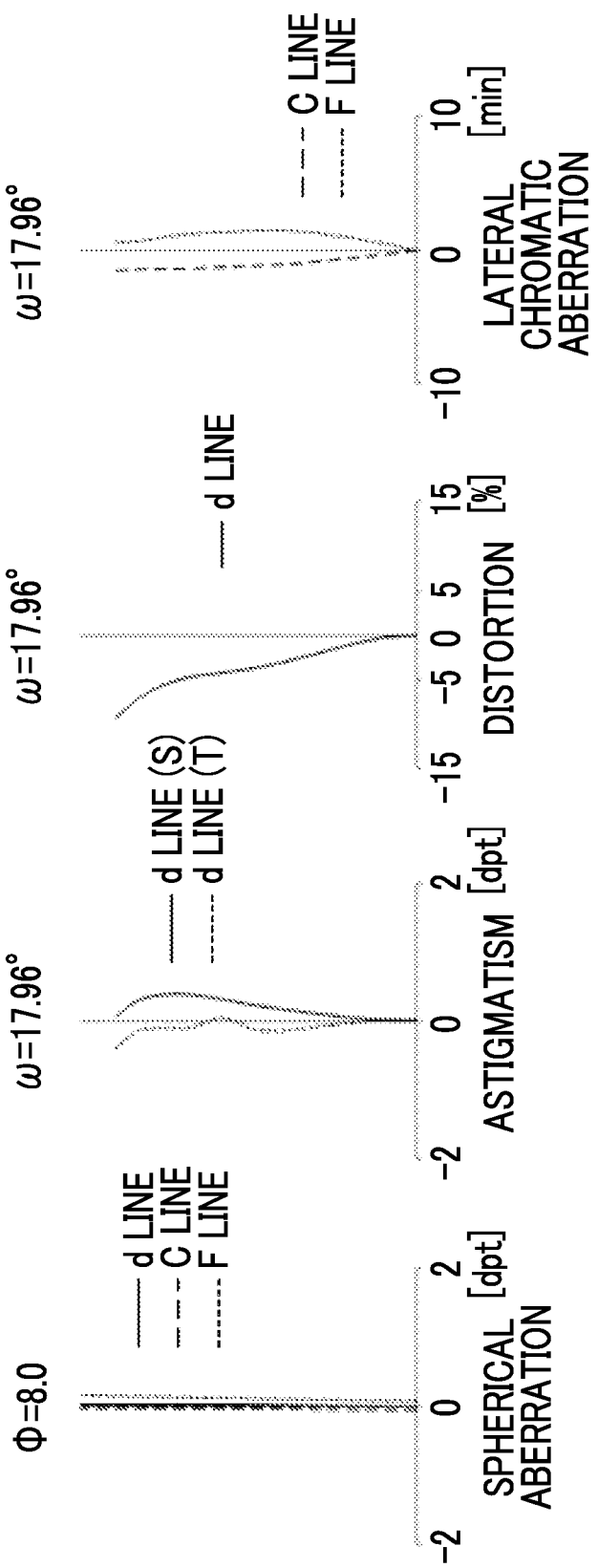
FIG. 37 is various aberration diagrams of the electronic view finder of Example 15.

For the electronic view finder 5 of Example 15, basic lens data is shown in Table 43, specifications and variable surface spacing are shown in Table 44, aspherical coefficients are shown in Table 45, and various aberration diagrams in a state where the diopter is −0.99 diopter are illustrated in FIG. 37.

TABLE 43

| | | Example 15 | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 0.5000 | | |
| *5 | 21.9159 | 3.5931 | 1.83215 | 44.79 |

TABLE 43-continued

Example 15

| Sn | R | D | Nd | vd |
|---|---|---|---|---|
| *6 | −19.1633 | DD[6] | | |
| *7 | −26.0440 | 0.8000 | 1.82711 | 23.64 |
| *8 | 11.4262 | DD[8] | | |
| *9 | 15.5079 | 8.4897 | 1.83748 | 44.25 |
| *10 | −16.3623 | 0.5000 | | |
| 11 | ∞ | 1.2000 | 1.49023 | 57.50 |
| 12 | ∞ | 15.0000 | | |
| 13 (EP) | ∞ | | | |

TABLE 44

Example 15

| Diopter | −1 dpt | −4.125 dpt | +1.875 dpt |
|---|---|---|---|
| f | 17.45 | 17.45 | 17.45 |
| Apparent Field of View (°) | 35.91 | 33.78 | 38.37 |
| DD[6] | 7.64 | 8.01 | 7.26 |
| DD[8] | 1.29 | 0.92 | 1.67 |
| H | 6.405 | | |

TABLE 45

Example 15

| Sn | 5 | 6 | 7 | 8 |
|---|---|---|---|---|
| KA | 1.0000000E+00 | 1.0000000E+00 | 1.0000000E+00 | 1.0000000E+00 |
| A4 | −8.7217012E−04 | −4.1417018E−04 | 2.4474920E−04 | −1.2301450E−04 |
| A6 | 4.7708643E−06 | 2.6672163E−06 | −9.3620532E−07 | −3.8557447E−06 |
| A8 | 4.0340197E−07 | 1.8244049E−07 | −2.5061334E−08 | −4.1010710E−09 |
| A10 | −5.7982834E−09 | −2.3831094E−09 | −1.9827824E−09 | 6.0718368E−10 |
| A12 | −5.0436254E−11 | 1.1839740E−12 | 4.4297654E−11 | 1.6323172E−12 |
| A14 | 1.4054083E−12 | 3.8044971E−13 | 5.0171169E−13 | −5.9756182E−14 |
| A16 | 1.1366760E−15 | −3.2904694E−15 | −2.1426269E−14 | −1.0544906E−15 |
| A18 | −1.9461583E−16 | −4.3091949E−17 | 2.1152990E−16 | 1.8782694E−17 |
| A20 | 1.1396033E−18 | 4.8505784E−19 | −7.0110955E−19 | −7.4447782E−20 |

| Sn | 9 | 10 |
|---|---|---|
| KA | 1.0000000E+00 | 1.0000000E+00 |
| A4 | −2.4178668E−04 | 2.9585923E−06 |
| A6 | 1.4867393E−06 | 2.9107218E−07 |
| A8 | −7.7545988E−09 | −8.1998857E−09 |
| A10 | 9.0397572E−11 | 1.8926289E−10 |
| A12 | −1.2959228E−12 | −1.4746638E−12 |
| A14 | 8.5268479E−16 | 2.9145856E−17 |
| A16 | 9.8305275E−17 | 1.7717823E−17 |
| A18 | −5.3136730E−19 | 2.8712290E−19 |
| A20 | 3.7679634E−22 | −1.6948095E−21 |

Example 16

Figure 38:
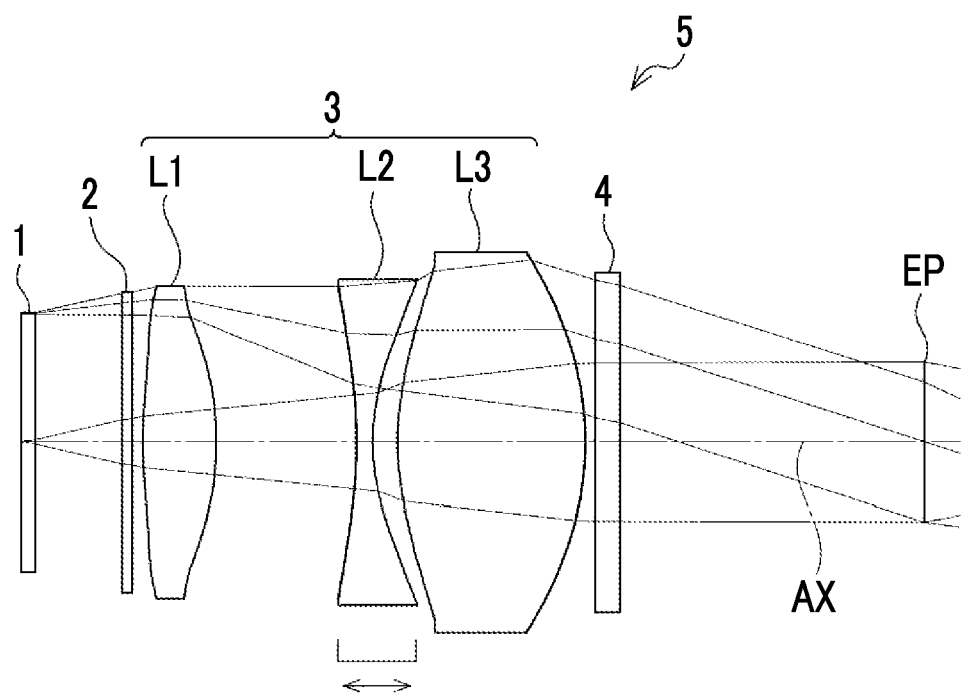
FIG. 38 is a cross section diagram illustrating a configuration and luminous flux of an electronic view finder of Example 16.

A configuration and luminous flux of the electronic view finder 5 of Example 16 are illustrated in FIG. 38. The electronic view finder 5 of Example 16 comprises the display element 1, the optical member 2, the eyepiece lens 3, and the optical member 4 in order from the display element 1 side to the eyepoint EP side. The eyepiece lens 3 consists of the first lens L1 that is a positive lens, the second lens L2 that is a negative lens, and the third lens L3 that is a positive lens, in order from the display element 1 side to the eyepoint EP side. The diopter adjustment lens group consists of only the second lens L2.

Figure 39:
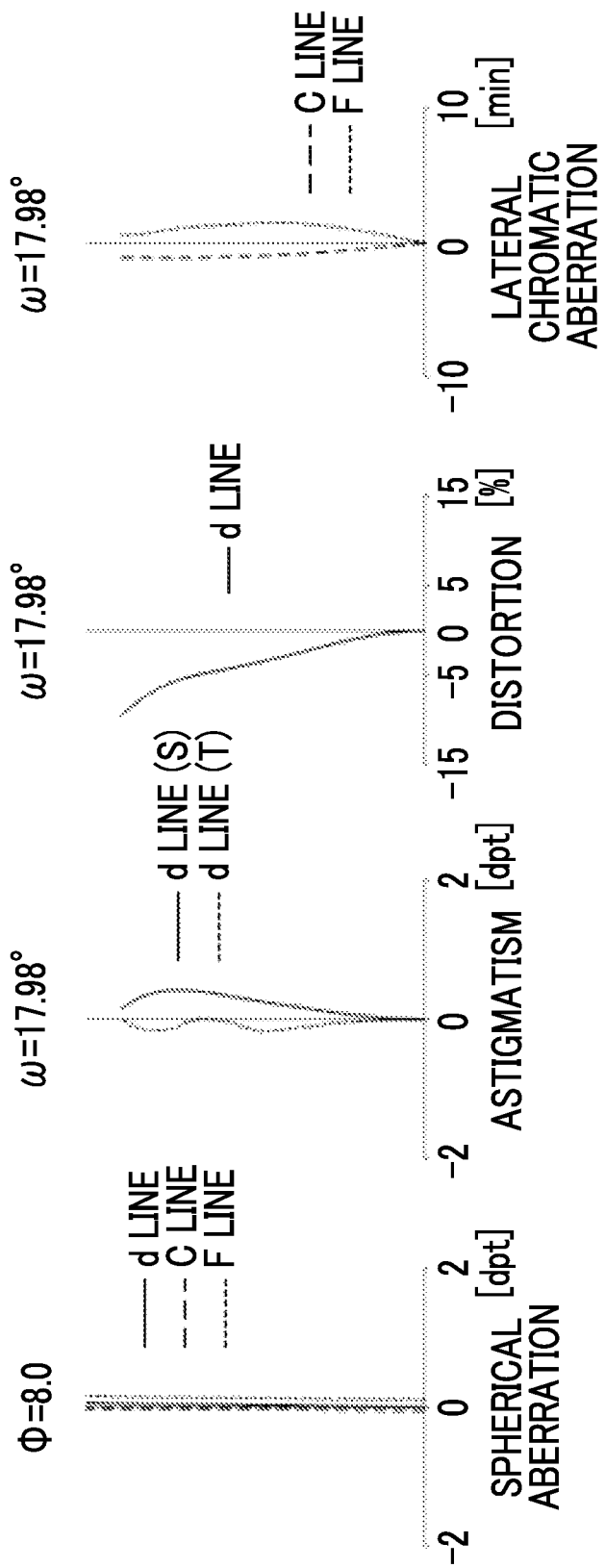
FIG. 39 is various aberration diagrams of the electronic view finder of Example 16.

For the electronic view finder 5 of Example 16, basic lens data is shown in Table 46, specifications and variable surface spacing are shown in Table 47, aspherical coefficients are shown in Table 48, and various aberration diagrams in a state where the diopter is −0.99 diopter are illustrated in FIG. 39.

TABLE 46

Example 16

| Sn | R | D | Nd | vd |
|---|---|---|---|---|
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 0.5000 | | |
| *5 | 20.2253 | 3.6169 | 1.79743 | 48.26 |
| *6 | −18.4286 | DD[6] | | |
| *7 | −23.3745 | 0.8000 | 1.82347 | 23.83 |
| *8 | 11.0388 | DD[8] | | |
| *9 | 14.9708 | 9.2579 | 1.83722 | 44.28 |
| *10 | −16.1357 | 0.5000 | | |
| 11 | ∞ | 1.2000 | 1.49023 | 57.50 |
| 12 | ∞ | 15.0000 | | |
| 13 (EP) | ∞ | | | |

TABLE 47

Example 16

| Diopter | −1 dpt | −4.125 dpt | +1.875 dpt |
|---|---|---|---|
| f | 17.46 | 17.46 | 17.46 |
| Apparent Field of View (°) | 35.96 | 34.02 | 38.14 |
| DD[6] | 6.90 | 7.27 | 6.53 |
| DD[8] | 1.24 | 0.87 | 1.61 |
| H | 6.405 | | |

TABLE 48

Example 16

| Sn | 5 | 6 | 7 | 8 |
|---|---|---|---|---|
| KA  | 1.0000000E+00  | 1.0000000E+00  | 1.0000000E+00  | 1.0000000E+00 |
| A4  | −7.0612451E−04 | −2.8165749E−04 | 2.0974184E−04  | −2.2607024E−04 |
| A6  | 2.4383802E−06  | 8.0985561E−08  | −2.8144266E−07 | −1.9274787E−06 |
| A8  | 2.8300008E−07  | 2.1786611E−07  | −2.1355881E−08 | −1.5937473E−08 |
| A10 | −2.8389469E−09 | −3.4133571E−09 | −1.9531194E−09 | 5.3265018E−10 |
| A12 | −5.8527544E−11 | 1.1608875E−11  | 4.3372794E−11  | 2.1497027E−12 |
| A14 | 1.1665525E−12  | 5.1447487E−13  | 4.8452746E−13  | −5.5337038E−14 |
| A16 | 1.3860816E−15  | −4.8126711E−15 | −2.1338737E−14 | −1.0663095E−15 |
| A18 | −1.7021745E−16 | −5.8214609E−17 | 2.1457494E−16  | 1.8444905E−17 |
| A20 | 1.0215190E−18  | 6.3641742E−19  | −7.2289555E−19 | −7.3613720E−20 |

| Sn | 9 | 10 |
|---|---|---|
| KA  | 1.0000000E+00  | 1.0000000E+00 |
| A4  | −2.6200350E−04 | 1.0014130E−05 |
| A6  | 1.7784101E−06  | 2.5912779E−07 |
| A8  | −1.0622371E−08 | −7.3620367E−09 |
| A10 | 7.6853963E−11  | 1.6612350E−10 |
| A12 | −1.1609448E−12 | −1.4015908E−12 |
| A14 | 2.4983187E−15  | 1.4141897E−15 |
| A16 | 9.9361870E−17  | 9.8263744E−18 |
| A18 | −7.1593597E−19 | 2.7892536E−19 |
| A20 | 1.0822734E−21  | −1.6032490E−21 |

Table 49 to Table 51 show corresponding values of Conditional Expressions (1) to (31) of the electronic view finder 5 of Examples 1 to 16.

TABLE 49

| Expression Number | Conditional Expression | Example 1 | Example 2 | Example 3 | Example 4 | Example 5 | Example 6 |
|---|---|---|---|---|---|---|---|
| (1)  | Nmax                  | 1.868   | 1.837   | 1.842   | 1.838   | 1.858   | 1.877 |
| (2)  | f1/f3                 | 0.885   | 0.676   | 0.657   | 0.762   | 1.094   | 0.873 |
| (3)  | (R2r + R2f)/(R2r − R2f) | −0.145 | 0.578 | −0.451 | −0.562 | −0.159 | −1.302 |
| (4)  | dL/TL                 | 0.795   | 0.746   | 0.791   | 0.773   | 0.796   | 0.727 |
| (5)  | d13/|f2|              | 0.681   | 0.224   | 0.916   | 0.922   | 0.880   | 0.553 |
| (6)  | (R1r + R1f)/(R1r − R1f) | −0.574 | −0.432 | −0.294 | 0.341 | −0.522 | 0.756 |
| (7)  | (R3r + R3f)/(R3r − R3f) | 0.017 | −0.713 | −0.224 | 0.102 | 0.055 | 0.047 |
| (8)  | (R3f − R2r)/(R3f + R2r) | 0.179 | 0.289 | 0.379 | 0.299 | 0.110 | 0.252 |
| (9)  | (R2f − R1r)/(R2f + R1r) | 0.163 | −0.006 | 0.451 | 0.202 | 0.112 | −27.668 |
| (10) | f/R3r                 | −0.972  | −1.276  | −0.977  | −0.723  | −1.100  | −0.892 |
| (11) | f/f1                  | 1.581   | 1.537   | 1.661   | 1.627   | 1.475   | 1.310 |
| (12) | f/f3                  | 1.398   | 1.038   | 1.091   | 1.240   | 1.613   | 1.144 |
| (13) | f/|f2|                | 2.156   | 1.552   | 1.625   | 1.777   | 2.298   | 1.243 |
| (14) | f/|fd|                | 2.156   | 1.552   | 1.625   | 1.777   | 2.298   | 1.243 |
| (15) | d13/|fd|              | 0.681   | 0.224   | 0.916   | 0.922   | 0.880   | 0.553 |
| (16) | TL/fn                 | −3.684  | −2.359  | −2.658  | −2.951  | −3.646  | −2.010 |
| (17) | f/f12                 | 0.255   | 0.209   | 0.885   | 0.982   | 0.243   | 0.699 |
| (18) | f1/f2                 | −1.364  | −1.010  | −0.978  | −1.093  | −1.557  | −0.948 |
| (19) | f2/f3                 | −0.648  | −0.669  | −0.671  | −0.697  | −0.702  | −0.921 |
| (20) | H/f                   | 0.402   | 0.376   | 0.392   | 0.390   | 0.371   | 0.383 |
| (21) | dL/f                  | 1.358   | 1.134   | 1.293   | 1.283   | 1.263   | 1.175 |
| (22) | dL12/T2               | 0.607   | 0.482   | 0.647   | 0.629   | 0.633   | 0.571 |
| (23) | d12/d2                | 3.841   | 0.944   | 1.875   | 4.658   | 5.760   | 3.762 |
| (24) | H/TL                  | 0.235   | 0.247   | 0.240   | 0.235   | 0.234   | 0.237 |
| (25) | d01/f                 | 0.351   | 0.386   | 0.342   | 0.377   | 0.324   | 0.442 |
| (26) | d12/TL                | 0.113   | 0.029   | 0.127   | 0.137   | 0.168   | 0.111 |
| (27) | H/f1                  | 0.635   | 0.578   | 0.651   | 0.634   | 0.547   | 0.503 |
| (28) | H/f2                  | −0.866  | −0.583  | −0.637  | −0.693  | −0.852  | −0.477 |
| (29) | H/f3                  | 0.562   | 0.390   | 0.427   | 0.483   | 0.598   | 0.439 |
| (30) | (f/R3r) × (H/f)$^2$   | −0.157  | −0.180  | −0.150  | −0.110  | −0.151  | −0.131 |
| (31) | |fd × Str × R3r|      | 48.555  | 146.654 | 114.345 | 376.192 | 69.685  | 291.972 |

TABLE 50

| Expression Number | Conditional Expression | Example 7 | Example 8 | Example 9 | Example 10 | Example 11 |
|---|---|---|---|---|---|---|
| (1) | Nmax | 1.850 | 1.850 | 1.900 | 1.900 | 1.900 |
| (2) | f1/f3 | 0.855 | −1.220 | −0.628 | −0.240 | 0.689 |
| (3) | (R2r + R2f)/(R2r − R2f) | −0.751 | 0.306 | −0.305 | −0.077 | 0.081 |
| (4) | dL/TL | 0.779 | 0.779 | 0.711 | 0.703 | 0.761 |
| (5) | d13/|f2| | 0.565 | 0.529 | 0.538 | 0.868 | 1.058 |
| (6) | (R1r + R1f)/(R1r − R1f) | 0.693 | −1.687 | −2.319 | −1.547 | −0.082 |
| (7) | (R3r + R3f)/(R3r − R3f) | 0.045 | −1.733 | −2.481 | −3.857 | −0.287 |
| (8) | (R3f − R2r)/(R3f + R2r) | 0.044 | 0.271 | 0.458 | 0.411 | 0.371 |
| (9) | (R2f − R1r)/(R2f + R1r) | 0.166 | −0.235 | 0.465 | 0.254 | −0.085 |
| (10) | f/R3r | −1.282 | −1.320 | −1.001 | −0.831 | −1.098 |
| (11) | f/f1 | 1.457 | −0.444 | −0.767 | −1.124 | 1.978 |
| (12) | f/f3 | 1.246 | 0.542 | 0.482 | 0.270 | 1.362 |
| (13) | f/|f2| | 1.494 | 0.916 | 1.228 | 1.580 | 2.646 |
| (14) | f/|fd| | 1.494 | 0.916 | 1.228 | 1.124 | 2.646 |
| (15) | d13/|fd| | 0.565 | 0.529 | 0.538 | 0.617 | 1.058 |
| (16) | TL/fn | −2.497 | −0.631 | −1.029 | −1.546 | −3.605 |
| (17) | f/f12 | 0.825 | 0.552 | 0.558 | 0.757 | 0.287 |
| (18) | f1/f2 | −1.025 | −2.060 | −1.601 | −1.405 | −1.338 |
| (19) | f2/f3 | −0.834 | 0.592 | 0.392 | 0.171 | −0.515 |
| (20) | H/f | 0.391 | 0.359 | 0.367 | 0.354 | 0.373 |
| (21) | dL/f | 1.303 | 1.105 | 0.954 | 0.967 | 1.037 |
| (22) | dL12/T2 | 0.621 | 0.705 | 0.653 | 0.647 | 0.552 |
| (23) | d12/d2 | 3.893 | 0.418 | 0.218 | 0.169 | 2.035 |
| (24) | H/TL | 0.234 | 0.253 | 0.274 | 0.257 | 0.274 |
| (25) | d01/f | 0.369 | 0.314 | 0.388 | 0.408 | 0.326 |
| (26) | d12/TL | 0.114 | 0.109 | 0.058 | 0.051 | 0.078 |
| (27) | H/f1 | 0.569 | −0.160 | −0.282 | −0.398 | 0.738 |
| (28) | H/f2 | −0.583 | 0.329 | 0.451 | 0.559 | −0.987 |
| (29) | H/f3 | 0.487 | 0.195 | 0.177 | 0.095 | 0.508 |
| (30) | (f/R3r) × (H/f)$^2$ | −0.195 | −0.170 | −0.135 | −0.104 | −0.153 |
| (31) | |fd × Str × R3r| | 172.819 | 447.234 | 103.857 | 186.167 | 47.717 |

TABLE 51

| Expression Number | Conditional Expression | Example 12 | Example 13 | Example 14 | Example 15 | Example 16 |
|---|---|---|---|---|---|---|
| (1) | Nmax | 1.900 | 1.878 | 1.840 | 1.837 | 1.837 |
| (2) | f1/f3 | 0.904 | 0.985 | 1.220 | 1.182 | 1.176 |
| (3) | (R2r + R2f)/(R2r − R2f) | 0.459 | 0.331 | −0.252 | −0.390 | −0.358 |
| (4) | dL/TL | 0.743 | 0.840 | 0.796 | 0.796 | 0.796 |
| (5) | d13/|f2| | 0.820 | 0.500 | 0.988 | 1.023 | 0.992 |
| (6) | (R1r + R1f)/(R1r − R1f) | −0.816 | 0.045 | −0.534 | −0.067 | −0.046 |
| (7) | (R3r + R3f)/(R3r − R3f) | −0.402 | −0.265 | 0.047 | 0.027 | 0.037 |
| (8) | (R3f − R2r)/(R3f + R2r) | 0.104 | −0.141 | 0.134 | 0.152 | 0.151 |
| (9) | (R2f − R1r)/(R2f + R1r) | −0.019 | −0.008 | 0.149 | 0.152 | 0.118 |
| (10) | f/R3r | −1.154 | −1.275 | −1.095 | −1.066 | −1.082 |
| (11) | f/f1 | 1.493 | 1.282 | 1.352 | 1.364 | 1.384 |
| (12) | f/f3 | 1.351 | 1.263 | 1.649 | 1.613 | 1.627 |
| (13) | f/|f2| | 2.037 | 1.477 | 2.026 | 1.835 | 1.937 |
| (14) | f/|fd| | 0.060 | 1.477 | 2.026 | 1.835 | 1.937 |
| (15) | d13/|fd| | 0.024 | 0.500 | 0.988 | 1.023 | 0.992 |
| (16) | TL/fn | −2.611 | −2.096 | −3.157 | −2.882 | −3.042 |
| (17) | f/f12 | −0.060 | 0.263 | 0.474 | 0.804 | 0.705 |
| (18) | f1/f2 | −1.364 | −1.152 | −1.499 | −1.345 | −1.400 |
| (19) | f2/f3 | −0.663 | −0.855 | −0.814 | −0.879 | −0.840 |
| (20) | H/f | 0.358 | 0.390 | 0.364 | 0.367 | 0.367 |
| (21) | dL/f | 0.952 | 1.191 | 1.240 | 1.250 | 1.250 |
| (22) | dL12/T2 | 0.540 | 0.693 | 0.662 | 0.682 | 0.669 |
| (23) | d12/d2 | 3.190 | 2.204 | 8.299 | 9.547 | 8.622 |
| (24) | H/TL | 0.280 | 0.275 | 0.234 | 0.234 | 0.234 |
| (25) | d01/f | 0.330 | 0.227 | 0.318 | 0.321 | 0.321 |
| (26) | d12/TL | 0.111 | 0.076 | 0.242 | 0.279 | 0.252 |
| (27) | H/f1 | 0.535 | 0.500 | 0.492 | 0.501 | 0.508 |
| (28) | H/f2 | −0.730 | −0.575 | −0.738 | −0.673 | −0.711 |
| (29) | H/f3 | 0.484 | 0.492 | 0.601 | 0.592 | 0.597 |
| (30) | (f/R3r) × (H/f)$^2$ | −0.148 | −0.193 | −0.145 | −0.144 | −0.146 |
| (31) | |fd × Str × R3r| | 4207.335 | 101.925 | 50.221 | 57.574 | 53.795 |

As is perceived from the data described above, the apparent field of view at the full angle of view in a state of −1 diopter of the electronic view finder 5 of Examples 1 to 16 is greater than or equal to 35 degrees. Particularly, in Examples 1, 4, and 6, this value is greater than or equal to 40 degrees, and a wide apparent field of view is achieved. In addition, in the electronic view finder 5 of Examples 1 to 16, high optical performance is realized by favorably correcting various aberrations.

Figure 40:
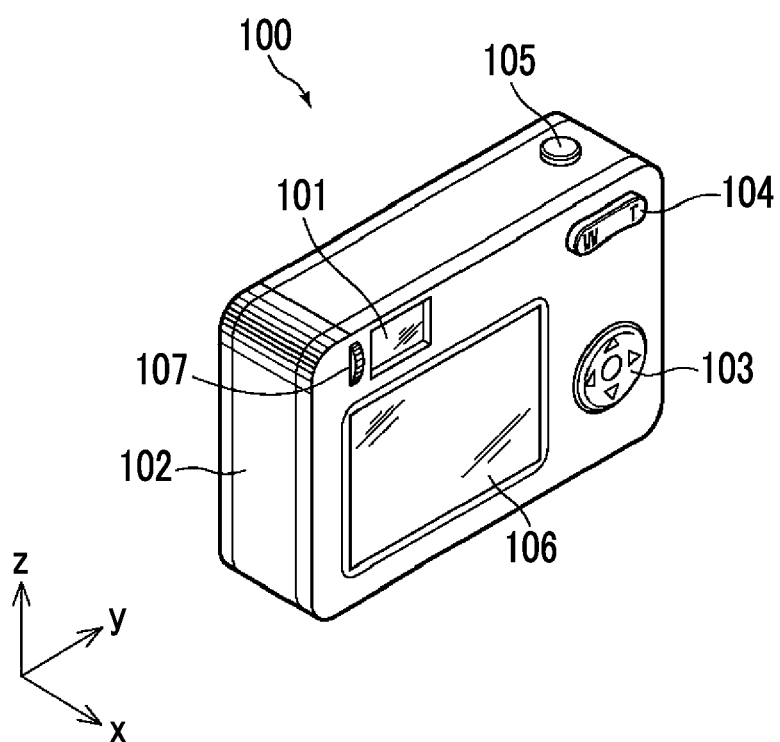
FIG. 40 is a perspective diagram of a rear surface side of an optical apparatus according to one embodiment.

Next, an optical apparatus comprising the electronic view finder according to the embodiment of the present disclosure will be described. FIG. 40 is a perspective diagram illustrating a schematic configuration of a rear surface side of the camera 100 that is an optical apparatus according to one embodiment of the present disclosure. As an example, the camera 100 is a digital camera. The camera 100 comprises an electronic view finder 101 according to one embodiment of the present disclosure and a diopter adjustment dial 107 for performing the diopter adjustment in an upper portion of a camera body 102.

The camera 100 comprises an operation button 103 for performing various settings, a zoom lever 104 for changing magnification, and a monitor 106 displaying images and various setting screens on a rear surface of the camera body 102, and comprises a shutter button 105 on an upper surface of the camera body 102. In addition, the camera 100 comprises an imaging lens (not illustrated) on a front surface of the camera body 102 and comprises the image sensor 12 (refer to FIG. 2) inside the camera body 102.

The image sensor 12 captures a subject image formed by the imaging lens and outputs a captured image to the processor 14 (refer to FIG. 2). The processor 14 performs the image processing on the captured image and outputs the captured image to the display element 1 provided in the electronic view finder 101 to display the image after the image processing on the display element 1. The observer observes the image displayed by the display element 1 through the eyepiece lens 3 by looking at the electronic view finder 101.

As illustrated in FIG. 32, in a configuration of the electronic view finder 101, the first lens L1 and the third lens L3 are fixed during the diopter adjustment. By fixing the first lens L1 of the electronic view finder 5 that is closest to the display element 1 side, and by fixing the third lens L3 of the electronic view finder 5 that is closest to the eyepoint side, the optical members 2 and 4 provided in the electronic view finder in FIG. 1 can be removed. Accordingly, since the constituents of the electronic view finder 5 can be reduced, the total length is shortened. Only one of the first lens L1 and the third lens L3 may be the lens fixed during the diopter adjustment.

In the example in FIG. 40 in which a total length of the electronic view finder 101 of the present example is shortened, an optical axis direction of the electronic view finder 101 is referred to as an x direction, a long side direction of the camera body 102 is referred to as a y direction, and a direction perpendicular to the x direction and to the y direction is referred to as a z direction. The x direction coincides with a thickness direction of the camera body 102.

Figure 41:
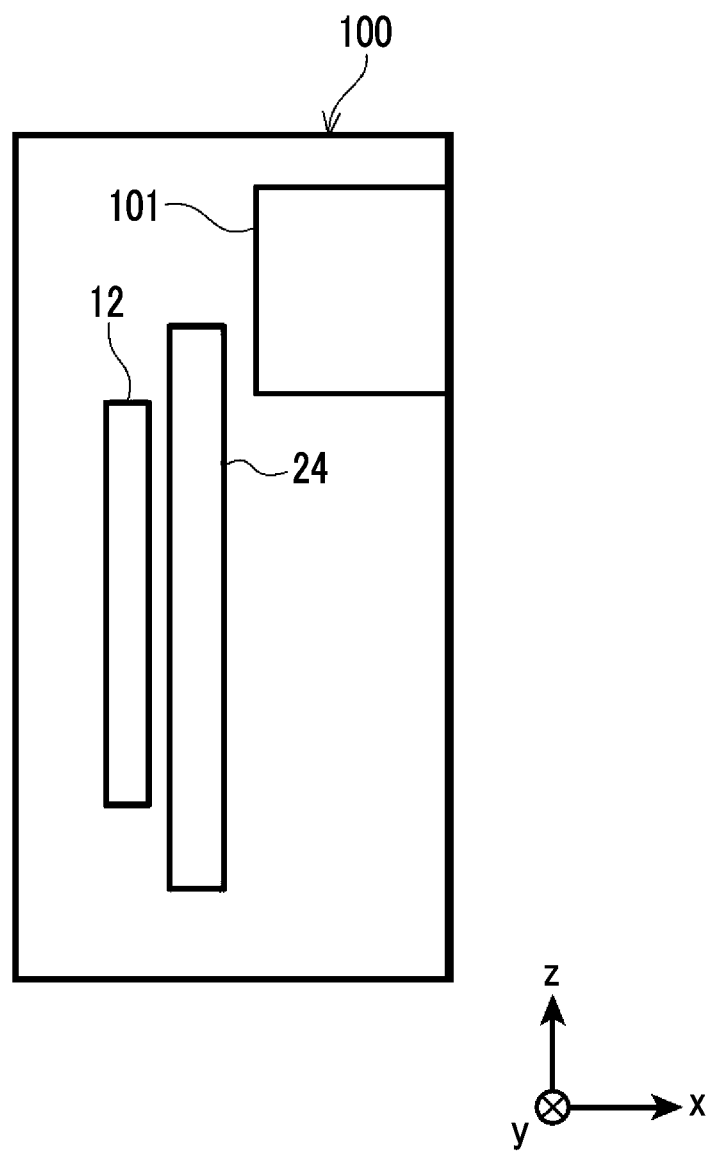
FIG. 41 is a diagram illustrating a schematic disposition example in the optical apparatus according to one embodiment.

FIG. 41 illustrates a schematic disposition example of the electronic view finder 101, the image sensor 12, and a control unit 24 in a zx plane inside the camera 100. The control unit 24 includes at least one of a control circuit that controls the image sensor 12, a moving mechanism that moves the image sensor 12 for a vibration-proof purpose, or a control circuit that controls the moving mechanism. The moving mechanism may be provided in the image sensor 12.

The electronic view finder 101 of the present example is configured to have a small total length. Particularly, size reduction in the optical axis direction is intended. Thus, the electronic view finder 101 and a part of at least one of the image sensor 12 or the control unit 24 can be disposed to overlap with each other in a view in the optical axis direction (a view in the x direction) of the electronic view finder 101. In the example in FIG. 41, a part of the control unit 24 and the electronic view finder overlap with each other in a view in the optical axis direction (a view in the x direction) of the electronic view finder. Such disposition enables size reduction of the camera 100 and expansion of the control unit 24.

Figure 42:
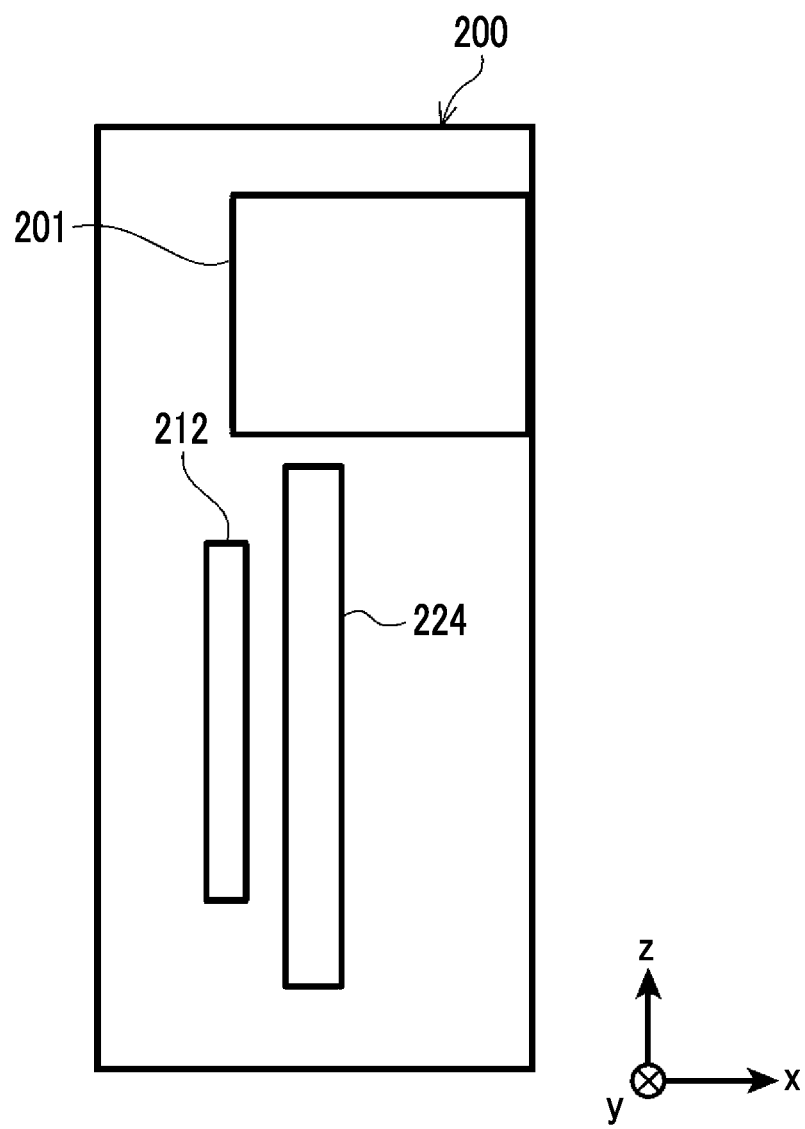
FIG. 42 is a diagram illustrating a schematic disposition example in an optical apparatus of a modification example.

FIG. 42 illustrates a schematic disposition example inside a camera 200 comprising an electronic view finder 201, an image sensor 212, and a control unit 224 as a modification example. The direction of the cross section in FIG. 42 is the same as the direction of the cross section in FIG. 41. The electronic view finder 201 has the configuration in FIG. 1, and size reduction thereof is insufficient, compared to the configuration in FIG. 32. Thus, a length of the electronic view finder 201 in the optical axis direction is longer than a length of the electronic view finder 101 in the optical axis direction. Thus, in the camera 200, any of the image sensor 212 and the control unit 224 cannot be disposed to overlap with the electronic view finder 201 in a view in the optical axis direction (a view in the x direction) of the electronic view finder 201. In the camera 100 illustrated in FIG. 41, size reduction of the camera 100 and expansion of the control unit 24 are easier than in the modification example in FIG. 42.

While the disclosed technology is illustratively described above using the embodiment and the examples, the disclosed technology is not limited to the embodiment and to the examples and can be subjected to various modifications. For example, the curvature radius, the surface spacing, the refractive index, the Abbe number, and the aspherical coefficient of each lens are not limited to the values illustrated in each of the above numerical value examples and may have other values. In addition, the optical apparatus according to the embodiment of the present disclosure is not limited to the above example. The present disclosure can also be applied to a film camera, a video camera, a head-mounted display, and the like.

All documents, patent applications, and technical standards disclosed in the present specification are incorporated in the present specification by reference to the same extent as in a case where each of the documents, patent applications, and technical standards are specifically and individually indicated to be incorporated by reference.

What is claimed is:

1. An electronic view finder comprising:
    a display element that displays an image; and
    an eyepiece lens that is disposed on an eyepoint side of the display element and that is used for observing the image,
    wherein the eyepiece lens consists of a first lens, a second lens having refractive power of a different sign from refractive power of the first lens, and a third lens having positive refractive power in order from a display element side to the eyepoint side,
    diopter is adjustable by moving at least one lens of the eyepiece lens as a diopter adjustment lens group,
    a television distortion of the image varies depending on the diopter,
    the first lens has positive refractive power, and
    in a case where a focal length of the eyepiece lens in a state where the diopter is −1 diopter is denoted by f, a combined focal length of the first lens and the second lens in a state where the diopter is −1 diopter is denoted by f12, and a half value of a longest diameter of a display region in the display element is denoted by H, Conditional Expressions (17) and (20) are satisfied, which are represented by $0.1 < f/f12 < 2$     (17), $0.33 < H/f < 0.7$     (20).

2. The electronic view finder according to claim 1, wherein in a case where a maximum value of refractive indexes of materials of all lenses provided in the eyepiece lens with respect to a d line is denoted by Nmax, Conditional Expression (1) is satisfied, which is represented by $1.78 < Nmax < 2$     (1).

3. The electronic view finder according to claim 1, wherein in a case where a focal length of the first lens is denoted by f1, and a focal length of the third lens is denoted by f3, Conditional Expression (2) is satisfied, which is represented by $0.2 < f1/f3 < 1.8$     (2).

4. The electronic view finder according to claim 1, wherein in a case where a paraxial curvature radius of a surface of the second lens on the display element side is denoted by R2f, and a paraxial curvature radius of a surface of the second lens on the eyepoint side is denoted by R2r, Conditional Expression (3) is satisfied, which is represented by $-5 < (R2r+R2f)/(R2r-R2f) < 0.61$     (3).

5. The electronic view finder according to claim 1, wherein in a case where a distance on an optical axis from a surface of the first lens on the display element side to a surface of the third lens on the eyepoint side in a state where the diopter is −1 diopter is denoted by dL, and a sum of an air conversion distance on the optical axis from a display surface of the display element to the surface of the first lens on the display element side in a state where the diopter is −1 diopter and of dL is denoted by TL, Conditional Expression (4) is satisfied, which is represented by $0.4 < dL/TL < 0.95$     (4).

6. The electronic view finder according to claim 1, wherein the second lens has negative refractive power, and in a case where a distance on an optical axis from a surface of the first lens on the eyepoint side to a surface of the third lens on the display element side in a state where the diopter is −1 diopter is denoted by d13, and a focal length of the second lens is denoted by f2, Conditional Expression (5) is satisfied, which is represented by $0.1 < d13/|f2| < 4$     (5).

7. The electronic view finder according to claim 1, wherein in a case where a paraxial curvature radius of a surface of the first lens on the display element side is denoted by R1f, and a paraxial curvature radius of a surface of the first lens on the eyepoint side is denoted by R1r, Conditional Expression (6) is satisfied, which is represented by $-3.5 < (R1r+R1f)/(R1r-R1f) < 2$     (6).

8. The electronic view finder according to claim 1, wherein in a case where a paraxial curvature radius of a surface of the third lens on the display element side is denoted by R3f, and a paraxial curvature radius of a surface of the third lens on the eyepoint side is denoted by R3r, Conditional Expression (7) is satisfied, which is represented by $-5 < (R3r+R3f)/(R3r-R3f) < 0.5$     (7).

9. The electronic view finder according to claim 1, wherein in a case where a paraxial curvature radius of a surface of the second lens on the eyepoint side is denoted by R2r, and a paraxial curvature radius of a surface of the third lens on the display element side is denoted by R3f, Conditional Expression (8) is satisfied, which is represented by $-0.5 < (R3f-R2r)/(R3f+R2r) < 1.5$     (8)

10. The electronic view finder according to claim 1, wherein in a case where a paraxial curvature radius of a surface of the first lens on the eyepoint side is denoted by R1r, and a paraxial curvature radius of a surface of the second lens on the display element side is denoted by R2f, Conditional Expression (9) is satisfied, which is represented by $-30 < (R2f-R1r)/(R2f+R1r) < 1.5$     (9).

11. The electronic view finder according to claim 1, wherein in a case where the focal length of the eyepiece lens in the state where the diopter is −1 diopter is denoted by f, and a paraxial curvature radius of a surface of the third lens on the eyepoint side is denoted by R3r, Conditional Expression (10) is satisfied, which is represented by $-3 < f/R3r < -0.2$     (10).

12. The electronic view finder according to claim 1, wherein in a case where the focal length of the eyepiece lens in the state where the diopter is −1 diopter is denoted by f, and a focal length of the first lens is denoted by f1, Conditional Expression (11) is satisfied, which is represented by $0.89 < f/f1 < 3$     (11).

13. The electronic view finder according to claim 1, wherein in a case where the focal length of the eyepiece lens in the state where the diopter is −1 diopter is denoted by f, and a focal length of the third lens is denoted by f3, Conditional Expression (12) is satisfied, which is represented by $0.05 < f/f3 < 3$     (12).

14. The electronic view finder according to claim 1, wherein the second lens has negative refractive power, and in a case where the focal length of the eyepiece lens in the state where the diopter is −1 diopter is denoted by f, and a focal length of the second lens is denoted by f2, Conditional Expression (13) is satisfied, which is represented by $0.1 < f/|f2| < 3.3$     (13).

15. The electronic view finder according to claim 1, wherein in a case where the focal length of the eyepiece lens in the state where the diopter is −1 diopter is denoted by f, and a focal length of the diopter adjustment lens group is denoted by fd, Conditional Expression (14) is satisfied, which is represented by $0.01 < f/|fd| < 4$     (14).

16. The electronic view finder according to claim 1,
wherein in a case where a distance on an optical axis from a surface of the first lens on the eyepoint side to a surface of the third lens on the display element side in a state where the diopter is −1 diopter is denoted by d13, and a focal length of the diopter adjustment lens group is denoted by fd, Conditional Expression (15) is satisfied, which is represented by $$0.01<d3/|fd|<2 \tag{15}$$

17. The electronic view finder according to claim 1,
wherein in a case where a sum of an air conversion distance on an optical axis from a display surface of the display element to a surface of the first lens on the display element side and of a distance on the optical axis from the surface of the first lens on the display element side to a surface of the third lens on the eyepoint side in a state where the diopter is −1 diopter is denoted by TL, and a focal length of a lens that is provided in the eyepiece lens and that has negative refractive power is denoted by fn, Conditional Expression (16) is satisfied, which is represented by $$-6<TL/fn<-0.5 \tag{16}$$

18. The electronic view finder according to claim 1, wherein
in a case where a focal length of the first lens is denoted by f1, and a focal length of the second lens is denoted by f2, Conditional Expression (18) is satisfied, which is represented by $$-2.5<f1/f2<-0.1 \tag{18}$$

19. The electronic view finder according to claim 1,
wherein in a case where a focal length of the second lens is denoted by f2, and a focal length of the third lens is denoted by f3, Conditional Expression (19) is satisfied, which is represented by $$-3<f2/f3<-0.1 \tag{19}$$

20. The electronic view finder according to claim 1,
wherein in a case where a distance on an optical axis from a surface of the first lens on the display element side to a surface of the third lens on the eyepoint side in a state where the diopter is −1 diopter is denoted by dL, and the focal length of the eyepiece lens in the state where the diopter is −1 diopter is denoted by f, Conditional Expression (21) is satisfied, which is represented by $$0.9<dL/f<2.4 \tag{21}$$

21. The electronic view finder according to claim 1,
wherein in a case where a distance on an optical axis from a surface of the first lens on the display element side to a surface of the second lens on the eyepoint side in a state where the diopter is −1 diopter is denoted by dL12, and a sum of an air conversion distance on the optical axis from a display surface of the display element to the surface of the first lens on the display element side and of a distance on the optical axis from the surface of the first lens on the display element side to a surface of the second lens on the eyepoint side in a state where the diopter is −1 diopter is denoted by T2, Conditional Expression (22) is satisfied, which is represented by $$0.4<dL12/T2<0.9 \tag{22}$$

22. The electronic view finder according to claim 1,
wherein in a case where a distance on an optical axis from a surface of the first lens on the eyepoint side to a surface of the second lens on the display element side in a state where the diopter is −1 diopter is denoted by d12, and a thickness of the second lens on the optical axis is denoted by d2, Conditional Expression (23) is satisfied, which is represented by $$0.15<d12/d2<12 \tag{23}$$

23. The electronic view finder according to claim 1,
wherein in a case where the half value of the longest diameter of the display region in the display element is denoted by H, and a sum of an air conversion distance on an optical axis from a display surface of the display element to a surface of the first lens on the display element side and of a distance on the optical axis from the surface of the first lens on the display element side to a surface of the third lens on the eyepoint side in a state where the diopter is −1 diopter is denoted by TL, Conditional Expression (24) is satisfied, which is represented by $$0.1<H/TL<0.5 \tag{24}$$

24. The electronic view finder according to claim 1,
wherein in a case where an air conversion distance on an optical axis from a display surface of the display element to a surface of the first lens on the display element side in a state where the diopter is −1 diopter is denoted by d01, and the focal length of the eyepiece lens in the state where the diopter is −1 diopter is denoted by f, Conditional Expression (25) is satisfied, which is represented by $$0.1<d01/f<0.8 \tag{25}$$

25. The electronic view finder according to claim 1,
wherein in a case where a distance on an optical axis from a surface of the first lens on the eyepoint side to a surface of the second lens on the display element side in a state where the diopter is −1 diopter is denoted by d12, and a sum of an air conversion distance on the optical axis from a display surface of the display element to a surface of the first lens on the display element side and of a distance on the optical axis from the surface of the first lens on the display element side to a surface of the third lens on the eyepoint side in a state where the diopter is −1 diopter is denoted by TL, Conditional Expression (26) is satisfied, which is represented by $$0.01<d12/TL<2 \tag{26}$$

26. The electronic view finder according to claim 1,
wherein in a case where the half value of the longest diameter of the display region in the display element is denoted by H, and a focal length of the first lens is denoted by f1, Conditional Expression (27) is satisfied, which is represented by $$0.3<H/f1<0.9 \tag{27}$$

27. The electronic view finder according to claim 1,
wherein in a case where the half value of the longest diameter of the display region in the display element is denoted by H, and a focal length of the second lens is denoted by f2, Conditional Expression (28) is satisfied, which is represented by $$-1.4<H/f2<-0.4 \tag{28}$$

28. The electronic view finder according to claim 1,
wherein in a case where the half value of the longest diameter of the display region in the display element is denoted by H, and a focal length of the third lens is denoted by f3, Conditional Expression (29) is satisfied, which is represented by $$0.01 < H/f3 < 1 \tag{29}$$

29. The electronic view finder according to claim 1, wherein in a case where the focal length of the eyepiece lens in the state where the diopter is −1 diopter is denoted by f, a paraxial curvature radius of a surface of the third lens on the eyepoint side is denoted by R3r, and the half value of the longest diameter of the display region in the display element is denoted by H, Conditional Expression (30) is satisfied, which is represented by $$(f/R3r) \times (H/f)^2 < -0.0218 \tag{30}$$

30. The electronic view finder according to claim 29, wherein in a case where a focal length of the diopter adjustment lens group is denoted by fd, a moving amount of the diopter adjustment lens group in a case where a change is made from a state where the diopter is −1 diopter to a state where an absolute value of the diopter is a maximum is denoted by Str, and a paraxial curvature radius of a surface of the third lens on the eyepoint side is denoted by R3r, Conditional Expression (31) is satisfied, which is represented by $$200 < |fd \times Str \times R3r| \tag{31}$$

31. The electronic view finder according to claim 30, wherein
in a state where the diopter has a positive maximum value, the television distortion of the image has a negative value.
32. The electronic view finder according to claim 29, wherein in a state where an absolute value of the diopter is a maximum within a negative range of the diopter, the television distortion of the image has a positive value, and
in a case where the half value of the longest diameter of the display region in the display element is denoted by H, and the focal length of the eyepiece lens in the state where the diopter is −1 diopter is denoted by f, Conditional Expression (20) is satisfied, which is represented by $$0.33 < H/f < 0.7 \tag{20}$$

33. The electronic view finder according to claim 1, wherein the third lens is fixed during the diopter adjustment.
34. The electronic view finder according to claim 33, wherein the third lens is an optical element closest to the eyepoint side.
35. The electronic view finder according to claim 34, wherein a material of the third lens has a knoop hardness of greater than or equal to 450 N/mm$^2$.
36. The electronic view finder according to claim 1, wherein the first lens is fixed during the diopter adjustment.
37. The electronic view finder according to claim 36, wherein the first lens is an optical element closest to the display element side.
38. An optical apparatus comprising:
the electronic view finder according to claim 1.
39. An optical apparatus comprising:
the electronic view finder according to claim 33;
an imaging element; and
a control unit that controls the imaging element,
wherein a part of at least one of the imaging element or the control unit overlaps with the electronic view finder in a view in an optical axis direction of the electronic view finder.

* * * * *